US011462949B2

(12) United States Patent
Glover et al.

(10) Patent No.: US 11,462,949 B2
(45) Date of Patent: *Oct. 4, 2022

(54) WIRELESS CHARGING METHOD AND SYSTEM

(71) Applicant: Wireless Electrical Grid LAN, WiGL Inc, Hampton, VA (US)

(72) Inventors: Ahmad L. D. Glover, Smithfield, VA (US); Cherif Chibane, Tewksbury, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/699,092

(22) Filed: Mar. 19, 2022

(65) Prior Publication Data

US 2022/0209584 A1 Jun. 30, 2022

Related U.S. Application Data

(63) Continuation-in-part of application No. 17/163,001, filed on Jan. 29, 2021, and a continuation-in-part of
(Continued)

(51) Int. Cl.
*H02J 50/40* (2016.01)
*H02J 7/00* (2006.01)
(Continued)

(52) U.S. Cl.
CPC .......... *H02J 50/40* (2016.02); *H02J 7/00045* (2020.01); *H02J 50/80* (2016.02); *H02J 50/90* (2016.02)

(58) Field of Classification Search
CPC ......... H02J 50/80; H02J 50/90; H02J 7/00045
(Continued)

(56) References Cited

U.S. PATENT DOCUMENTS 787,412 A 4/1905 Tesla
2,811,624 A 10/1957 Haagensen
(Continued)

FOREIGN PATENT DOCUMENTS

CN 1829999 A 9/2006
CN 101401312 A 4/2009
(Continued)

OTHER PUBLICATIONS

WIGL, Inc., IPRP, PCT/US2018/15625, May 17, 2018, 3 pgs.
WIGL, Inc., IPRP, PCT/US2021/52223, Oct. 28, 2021, 3 pgs.

*Primary Examiner* — Joel Ajayi
(74) *Attorney, Agent, or Firm* — Mark L. Cooper

(57) ABSTRACT

Disclosed herein is a system controller in electronic communication with at least one wireless base charger system coupled to a power source, at least one transmitting antenna, the wireless charging system configured to determine a location of at least one device receiver located within a physical space and to provide wireless energy delivery comprising directing one or more directional electromagnetic energy beams from at least one transmitting antenna to the location of the device receiver at a distance greater than or equal to 50 cm from the transmitting antenna; each device receiver configured to receive and convert one or more of the directional electromagnetic energy beams into electrical energy and store at least a portion of the electrical energy in an intermediary electrical storage device, and to direct electrical energy from the intermediary electrical storage device to a connected electronic device in electrical connection with the device receiver, to charge and/or power the connected electronic device. Methods of using the system are also disclosed.

20 Claims, 12 Drawing Sheets

Related U.S. Application Data application No. 17/033,824, filed on Sep. 27, 2020, and a continuation-in-part of application No. 17/019,312, filed on Sep. 13, 2020, and a continuation-in-part of application No. 16/482,347, filed as application No. PCT/US2018/015625 on Jan. 28, 2018, now Pat. No. 10,992,158, which is a continuation-in-part of application No. 15/640,574, filed on Jul. 2, 2017, now Pat. No. 9,985,465, said application No. 16/482,347 is a continuation-in-part of application No. 15/640,574, filed on Jul. 2, 2017, now Pat. No. 9,985,465, application No. 17/699,092, which is a continuation-in-part of application No. 17/185,654, filed on Feb. 25, 2021, which is a continuation-in-part of application No. 16/482,347, filed on Jul. 31, 2019, now Pat. No. 10,992,158.

(51) Int. Cl.
*H02J 50/90* (2016.01)
*H02J 50/80* (2016.01)

(58) Field of Classification Search
USPC .................................. 455/456.1; 320/108
See application file for complete search history.

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,208,115 B1 | 3/2001 | Binder |
| 6,271,799 B1 | 8/2001 | Rief |
| 6,289,237 B1 | 9/2001 | Mickle et al. |
| 6,316,915 B1 | 11/2001 | Fuiiwara et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,769 B1 | 11/2002 | Lehtola |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,661,197 B2 | 12/2003 | Zink et al. |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,982,697 B2 | 1/2006 | Wilson et al. |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,042,196 B2 | 5/2006 | Ka-Lai et al. |
| 7,068,234 B2 | 6/2006 | Sievenoioer |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunallv |
| 7,451,839 B2 | 11/2008 | Perlman |
| 7,463,201 B2 | 12/2008 | Chiang et al. |
| 7,471,247 B2 | 12/2008 | Sailv |
| 7,525,283 B2 | 4/2009 | Cheng et al. |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hvde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,010,205 B2 | 8/2011 | Rahman et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |

(56) References Cited

U.S. PATENT DOCUMENTS

| | | |
|---|---|---|
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leahman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,587,154 B2 | 11/2013 | Fells et al. |
| 8,604,746 B2 | 12/2013 | Lee |
| 8,614,643 B2 | 12/2013 | Leahman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamaki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,819,659 B2 | 8/2014 | Ramer et al. |
| 8,823,319 B2 | 9/2014 | Von Novak, III et al. |
| 8,832,646 B1 | 9/2014 | Wendling |
| 8,853,891 B2 | 10/2014 | Soar |
| 8,854,176 B2 | 10/2014 | Zeine |
| 8,860,364 B2 | 10/2014 | Low et al. |
| 8,896,315 B1 | 11/2014 | Davies |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leahman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leahman et al. |
| 9,130,397 B2 | 9/2015 | Leahman et al. |
| 9,130,602 B2 | 9/2015 | Cook |
| 9,142,998 B2 | 9/2015 | Yu et al. |
| 9,143,000 B2 | 9/2015 | Leahman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leahman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,391,477 B2 | 7/2016 | Sheng |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leahman |
| 9,438,045 B1 | 9/2016 | Leahman |
| 9,438,046 B1 | 9/2016 | Leahman |
| 9,444,283 B2 | 9/2016 | Son et al. |
| 9,450,449 B1 | 9/2016 | Leahman et al. |
| 9,452,296 B2 | 9/2016 | Forsell |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,521,926 B1 | 12/2016 | Leahman et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leahman |
| 9,537,358 B2 | 1/2017 | Leahman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,635,625 B2 | 4/2017 | Russell et al. |
| 9,647,328 B2 | 5/2017 | Dobric |
| 9,647,483 B1 | 5/2017 | Bana et al. |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,787,103 B1 | 10/2017 | Leahman et al. |
| 9,793,758 B2 | 10/2017 | Leahman |
| 9,793,764 B2 | 10/2017 | Perry |
| 9,800,080 B2 | 10/2017 | Leahman et al. |
| 9,800,172 B1 | 10/2017 | Leahman |
| 9,806,564 B2 | 10/2017 | Leahman |
| 9,812,890 B1 | 11/2017 | Leahman et al. |
| 9,819,230 B2 | 11/2017 | Petras et al. |
| 9,824,815 B2 | 11/2017 | Leahman et al. |
| 9,825,674 B1 | 11/2017 | Leahman |
| 9,831,718 B2 | 11/2017 | Leahman et al. |
| 9,838,083 B2 | 12/2017 | Bell et al. |
| 9,843,201 B1 | 12/2017 | Leahman et al. |
| 9,843,213 B2 | 12/2017 | Leahman et al. |
| 9,843,229 B2 | 12/2017 | Leahman |
| 9,843,763 B2 | 12/2017 | Leahman et al. |
| 9,847,669 B2 | 12/2017 | Leahman |
| 9,847,677 B1 | 12/2017 | Leahman |
| 9,847,679 B2 | 12/2017 | Bell et al. |
| 9,853,361 B2 | 12/2017 | Chen et al. |
| 9,853,458 B1 | 12/2017 | Bell et al. |
| 9,853,485 B2 | 12/2017 | Contopanagos |
| 9,853,692 B1 | 12/2017 | Bell et al. |
| 9,859,756 B2 | 1/2018 | Leahman et al. |
| 9,859,757 B1 | 1/2018 | Leahman et al. |
| 9,859,758 B1 | 1/2018 | Leahman |
| 9,859,797 B1 | 1/2018 | Leahman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,871,387 B1 | 1/2018 | Bell et al. |
| 9,871,398 B1 | 1/2018 | Leahman |
| 9,876,379 B1 | 1/2018 | Leahman et al. |
| 9,876,380 B1 | 1/2018 | Leahman et al. |
| 9,876,394 B1 | 1/2018 | Leahman |
| 9,876,536 B1 | 1/2018 | Bell et al. |
| 9,876,648 B2 | 1/2018 | Bell |
| 9,882,394 B1 | 1/2018 | Bell et al. |

(56) References Cited

U.S. PATENT DOCUMENTS

| | | |
|---|---|---|
| 9,882,395 B1 | 1/2018 | Leahman et al. |
| 9,882,427 B2 | 1/2018 | Leahman et al. |
| 9,882,430 B1 | 1/2018 | Leahman et al. |
| 9,887,584 B1 | 2/2018 | Bell et al. |
| 9,887,739 B2 | 2/2018 | Leahman et al. |
| 9,891,669 B2 | 2/2018 | Bell |
| 9,893,535 B2 | 2/2018 | Leahman |
| 9,893,538 B1 | 2/2018 | Bell et al. |
| 9,893,554 B2 | 2/2018 | Bell et al. |
| 9,893,555 B1 | 2/2018 | Leahman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leahman et al. |
| 9,899,873 B2 | 2/2018 | Bell et al. |
| 9,912,199 B2 | 3/2018 | Leahman et al. |
| 9,916,485 B1 | 3/2018 | Lilly et al. |
| 9,917,477 B1 | 3/2018 | Bell et al. |
| 9,923,386 B1 | 3/2018 | Leahman et al. |
| 9,939,864 B1 | 4/2018 | Bell et al. |
| 9,941,707 B1 | 4/2018 | Leahman |
| 9,941,747 B2 | 4/2018 | Bell et al. |
| 9,954,374 B1 | 4/2018 | Bell et al. |
| 9,965,009 B1 | 5/2018 | Bell et al. |
| 9,966,765 B1 | 5/2018 | Leahman |
| 9,966,784 B2 | 5/2018 | Leahman |
| 9,967,743 B1 | 5/2018 | Bell et al. |
| 9,973,008 B1 | 5/2018 | Leahman |
| 9,991,741 B1 | 6/2018 | Bell et al. |
| 10,003,211 B1 | 6/2018 | Leahman et al. |
| 10,008,777 B1 | 6/2018 | Broyde et al. |
| 10,008,889 B2 | 6/2018 | Bell et al. |
| 10,014,728 B1 | 7/2018 | Leahman |
| 10,027,159 B2 | 7/2018 | Hosseini |
| 10,027,180 B1 | 7/2018 | Hosseini |
| 10,038,337 B1 | 7/2018 | Leahman et al. |
| 10,050,462 B1 | 8/2018 | Leahman et al. |
| 10,056,782 B1 | 8/2018 | Leahman |
| 10,063,064 B1 | 8/2018 | Bell et al. |
| 10,063,105 B2 | 8/2018 | Leahman |
| 10,063,106 B2 | 8/2018 | Bell et al. |
| 10,068,703 B1 | 9/2018 | Contopanagos |
| 10,075,008 B1 | 9/2018 | Bell et al. |
| 10,075,017 B2 | 9/2018 | Leahman et al. |
| 10,079,515 B2 | 9/2018 | Hosseini et al. |
| 10,090,699 B1 | 10/2018 | Leahman |
| 10,090,714 B2 | 10/2018 | Bohn et al. |
| 10,090,886 B1 | 10/2018 | Bell et al. |
| 10,103,552 B1 | 10/2018 | Leahman et al. |
| 10,103,582 B2 | 10/2018 | Leahman et al. |
| 10,110,046 B1 | 10/2018 | Esquibel et al. |
| 10,116,143 B1 | 10/2018 | Leahman et al. |
| 10,116,162 B2 | 10/2018 | Hosseini et al. |
| 10,116,170 B1 | 10/2018 | Leahman |
| 10,122,219 B1 | 11/2018 | Hosseini et al. |
| 10,122,415 B2 | 11/2018 | Bell et al. |
| 10,124,754 B1 | 11/2018 | Leahman |
| 10,128,686 B1 | 11/2018 | Leahman et al. |
| 10,128,693 B2 | 11/2018 | Bell et al. |
| 10,128,695 B2 | 11/2018 | Leahman et al. |
| 10,128,699 B2 | 11/2018 | Leahman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leahman |
| 10,135,295 B2 | 11/2018 | Leahman |
| 10,141,768 B2 | 11/2018 | Leahman et al. |
| 10,141,771 B1 | 11/2018 | Hosseini et al. |
| 10,141,791 B2 | 11/2018 | Bell et al. |
| 10,148,097 B1 | 12/2018 | Leahman et al. |
| 10,148,133 B2 | 12/2018 | Leahman et al. |
| 10,153,645 B1 | 12/2018 | Bell et al. |
| 10,153,653 B1 | 12/2018 | Bell et al. |
| 10,153,660 B1 | 12/2018 | Leahman et al. |
| 10,158,257 B2 | 12/2018 | Leahman |
| 10,158,259 B1 | 12/2018 | Leahman |
| 10,164,478 B2 | 12/2018 | Leahman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leahman |
| 10,186,913 B2 | 1/2019 | Leahman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leahman |
| 10,205,239 B1 | 2/2019 | Contopanagos et al. |
| 10,206,185 B2 | 2/2019 | Leahman et al. |
| 10,211,674 B1 | 2/2019 | Leahman et al. |
| 10,211,680 B2 | 2/2019 | Leahman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leahman et al. |
| 10,223,717 B1 | 3/2019 | Bell |
| 10,224,758 B2 | 3/2019 | Leahman et al. |
| 10,224,982 B1 | 3/2019 | Leahman |
| 10,230,266 B1 | 3/2019 | Leahman et al. |
| 10,243,414 B1 | 3/2019 | Leahman et al. |
| 10,256,657 B2 | 4/2019 | Hosseini et al. |
| 10,256,677 B2 | 4/2019 | Hosseini et al. |
| 10,263,432 B1 | 4/2019 | Leahman et al. |
| 10,263,476 B2 | 4/2019 | Leahman |
| 10,270,261 B2 | 4/2019 | Bell et al. |
| 10,277,054 B2 | 4/2019 | Hosseini |
| 10,291,055 B1 | 5/2019 | Bell et al. |
| 10,291,066 B1 | 5/2019 | Leahman |
| 10,291,294 B2 | 5/2019 | Leahman |
| 10,298,024 B2 | 5/2019 | Leahman |
| 10,298,133 B2 | 5/2019 | Leahman |
| 10,305,315 B2 | 5/2019 | Leahman et al. |
| 10,312,715 B2 | 6/2019 | Leahman |
| 10,333,332 B1 | 6/2019 | Hosseini |
| 10,333,357 B1 | 6/2019 | Abu Qahouq |
| 10,381,880 B2 | 8/2019 | Leahman et al. |
| 10,396,588 B2 | 8/2019 | Leahman |
| 10,509,466 B1 | 12/2019 | Miller et al. |
| 10,511,097 B2 | 12/2019 | Komaros et al. |
| 10,516,301 B2 | 12/2019 | Leahman |
| 10,523,058 B2 | 12/2019 | Leahman |
| 10,554,052 B2 | 2/2020 | Bell et al. |
| 10,594,165 B2 | 3/2020 | Hosseini |
| 10,615,647 B2 | 4/2020 | Johnston et al. |
| 10,616,534 B2 | 4/2020 | Thiel et al. |
| 10,651,670 B1 | 5/2020 | Jiang et al. |
| 10,714,984 B2 | 7/2020 | Hosseini et al. |
| 10,734,717 B2 | 8/2020 | Hosseini |
| 10,778,041 B2 | 9/2020 | Leahman |
| 10,790,674 B2 | 9/2020 | Bell et al. |
| 10,840,743 B2 | 11/2020 | Johnston et al. |
| 10,848,853 B2 | 11/2020 | Leahman et al. |
| 10,879,740 B2 | 12/2020 | Hosseini |
| 10,923,954 B2 | 2/2021 | Leahman |
| 10,958,095 B2 | 3/2021 | Leahman et al. |
| 10,965,164 B2 | 3/2021 | Leahman et al. |
| 10,985,617 B1 | 4/2021 | Johnston et al. |
| 10,992,187 B2 | 4/2021 | Leahman |
| 11,011,942 B2 | 5/2021 | Liu |
| 11,018,779 B2 | 5/2021 | Saraiedini |
| 11,114,885 B2 | 9/2021 | Hosseini et al. |
| 11,139,699 B2 | 10/2021 | Johnston et al. |
| 11,159,057 B2 | 10/2021 | Kabiri et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pantle et al. |
| 2002/0072784 A1 | 6/2002 | Sheppard et al. |
| 2002/0080083 A1 | 6/2002 | Nantz et al. |
| 2002/0095980 A1 | 7/2002 | Breed et al. |

(56) References Cited

U.S. PATENT DOCUMENTS

| | | |
|---|---|---|
| 2002/0103447 A1 | 8/2002 | Terry |
| 2002/0123776 A1 | 9/2002 | VonArx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0027036 A1 | 2/2003 | Emori et al. |
| 2003/0038750 A1 | 2/2003 | Chen |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0155832 A1 | 8/2004 | Yuanzhu |
| 2004/0196190 A1 | 10/2004 | Mendolia et al. |
| 2004/0203979 A1 | 10/2004 | Attar et al. |
| 2004/0207559 A1 | 10/2004 | Milosavlievic |
| 2004/0218759 A1 | 11/2004 | Yacobi |
| 2004/0241402 A1 | 12/2004 | Kawate |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0275983 A1 | 12/2005 | Franklin et al. |
| 2005/0282591 A1 | 12/2005 | Shaff |
| 2006/0013335 A1 | 1/2006 | Leahman |
| 2006/0019712 A1 | 1/2006 | Choi |
| 2006/0030279 A1 | 2/2006 | Leahman et al. |
| 2006/0033674 A1 | 2/2006 | Essig, Jr. et al. |
| 2006/0056855 A1 | 3/2006 | Nakagawa et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0281435 A1 | 12/2006 | Shearer et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leahman et al. |
| 2007/0097653 A1 | 5/2007 | Gilliland et al. |
| 2007/0099644 A1 | 5/2007 | Batra et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0149237 A1 | 6/2007 | Russell et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadlv |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258981 A1 | 10/2008 | Achour et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0051324 A1 | 2/2009 | Nakatsuji |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |

(56) References Cited

U.S. PATENT DOCUMENTS

| | | |
|---|---|---|
| 2009/0128262 A1 | 5/2009 | Lee et al. |
| 2009/0152954 A1 | 6/2009 | Le et al. |
| 2009/0157911 A1 | 6/2009 | Aihara |
| 2009/0174604 A1 | 7/2009 | Keskitalo |
| 2009/0180653 A1 | 7/2009 | Siursen et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0303693 A1 | 12/2009 | Mao |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hvde et al. |
| 2010/0079011 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117596 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0134105 A1 | 6/2010 | Zelinski et al. |
| 2010/0141214 A1 | 6/2010 | Yoon et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259110 A1 | 10/2010 | Kurs et al. |
| 2010/0259401 A1 | 10/2010 | Azancot et al. |
| 2010/0259447 A1 | 10/2010 | Crouch |
| 2010/0264747 A1 | 10/2010 | Hall et al. |
| 2010/0264748 A1 | 10/2010 | Tucker |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0009057 A1 | 1/2011 | Saunamaki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leahman |
| 2011/0032866 A1 | 2/2011 | Leahman |
| 2011/0034190 A1 | 2/2011 | Leahman |
| 2011/0034191 A1 | 2/2011 | Leahman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074346 A1 | 3/2011 | Hall et al. |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tamg et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0152670 A1 | 6/2011 | Yang |

(56) References Cited

U.S. PATENT DOCUMENTS

| | | |
|---|---|---|
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222154 A1 | 9/2011 | Choi et al. |
| 2011/0222272 A1 | 9/2011 | Yeh |
| 2011/0227725 A1 | 9/2011 | Muirhead |
| 2011/0228436 A1 | 9/2011 | Lee et al. |
| 2011/0243040 A1 | 10/2011 | Khan et al. |
| 2011/0243050 A1 | 10/2011 | Yanoyer |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0001644 A1 | 1/2012 | Baarman et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Paoou |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0143383 A1 | 6/2012 | Cooperrider et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153740 A1 | 6/2012 | Soar |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0188142 A1 | 7/2012 | Shashi et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0242809 A1 | 9/2012 | White et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274147 A1 | 11/2012 | Alliant Techsystems Inc |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0294054 A1 | 11/2012 | Kim et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |

(56) References Cited

U.S. PATENT DOCUMENTS

| | | |
|---|---|---|
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038136 A1 | 2/2013 | Wheatley et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentem et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0063550 A1 | 3/2013 | Ritchey et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Grav |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0201316 A1 | 8/2013 | Binder et al. |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0223538 A1 | 8/2013 | Wang et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001608 A1 | 1/2014 | McPartlin |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0002012 A1 | 1/2014 | McCauley et al. |
| 2014/0006017 A1 | 1/2014 | Sen |
| 2014/0008993 A1 | 1/2014 | Leahman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0024325 A1 | 1/2014 | Iun et al. |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |

(56) References Cited

U.S. PATENT DOCUMENTS

| | | |
|---|---|---|
| 2014/0145884 A1 | 5/2014 | Dang et al. |
| 2014/0152117 A1 | 6/2014 | Sanker |
| 2014/0159646 A1 | 6/2014 | Sankar et al. |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175876 A1 | 6/2014 | Cheatham, III et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0203768 A1 | 7/2014 | Andie et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0252869 A1 | 9/2014 | Kamiura et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266160 A1 | 9/2014 | Coza |
| 2014/0266946 A1 | 9/2014 | Bily et al. |
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292269 A1 | 10/2014 | Keating et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0312833 A1 | 10/2014 | Won et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leahman et al. |
| 2014/0354221 A1 | 12/2014 | Leahman et al. |
| 2014/0355718 A1 | 12/2014 | Guan et al. |
| 2014/0357309 A1 | 12/2014 | Leahman et al. |
| 2014/0362517 A1 | 12/2014 | Moock et al. |
| 2014/0368048 A1 | 12/2014 | Leahman et al. |
| 2014/0368161 A1 | 12/2014 | Leahman et al. |
| 2014/0368405 A1 | 12/2014 | Ek et al. |
| 2014/0370929 A1 | 12/2014 | Khawand et al. |
| 2014/0375139 A1 | 12/2014 | Tsukamoto |
| 2014/0375253 A1 | 12/2014 | Leahman et al. |
| 2014/0375255 A1 | 12/2014 | Leahman et al. |
| 2014/0375258 A1 | 12/2014 | Arkhipenkov |
| 2014/0375261 A1 | 12/2014 | Manova-Elssibony et al. |
| 2014/0380403 A1 | 12/2014 | Pearson et al. |
| 2015/0001949 A1 | 1/2015 | Leahman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leahman et al. |
| 2015/0015195 A1 | 1/2015 | Leahman et al. |
| 2015/0021990 A1 | 1/2015 | Mver et al. |
| 2015/0022008 A1 | 1/2015 | Leahman et al. |
| 2015/0022010 A1 | 1/2015 | Leahman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leahman et al. |
| 2015/0028697 A1 | 1/2015 | Leahman et al. |
| 2015/0028875 A1 | 1/2015 | Irie et al. |
| 2015/0029397 A1 | 1/2015 | Leahman et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leahman et al. |
| 2015/0042265 A1 | 2/2015 | Leahman et al. |
| 2015/0042287 A1 | 2/2015 | Liu et al. |
| 2015/0044977 A1 | 2/2015 | Ramasamv et al. |
| 2015/0046526 A1 | 2/2015 | Bush et al. |
| 2015/0061404 A1 | 3/2015 | Lamenza et al. |
| 2015/0076917 A1 | 3/2015 | Leahman et al. |
| 2015/0076927 A1 | 3/2015 | Leahman et al. |
| 2015/0077036 A1 | 3/2015 | Leahman et al. |
| 2015/0077037 A1 | 3/2015 | Leahman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leahman et al. |
| 2015/0102769 A1 | 4/2015 | Leahman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leahman et al. |
| 2015/0130293 A1 | 5/2015 | Haiimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leahman et al. |
| 2015/0162662 A1 | 6/2015 | Chen et al. |
| 2015/0162751 A1 | 6/2015 | Leahman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171516 A1 | 6/2015 | Chen et al. |
| 2015/0171656 A1 | 6/2015 | Leahman et al. |
| 2015/0171658 A1 | 6/2015 | Manoya-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leahman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |

(56) References Cited

U.S. PATENT DOCUMENTS

| | | |
|---|---|---|
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leahman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288214 A1 | 10/2015 | Bomgraber |
| 2015/0288438 A1 | 10/2015 | Maltsev et al. |
| 2015/0306063 A1 | 10/2015 | McGinnis et al. |
| 2015/0311585 A1 | 10/2015 | Church et al. |
| 2015/0312721 A1 | 10/2015 | Singh |
| 2015/0318729 A1 | 11/2015 | Leahman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leahman |
| 2015/0333573 A1 | 11/2015 | Leahman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0356482 A1 | 12/2015 | Whioole et al. |
| 2015/0358222 A1 | 12/2015 | Berger et al. |
| 2015/0365003 A1 | 12/2015 | Sadwick |
| 2015/0365137 A1 | 12/2015 | Miller et al. |
| 2015/0365138 A1 | 12/2015 | Miller et al. |
| 2016/0001136 A1 | 1/2016 | King et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043571 A1 | 2/2016 | Kesler et al. |
| 2016/0043572 A1 | 2/2016 | Cooper et al. |
| 2016/0054395 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056664 A1 | 2/2016 | Partovi |
| 2016/0057268 A1 | 2/2016 | Jiang |
| 2016/0062319 A1 | 3/2016 | Kim et al. |
| 2016/0064959 A1 | 3/2016 | Jung et al. |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0087687 A1 | 3/2016 | Kesler et al. |
| 2016/0089987 A1 | 3/2016 | Ichikawa et al. |
| 2016/0094091 A1 | 3/2016 | Shin et al. |
| 2016/0094092 A1 | 3/2016 | Davlantes et al. |
| 2016/0099601 A1 | 4/2016 | Leahman et al. |
| 2016/0099611 A1 | 4/2016 | Leahman et al. |
| 2016/0099612 A1 | 4/2016 | Leahman et al. |
| 2016/0099614 A1 | 4/2016 | Leahman et al. |
| 2016/0099755 A1 | 4/2016 | Leahman et al. |
| 2016/0099757 A1 | 4/2016 | Leahman et al. |
| 2016/0112787 A1 | 4/2016 | Rich |
| 2016/0114687 A1 | 4/2016 | Ichikawa et al. |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0172890 A1 | 6/2016 | Jeong |
| 2016/0174162 A1 | 6/2016 | Nadakuduti et al. |
| 2016/0181849 A1 | 6/2016 | Govindarai |
| 2016/0181867 A1 | 6/2016 | Daniel et al. |
| 2016/0181873 A1 | 6/2016 | Mitcheson et al. |
| 2016/0197511 A1 | 7/2016 | Atasoy et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0204643 A1 | 7/2016 | Manova-Elssibony |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322833 A1 | 11/2016 | Moshfeghi et al. |
| 2016/0322868 A1 | 11/2016 | Akuzawa et al. |
| 2016/0323000 A1 | 11/2016 | Liu et al. |
| 2016/0325680 A1 | 11/2016 | Curtis et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0368510 A1 | 12/2016 | Simon et al. |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leahman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0033611 A1 | 2/2017 | Shin et al. |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077764 A1 | 3/2017 | Bell et al. |
| 2017/0077765 A1 | 3/2017 | Bell et al. |
| 2017/0077979 A1 | 3/2017 | Papa et al. |
| 2017/0077995 A1 | 3/2017 | Leahman |
| 2017/0085112 A1 | 3/2017 | Leahman et al. |
| 2017/0085120 A1 | 3/2017 | Leahman et al. |
| 2017/0085437 A1 | 3/2017 | Condeixa et al. |
| 2017/0092115 A1 | 3/2017 | Sloo et al. |
| 2017/0093229 A1 | 3/2017 | Sindia et al. |
| 2017/0110886 A1 | 4/2017 | Reynolds et al. |
| 2017/0110910 A1 | 4/2017 | Zeine et al. |
| 2017/0117756 A1 | 4/2017 | Muratov |
| 2017/0118714 A1 | 4/2017 | Kaechi |
| 2017/0127196 A1 | 5/2017 | Blum et al. |
| 2017/0134686 A9 | 5/2017 | Leahman |
| 2017/0141582 A1 | 5/2017 | Adolf et al. |
| 2017/0141583 A1 | 5/2017 | Adolf et al. |
| 2017/0141622 A1 | 5/2017 | Meichle |
| 2017/0163076 A1 | 6/2017 | Park et al. |
| 2017/0168595 A1 | 6/2017 | Sakaguchi et al. |
| 2017/0179763 A9 | 6/2017 | Leahman |
| 2017/0179771 A1 | 6/2017 | Leahman |
| 2017/0187422 A1 | 6/2017 | Hosseini |
| 2017/0214422 A1 | 7/2017 | Na et al. |
| 2017/0274787 A1 | 9/2017 | Salter et al. |
| 2017/0338695 A1 | 11/2017 | Port |
| 2017/0346349 A1 | 11/2017 | Shimokawa |

(56) References Cited

U.S. PATENT DOCUMENTS

| | | | |
|---|---|---|---|
| 2018/0006611 A1 | 1/2018 | de Jong et al. |
| 2018/0012082 A1 | 1/2018 | Satazoda et al. |
| 2018/0040929 A1 | 2/2018 | Chaooelle |
| 2018/0048178 A1 | 2/2018 | Leahman |
| 2018/0090992 A1 | 3/2018 | Shrivastava et al. |
| 2018/0131449 A1 | 5/2018 | Kare et al. |
| 2018/0159338 A1 | 6/2018 | Leahman et al. |
| 2018/0198199 A1 | 7/2018 | Hosseini |
| 2018/0205265 A1 | 7/2018 | Park et al. |
| 2018/0212474 A1 | 7/2018 | Hosseini |
| 2018/0226840 A1 | 8/2018 | Leahman |
| 2018/0227018 A1 | 8/2018 | Moshfeghi |
| 2018/0241255 A1 | 8/2018 | Leahman |
| 2018/0248409 A1 | 8/2018 | Johnston |
| 2018/0262050 A1 | 9/2018 | Yankowitz |
| 2018/0262060 A1 | 9/2018 | Johnston |
| 2018/0269570 A1 | 9/2018 | Hosseini |
| 2018/0301934 A1 | 10/2018 | Prabhala et al. |
| 2018/0309314 A1 | 10/2018 | White et al. |
| 2018/0331581 A1 | 11/2018 | Hosseini |
| 2018/0337534 A1 | 11/2018 | Bell et al. |
| 2018/0343040 A1 | 11/2018 | Luzinski et al. |
| 2018/0375368 A1 | 12/2018 | Leahman et al. |
| 2018/0376235 A1 | 12/2018 | Leahman |
| 2019/0044392 A1 | 2/2019 | Chowdhury et al. |
| 2019/0052115 A1 | 2/2019 | Hosseini |
| 2019/0052979 A1 | 2/2019 | Chen et al. |
| 2019/0074133 A1 | 3/2019 | Contopanagos |
| 2019/0074722 A1 | 3/2019 | Shahsavari et al. |
| 2019/0074728 A1 | 3/2019 | Leahman |
| 2019/0074862 A1 | 3/2019 | Wang et al. |
| 2019/0130215 A1 | 5/2019 | Kaestle et al. |
| 2019/0131827 A1 | 5/2019 | Johnston |
| 2019/0229397 A1 | 7/2019 | Rizzo et al. |
| 2019/0288567 A1 | 9/2019 | Leahman et al. |
| 2019/0296586 A1 | 9/2019 | Moshfeghi |
| 2019/0326782 A1 | 10/2019 | Graham et al. |
| 2019/0363588 A1 | 11/2019 | Daetwyler et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leahman |
| 2020/0006988 A1 | 1/2020 | Leahman |
| 2020/0021128 A1 | 1/2020 | Bell et al. |
| 2020/0091608 A1 | 3/2020 | Alpman et al. |
| 2020/0112204 A1 | 4/2020 | Hosseini et al. |
| 2020/0144846 A1 | 5/2020 | Shin |
| 2020/0153117 A1 | 5/2020 | Papio-Toda et al. |
| 2020/0202145 A1 | 6/2020 | Mao et al. |
| 2020/0203837 A1 | 6/2020 | Komaros et al. |
| 2020/0225673 A1 | 7/2020 | Ebrahimi Afrouzi et al. |
| 2020/0235614 A1 | 7/2020 | Swan et al. |
| 2020/0244102 A1 | 7/2020 | Leahman et al. |
| 2020/0244104 A1 | 7/2020 | Kataiamaki et al. |
| 2020/0244111 A1 | 7/2020 | Johnston et al. |
| 2020/0274397 A1 | 8/2020 | Hwang et al. |
| 2020/0313464 A1 | 10/2020 | Leahman |
| 2020/0403452 A1 | 12/2020 | Leahman |
| 2021/0091602 A1 | 3/2021 | Woo |
| 2021/0104919 A1 | 4/2021 | Leahman |
| 2021/0135502 A1 | 5/2021 | Lin et al. |
| 2021/0135510 A1 | 5/2021 | Lin et al. |
| 2021/0152922 A1 | 5/2021 | Leahman et al. |
| 2021/0184503 A1 | 6/2021 | Leahman |
| 2021/0184509 A1 | 6/2021 | Muryanto et al. |
| 2021/0296936 A1 | 9/2021 | Hosseini |
| 2021/0313840 A1 | 10/2021 | Leahman et al. |
| 2021/0313841 A1 | 10/2021 | Johnston et al. |
| 2021/0320529 A1 | 10/2021 | Sengupta et al. |

FOREIGN PATENT DOCUMENTS

| | | |
|---|---|---|
| CN | 101465471 A | 6/2009 |
| CN | 101496222 A | 7/2009 |
| CN | 201278367 Y | 7/2009 |
| CN | 101507044 A | 8/2009 |
| CN | 101630357 A | 1/2010 |
| CN | 101699709 A | 4/2010 |
| CN | 102004442 A | 4/2011 |
| CN | 102027690 A | 4/2011 |
| CN | 102089952 A | 6/2011 |
| CN | 102227884 A | 10/2011 |
| CN | 102292896 A | 12/2011 |
| CN | 102474109 A | 5/2012 |
| CN | 202333847 U | 7/2012 |
| CN | 102860037 A | 1/2013 |
| CN | 103151848 A | 6/2013 |
| CN | 103296767 A | 9/2013 |
| CN | 103348563 A | 10/2013 |
| CN | 103594776 A | 2/2014 |
| CN | 103683443 A | 3/2014 |
| CN | 104040789 A | 9/2014 |
| CN | 203826555 U | 9/2014 |
| CN | 104090265 A | 10/2014 |
| CN | 104113814 A | 10/2014 |
| CN | 104167773 A | 11/2014 |
| CN | 104347915 A | 2/2015 |
| CN | 104584449 A | 4/2015 |
| CN | 104617680 A | 5/2015 |
| CN | 104659927 A | 5/2015 |
| CN | 105207373 A | 12/2015 |
| CN | 105491472 A | 4/2016 |
| CN | 105762946 A | 7/2016 |
| CN | 105765821 A | 7/2016 |
| CN | 105932407 A | 9/2016 |
| CN | 106329116 A | 1/2017 |
| CN | 103380561 B | 9/2017 |
| CN | 110098669 A | 8/2019 |
| DE | 20016655 U1 | 2/2002 |
| DE | 102013216953 A1 | 2/2015 |
| DE | 102014219679 A1 | 3/2016 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| EP | 3496231 A1 | 6/2019 |
| GB | 2404497 A | 2/2005 |
| GB | 2556620 B | 6/2018 |
| JP | H06327172 A | 11/1994 |
| JP | 2000323916 A | 11/2000 |
| JP | 2002209343 A | 7/2002 |
| JP | 2002319816 A | 10/2002 |
| JP | 2006157586 A | 6/2006 |
| JP | 2007043432 A | 2/2007 |
| JP | 2007135335 A | 5/2007 |
| JP | 2008092704 A | 4/2008 |
| JP | 2008167017 A | 7/2008 |
| JP | 2008295176 A | 12/2008 |
| JP | 2009071835 A | 4/2009 |
| JP | 2009525715 A | 7/2009 |
| JP | 2009201328 A | 9/2009 |
| JP | 2009290764 A | 12/2009 |
| JP | 2011083078 A | 4/2011 |
| JP | 2011514781 A | 5/2011 |
| JP | 2012016171 A | 1/2012 |
| JP | 2012023950 A | 2/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014501080 A | 1/2014 |
| JP | 2014075927 A | 4/2014 |
| JP | 2014112063 A | 6/2014 |
| JP | 2014176125 A | 9/2014 |
| JP | 2014176131 A | 9/2014 |
| JP | 2014223018 A | 11/2014 |
| JP | 2015027345 A | 2/2015 |
| JP | 2015128349 A | 7/2015 |
| JP | 2015128370 A | 7/2015 |

(56) References Cited

FOREIGN PATENT DOCUMENTS

| | | |
|---|---|---|
| JP | 2015139276 A | 7/2015 |
| JP | 2017034935 A | 2/2017 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 100819604 B1 | 4/2008 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| KR | 20140023409 A | 2/2014 |
| KR | 20140023410 A | 3/2014 |
| KR | 20140025410 A | 3/2014 |
| KR | 20140085200 A | 7/2014 |
| KR | 20140148270 A | 12/2014 |
| KR | 20150077678 A | 7/2015 |
| KR | 20160018826 A | 2/2016 |
| KR | 20160087671 A | 7/2016 |
| KR | 20180108317 A | 10/2018 |
| KR | 20180114721 A | 10/2018 |
| RU | 2658332 C1 | 6/2018 |
| WO | WO 199508125 A1 | 3/1995 |
| WO | WO 199831070 A1 | 7/1998 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2007070571 A2 | 6/2007 |
| WO | WO 2008024993 A2 | 2/2008 |
| WO | WO 2008156571 A2 | 12/2008 |
| WO | WO 2010022181 A1 | 2/2010 |
| WO | WO 2010039246 A1 | 4/2010 |
| WO | WO 2010116441 A1 | 10/2010 |
| WO | WO 2010138994 A1 | 12/2010 |
| WO | WO 2011112022 A2 | 9/2011 |
| WO | WO 2012153529 A1 | 11/2012 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013088238 A2 | 6/2013 |
| WO | WO 2013105920 A2 | 7/2013 |
| WO | WO 2013175596 A1 | 11/2013 |
| WO | WO 2014068992 A1 | 5/2014 |
| WO | WO 2014075103 A1 | 5/2014 |
| WO | WO 2014113093 A1 | 7/2014 |
| WO | WO 2014132258 A1 | 9/2014 |
| WO | WO 2014134996 A1 | 9/2014 |
| WO | WO 2014156465 A1 | 10/2014 |
| WO | WO 2014170773 A2 | 10/2014 |
| WO | WO 2014182788 A2 | 11/2014 |
| WO | WO 2014182788 A3 | 11/2014 |
| WO | WO2014194061 A2 | 12/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015130902 A1 | 9/2015 |
| WO | WO 2015161323 A1 | 10/2015 |
| WO | WO 2016024869 A1 | 2/2016 |
| WO | WO 2016048512 A1 | 3/2016 |
| WO | WO 2016088261 A1 | 6/2016 |
| WO | WO 2016187357 A1 | 11/2016 |
| WO | WO2021094930 A1 | 5/2021 |

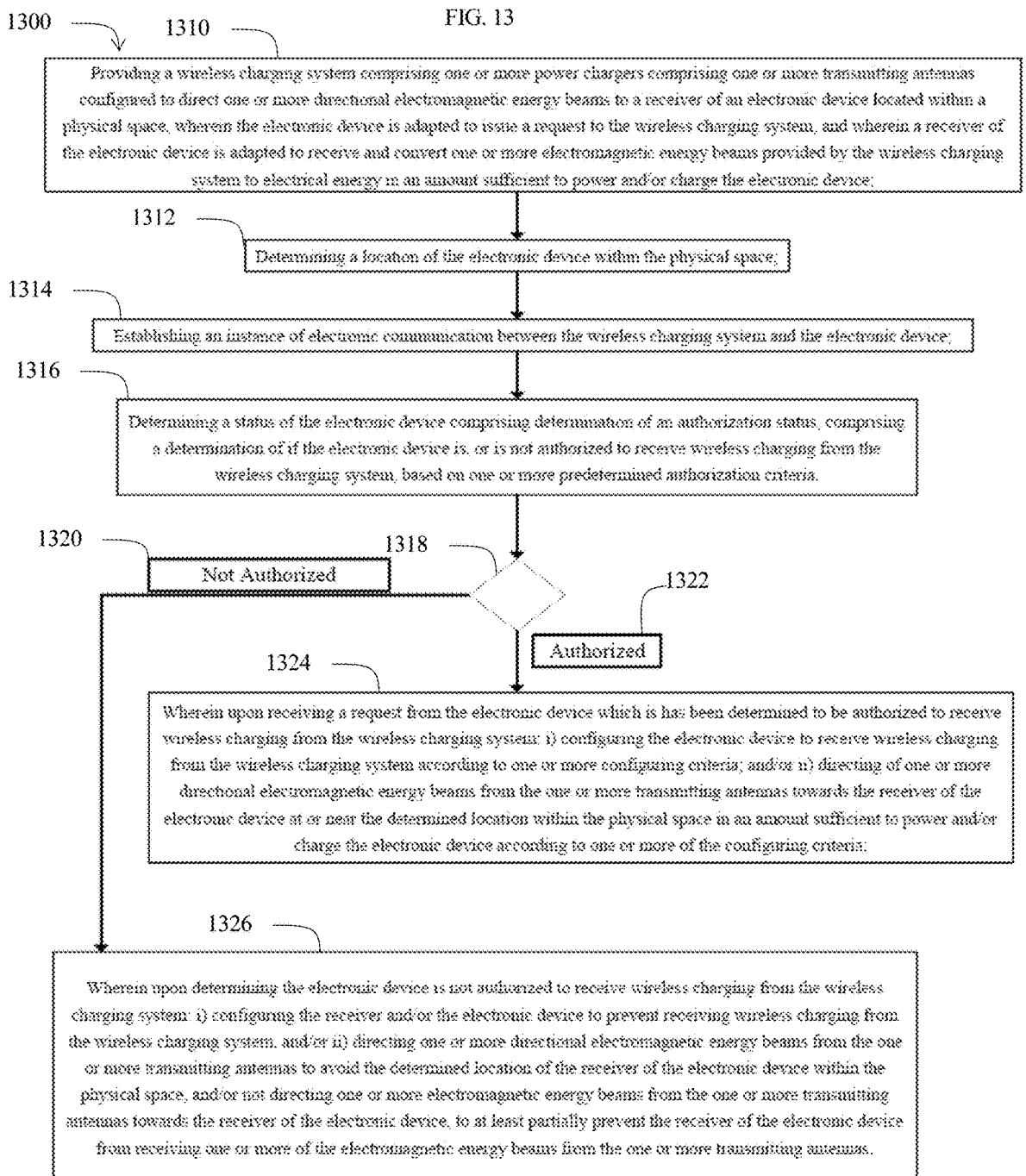

WIRELESS CHARGING METHOD AND SYSTEM

CROSS REFERENCE TO RELATED APPLICATIONS

For purposes of US practice, the present application is a Continuation in Part of U.S. patent application Ser. No. 17/163,001, filed Jan. 29, 2021; a Continuation in Part of U.S. patent application Ser. No. 17/033,824, filed Sep. 27, 2020; a Continuation in Part of U.S. patent application Ser. No. 17/019,312, filed Sep. 13, 2020; a Continuation in Part of U.S. patent application Ser. No. 16/482,347, filed Jul. 31, 2019, now U.S. Pat. No. 10,992,158 issued Apr. 27, 2021, which is a 35 U.S.C. § 371 National Stage patent application of International Pat. App. PCT/US18/15625, filed on Jan. 28, 2018, which is a Continuation in Part of U.S. patent application Ser. No. 15/640,574, filed Jul. 2, 2017, now U.S. Pat. No. 9,985,465 issued May 29, 2018, all of which claim priority to U.S. Provisional Pat. App. 62/506,737, filed May 16, 2017. The disclosures of all the above patents, provisional applications and non-provisional patent applications are hereby incorporated herein by reference.

BACKGROUND

This invention relates to a wireless charging method and system for charging an electronic power-consuming device. An Internet Of Think (IoT) device, a home appliance, remote sensor embedded in concrete, and other hard to reach places such as underground and space.

Use of the electromagnetic spectrum, such as microwave, light, laser and/or radio frequency (RF) technologies are beginning to enable transformative changes in our society via innovations such as wireless communication, radio wave sensing and wireless power transfer. In relation to the power needs of mobile devices, electromagnetic RF technologies offer a new vision of wirelessly powered world. This can be realized through a wireless power transmission grid, which could be applied for a range of applications from traditional mobile phones to wearable health and fitness devices, implantable devices, and other Internet of Things (IoT) type devices. This vision is specially becoming true on account of ever reducing power usage of modern electronics and innovations in rechargeable batteries.

Because of the growth of mobile computing and wearables, the demand for wireless sources of power is increasing for the scenarios where cable-based charging is not feasible or where the issue of battery depletion and replacement exists. Among wireless approaches, magnetic near-field wireless charging is popular, but the wireless charging distances are limited to a few centimeters. For a most ergonomic use and daily life convenience, wireless charging up to several feet is necessary. This is where the radiative near-zone and far zone charging methodologies are becoming mainstream while using the open ISM frequency bands and adhering to the power limits in accordance with FDA and FCC guidelines. A second issue is charging during significant misalignment between the source and device receiver, providing a wider region of charging, as compared to specific hot-spot charging. This can be seen as a significant step in achieving a practical wireless power grid.

Power charging requirements of commercially available phones are significant. Typically, an electronic smartphone battery requires power level between 20 mW and 1.3 W, which is significantly higher than the power consumed by the sub-mW sensor nodes, and other IoT devices. There is a need in the art for an efficient wireless powering solution to power and/or recharge a device within several feet of the charging station and which follows the device upon movement.

SUMMARY

In one aspect, a wireless charging system, comprises a system controller in electronic communication with at least one base charger coupled to a power source, and at least one transmitting antenna or transceiver, the wireless charging system configured to determine a location of at least one device receiver located within a physical space and to provide wireless energy delivery comprising directing one or more directional electromagnetic energy beams from at least one transmitting antenna to the location of the device receiver at a distance greater than or equal to 50 cm from the transmitting antenna. Each device receiver is configured to receive and convert one or more of the directional electromagnetic energy beams into electrical energy and store at least a portion of this electrical energy in an intermediary electrical storage device, and to direct electrical energy from the intermediary electrical storage device to a connected electronic device in electrical connection with the device receiver, to charge and/or power the connected electronic device.

In another aspect, a method comprises the steps of providing a wireless charging system according to one or more embodiments disclosed herein, determining a location of the device receiver within the physical space; establishing bidirectional electronic communication between the wireless charging system and the device receiver; determining if the electronic device is, or is not authorized to receive wireless energy from the wireless charging system based on one or more predetermined authorization criteria; upon receiving a request from the electronic device and/or receiving a request from a device receiver in electrical connection with the electronic device, which has been determined to be authorized to receive wireless charging from the wireless charging system: i) configuring the device receiver to receive the one or more directional electromagnetic energy beams from the wireless charging system according to one or more configuring criteria; ii) directing one or more directional electromagnetic energy beams from the one or more transmitting antennas towards the device receiver of the electronic device at the determined location within the physical space; iii) the device receiver receiving and converting one or more of the directional electromagnetic energy beams into electrical energy and storing at least a portion of the electrical energy in an intermediary electrical storage device; and iv) directing the electrical energy from the intermediary electrical storage device to the connected electronic device in electrical connection with the device receiver, to charge and/or power the connected electronic device; wherein upon receiving a request from the electronic device and/or receiving a request from a device receiver in electrical connection with the electronic device which has been determined not to be authorized to receive wireless charging from the wireless charging system i) configuring the device receiver to prevent receiving of the one or more directional electromagnetic energy beams from the wireless charging system according to one or more configuring criteria; and/or ii) configuring the charging system to prevent directing one or more directional electromagnetic energy beams from the one or more transmitting antennas towards the device receiver of the electronic device at the determined location within the physical space; and/or iii) configuring the device receiver to prevent the directing of electrical energy from the intermediary electrical storage device to the connected electronic device in electrical connection with the device receiver.

BRIEF DESCRIPTION OF THE DRAWINGS

A wide variety of potential practical and useful embodiments will be understood through the following detailed description of various embodiments, with reference to the accompanying drawings in which:

FIG. 13 is a flowchart of an authorization method according to an embodiment disclosed herein;

DETAILED DESCRIPTION

Figure 1:
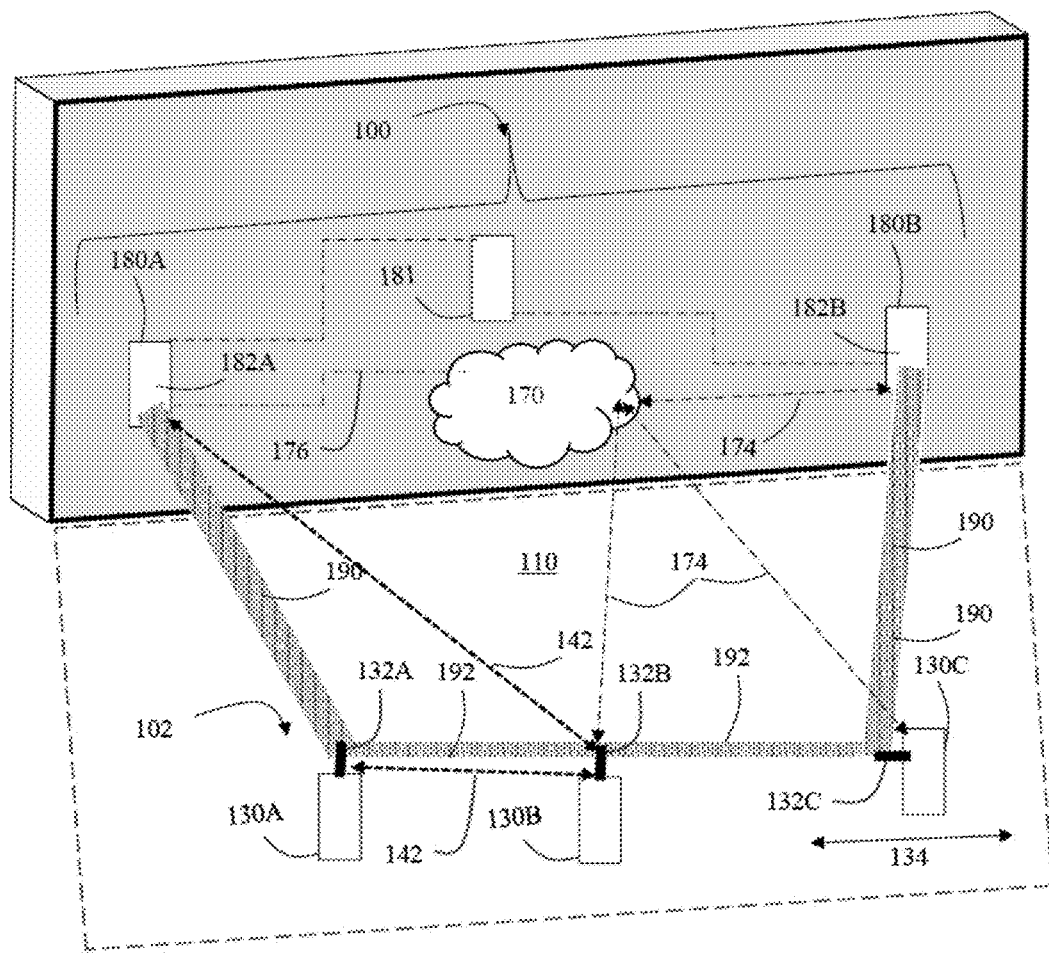
FIG. 1 is a block diagram of a system according to an embodiment disclosed herein.

At the outset, it should be noted that in the development of any such actual embodiment, numerous implementation-specific decisions must be made to achieve the developer's specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of this disclosure. In addition, the article, construction, and/or system used/disclosed herein can also comprise components other than those cited.

In the summary and this detailed description, each numerical value should be read once as modified by the term "about" (unless already expressly so modified), and then read again as not so modified unless otherwise indicated in context.

For purposes herein, embodiments or a portion of an embodiment are described as "having," "including" or "comprising" one or more limitations for brevity. However, it is to be understood that for purposes herein, that same sentence is intended to, and should be read again as being modified to include an embodiment described as "consisting essentially" of the one or more limitations, and should be read again as being modified to include an embodiment described as "consisting" of the one or more limitations.

Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specifically, it is to be understood that inventors appreciate and understand that any and all data points within the range are to be considered to have been specified, and that inventors possessed knowledge of the entire range and all points within the range.

It is to be understood that various embodiments of the present disclosure will be described with reference to the accompanying drawings. Accordingly, those of ordinary skill in the art will recognize that modifications, equivalents, and/or alternatives of the various embodiments described herein can be made without departing from the scope and spirit of the present disclosure. With regard to description of drawings, similar components may be marked by similar reference numerals.

For purposes herein, expressions such as, "A or B" represents an alternative selection which, for example, refer to the case (1) where A is included or (2) where B is included, but does not represent the case where both A and B are included. Expressions such as, "A and/or B," "at least one of A and/or B", "one or more of A and/or B", and the like, refer to a case which may include any and all combinations of one or more of the associated listed items. For example, the terms "A and/or B", and "at least one of A or B" may refer to the case (1) where A is included, (2) where B is included, or (3) where both A and B are included.

Terms such as "first", "second", and the like used herein may refer to various elements of various embodiments disclosed herein however, it is to be understood that these labels do not limit the elements to any particular order, amount, or importance; such terms are used only to distinguish one particular element from another element and do not limit the order and/or priority of the elements. For example, a first user device and a second user device may represent different user devices irrespective of sequence or importance. Likewise, such terms are used relative to others and do not represent absolute location, place, or order. For example, without departing from the scope of the present disclosure, a first element of one embodiment may be referred to as a second element in another embodiment, and similarly, a second element may be referred to as a first element.

Likewise, unless explicitly indicated, in a process comprising a first step and a second step, the steps may be undertaken in any order, e.g., the first step followed by the second step, or the second step followed by the first step. Stated another way, the methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It will be understood that when an element (for example, a first element) is referred to as being coupled, configured, operatively or communicatively "coupled with/to" or "connected to" another element (for example, a second element), it can be directly coupled with/to or connected to the other element or an intervening element (for example, a third element or more) may be present between the two elements disclosed. For example, if object A physically touches object B, and object B touches object C, then objects A and C may still be considered coupled to one another—even if they do not directly physically touch each other. Stated another way, a first object may be coupled to a second object even though the first object is never directly physically in contact with the second object.

As used herein, the expression "configured to" used herein may be used interchangeably with, for example, the expression "suitable for", "having the capacity to", "designed to", "adapted to", "made to", or "capable of". The term "configured to (or set to)" does not mean only "specifically designed to" in hardware. Instead, the expression "a device configured to" may mean that the device is "capable of" operating together with another device or other components. For example, an "electronic memory assembly" configured to (or set to) store data for subsequent retrieval, refers to any such memory module or modules, with the associated circuitry, power source, and programming which render it capable of performing the corresponding operation of storage and retrieval utilizing a generic-purpose processor (e.g., a central processing unit (CPU) or an application processor) which may perform corresponding operations by executing one or more software programs which are stored on the memory device.

The various illustrative logical blocks, modules and the like described in connection with the present disclosure may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The controller and/or processor refers to a controlling system which typically includes a processor and the related circuitry and components, e.g., power source, memory, storage, processors, coprocessors, gates, relays, other integrated circuits, software, and/or the like, necessary for its function, which is operatively coupled to the other components and/or system of the device. The processor may be responsible for managing general processing, including the execution of software stored on a machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may comprise a computer-readable medium having instructions stored (and/or encoded) thereon, the instructions being executable by one or more processors to perform the operations described herein and be embodied in a computer-program product.

Computer readable medium may also include, by way of example, a carrier wave, a transmission line, and any other suitable medium for transmitting software and/or instructions that may be accessed and read by a computer or the processor. The non-transient computer readable medium may reside in the device, external to the device, or distributed across multiple entities including the device. The non-transient computer readable medium may be embodied in a computer program product. Those skilled in the art will recognize how best to implement the described functionality presented throughout this disclosure depending on the particular application and the overall design constraints imposed on the overall system.

Within the present disclosure, the word "exemplary" and/or "preferably" are used to mean "serving as an example, instance, or illustration." Any implementation or aspect described herein as "exemplary" and/or "preferably" are not necessarily to be construed as preferred or advantageous over other aspects of the disclosure in an overall limiting sense, but only in relation to specific embodiments.

Likewise, the term "aspects" does not require that all aspects of the disclosure include the discussed feature, advantage, or mode of operation.

The terms "circuit" and "circuitry" are used broadly and are intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

In various embodiments of the present disclosure, the electronic components referred to in embodiments of the device are not limited to currently known devices but may include new electronic devices suitable for the intended purpose which are subsequently produced due to the development of new technologies.

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Furthermore, "determining" may include resolving, selecting, choosing, establishing and the like. Likewise, "controlling" encompasses a wide variety of actions, the totality of which results in the functioning of the device for the intended purpose.

For purposes herein, a network refers to two or more network devices coupled, which is referred to herein as "electronic communication" so that signal communications, such as in the form of signal packets, for example, may be exchanged, such as between a server and a client device and/or other types of devices, including between wired devices, wireless devices and/or the like. Unless indicated otherwise, this term (these terms) are used according to their plain and common understanding in the art.

For purposes herein, devices that are "electrically coupled," in "electric communication" or "electrical communication," indicate a circuit or path in which electrical energy (current) may flow from one to another. For example, the wireless charging system of the instant application is in electric communication with a power source when power is supplied via wires or conductors, e.g., "plugged in." Electric communication may be differentiated from "electronic communication," in that electronic communication involves the transfer of data between two entities, whereas electric communication involves the transfer of electrical power between two entities. The two are not mutually exclusive in that two entities may be in both electronic communication and electric or electrical communication at the same time.

For purposes herein, a cellular network refers to a radio network distributed through cells where each cell includes a fixed location transceiver known as base station. These cells together provide radio coverage over geographical areas. Unless indicated otherwise, this term (these terms) are used according to their plain and common understanding in the art.

As used herein, a local area network (LAN) refers to a collection of devices connected together in one general location, and is not limited in size or scale. A wide area network WAN, also referred to as a metropolitan area network MAN, which covers a larger geographic areas relative to a LAN, and may include any number of LANs. Unless indicated otherwise, these terms are used according to their plain and common understanding in the art.

For purposes herein, an electronic device may include a suitable device receiver, or may be equipped or otherwise associated with a suitable device receiver according to embodiments disclosed herein, e.g., a WiGL device receiver. For example, the WiGL device receiver may be integral to a device and/or may be a dongle or other externally attachable attachment to the electronic device. Unless specified, reference to the electronic device is used interchangeably with the device receiver, e.g., the WiGL device receiver.

For clarity, the following terms should be interpreted according to their plain and common meaning as is readily understood by one of skill in the art, consistent with the following supplemental explanations.

For purposes herein, an "ad hoc" network refers to a network, which may include a data network, a power network, or both, that forms substantially without prior preparation.

For purposes herein, a directional electromagnetic energy beams refers to a ray or plurality of rays of electromagnetic radiation energy having a general direction and width. It is to be understood that reference to a directional electromagnetic energy beam does not refer to, and is in contrast to power transmission signals made up of power transmission waves, in one or more trajectories by manipulating the phase, gain, and/or other waveform features of the power transmission waves, and/or by selecting different transmit antennas in which the underlying power transmission waves converge at a location in space, resulting in certain forms of interference, one form being "constructive interference," formed by a field of energy caused by the convergence of the power transmission waves such that they add together and strengthen the energy concentrated at that location establishing a field of energy, or "pocket of energy" at that relative location, and another being "destructive interference" wherein the waves subtract from each other and diminish the energy concentrated at that location.

For purposes herein, a secondary directional electromagnetic energy beam refers to a directional electromagnetic energy beam transmitted from one transmitter and/or transceiver equipped device receiver to another device receiver.

As used herein, WiGL refers to wireless power grid local area network. A WiGL routing policy refers to a system of defined rules embodied in machine instructions and/or software and/or hardware configured to make and/or guide decisions in transferring wireless energy via directional electromagnetic energy beams to electronic devices.

A WiGL routing table refers to a data structure of defined rules accessible by machine instructions and/or software and/or hardware configured to make and/or guide decisions in transferring energy via directional electromagnetic energy beams to electronic devices.

For purposes herein, peer-to-peer directional wireless power distribution refers to a device receiver of the wireless charging system further equipped with either a transmitter or a transceiver and is configured to direct at least one secondary directional electromagnetic energy beam from a first device receiver towards a determined location of at least one second device receiver.

For purposes herein, a meshed ad hoc wireless power grid local area network refers to a local network topology in which the infrastructure nodes connect directly, dynamically, and non-hierarchically to as many other nodes as possible and cooperate with one another to efficiently route power, or power and data between the base charger and the various clients or nodes on the network.

It is to be understood that reference to a wireless charging system herein also, and simultaneously refers to a wireless power system and/or a wireless power delivery system. Accordingly, although reference is made to a wireless charging system, the system may also deliver power which is utilized to directly power the device subject to the limitations of the system and device receiver e.g., power is received and directed through the intermediary electrical storage device directly to power the attached electronic device.

For purposes herein, it is to be understood that reference to bidirectional electronic communication between any two components of the wireless charging system and/or any component of the wireless charging system and a device receiver, or other outside system or service, may include direct electronic communication, i.e., the component(s) is/are configured for direct electronic communication with the other entity, and/or the component is in electronic communication with the other entity vis-à-vis one or more transmitters, device receivers, and/or transceivers coupled to the wireless charging system, which may further include the system controller.

In embodiments, a wireless charging system, comprises a system controller in electronic communication with at least one base charger coupled to a power source, and at least one transmitting antenna, the wireless charging system configured to determine a location of at least one device receiver located within a physical space and to provide wireless energy delivery comprising directing one or more directional electromagnetic energy beams from at least one transmitting antenna to the location of the device receiver at a distance greater than or equal to 50 cm from the transmitting antenna in which each device receiver is configured to receive and convert one or more of the directional electromagnetic energy beams into electrical energy and store at least a portion of the electrical energy in an intermediary electrical storage device, and to direct electrical energy from the intermediary electrical storage device to a connected electronic device in electrical connection with the device receiver, to charge and/or power the connected electronic device.

In some embodiments, the device receiver is configured to be removably electrically connected to the electronic device via a disengageable connecter. Examples include various USB connectors, lightning connectors, and the like, but may also include wireless short-range connectors based on magnetism, induction, and the like, effective at a distance of less than about 10 cm.

In some embodiments, the system controller is configured to update the location of the device receiver within the physical space and upon motion of the device receiver within the physical space, update the location of the device receiver and direct one or more directional electromagnetic energy beams from the at least one transmitting antenna of the base charger toward the updated location of the device receiver.

In embodiments, the wireless charging system further comprises peer-to-peer power transmission, wherein each device receiver further comprises a transmitter and/or a transceiver in electronic communication with a device receiver controller, configured to direct at least one secondary directional electromagnetic energy beam from a first device receiver towards a determined location of at least one second device receiver utilizing a least a portion of the energy stored in the intermediary electrical storage device of the first device receiver, independent of a status of the electronic device in electrical communication with the first device receiver, the second device receiver, or both, the second device receiver configured to receive and convert one or more of the secondary directional electromagnetic energy beams into electrical energy and store at least a portion of the electrical energy in a corresponding intermediary electrical storage device of the second device receiver, and to direct electrical energy from the intermediary electrical storage device of the second device receiver to a corresponding attached second electronic device to charge and/or power the attached second electronic device.

In some of such embodiments, the system is configured to form a meshed ad hoc wireless power grid local area network comprising directional base charger-to-device receiver power distribution, and peer-to-peer directional wireless power distribution, in which each of the device receivers and the base chargers present are nodes of the meshed network.

In one or more embodiments, the system controller and/or the base charger and the device receiver are in bidirectional electronic communication, and wherein the system controller is configured to determine a status of the device receiver and/or the electronic device in electrical communication with the attached device receiver. In some of such embodiments, the bidirectional electronic communication comprises a local area data network; an ad-hoc data network; a meshed network, a wide area data network; a wireless computer network; a wired computer network; the internet; a radio data network; a cellular data network; a cellular data network provided at least in part by the electronic device; a meshed ad hoc wireless power grid local area network; or a combination thereof.

In some of such embodiments, the determined status comprises an authorization status, comprising a determination according to one or more authorization criteria of if (whether or not) the electronic device is, or is not authorized to receive wireless energy from the wireless charging system. In some embodiments, the authorization criteria comprises an authorization key; a lookup table; an identifier unique to the device receiver; an identifier unique to the electronic device; a user account; a service subscription; a prepaid subscription; a blockchain permission; a blockchain transaction; or any combination thereof. In some embodiments, the wireless charging system is further configured to cause the electronic device to present an indication perceivable by an end user of the electronic device indicating the authorization status of the electronic device. In one or more embodiments, the system is further configured such that when the determination of the authorization status results in the electronic device not being authorized to receive wireless energy from the wireless charging system, the indication perceivable by the end user allows the end user to change the authorization status of the electronic device. In one or more embodiments, the end user changing the authorization status of the electronic device comprises a financial transaction. In some embodiments in which the end user changes the authorization status of the electronic device, the system is configured to cause, and/or the action comprises a cryptocurrency financial transaction, a blockchain financial transaction, or a combination thereof.

In one or more embodiments, the wireless charging system is configured such that when the determination of the authorization status results in the electronic device is not authorized to receive wireless energy from the wireless charging system, the device receiver is configured to prevent the intermediary electrical storage device from directing electrical power to the electronic device in electrical connection with the device receiver.

In one or more embodiments, wherein the determining of the authorization status results in a determination that the electronic device is authorized to receive wireless energy from the wireless charging system, the device receiver is configured to receive the one or more directional electromagnetic energy beams from the wireless charging system according to one or more configuring criteria, which in one or more embodiments, the configuring criteria includes a time stamp; a level of charge of the electronic device (attached to the device receiver); an identification variable specific to the electronic device; a power requirement of the electronic device; a predetermined criterion; or a combination thereof.

In embodiments, the device receiver is configured to request wireless energy delivery from the wireless charging system based at least in part on a level of charge of the connected electronic device. In some embodiments, the system controller and/or the base charger and a first device receiver are in bidirectional electronic communication, wherein the first device receiver and the second device receiver are in bidirectional electronic communication with each other, wherein the system controller and/or the base charger is in bidirectional electronic communication with the second device receiver through the first device receiver, or a combination thereof. In some of such embodiments, the base charger is configured to determine if the second electronic device in electrical communication with the second device receiver is, or is not, authorized to receive wireless energy from the wireless charging system based on one or more predetermined criteria. In some of such embodiments, the first device receiver is configured such that when the determination of the authorization status results in the first electronic device not being authorized to receive wireless charging from the wireless charging system, the first device receiver is configured to prevent the intermediary electrical storage device of the first device receiver from directing power to the first electronic device in electrical communication with the first device receiver; and direct at least one secondary directional electromagnetic energy beam toward a determined location of the second device receiver utilizing a least a portion of the electrical energy stored in the intermediary electrical storage device of the first device receiver. Stated another way, in embodiments, an unauthorized device may still be configured to receive power and direct that power into the intermediary electrical storage device of the device receiver of the unauthorized device, and then utilize that stored energy to deliver power to another device i.e., as a node of a meshed ad hoc wireless power grid local area network which may be an authorized device or which may be another unauthorized device that again relays a portion of the power to another device receiver, which may be repeated until the power is finally received by an authorized device or to store energy for a device until the device becomes authorized to receive the power.

In one or more embodiments, a method comprises the steps of:
i) providing a wireless charging system according to one or more embodiments disclosed herein, e.g., a system controller in electronic communication with at least one base charger coupled to a power source, at least one transmitting antenna, the wireless charging system configured to determine a location of at least one device receiver located within a physical space and to provide wireless energy delivery comprising directing one or more directional electromagnetic energy beams from at least one transmitting antenna to the location of the device receiver at a distance greater than or equal to 50 cm from the transmitting antenna; the device receiver configured to receive and convert one or more of the directional electromagnetic energy beams into electrical energy and store at least a portion of the electrical energy in an intermediary electrical storage device, and to direct electrical energy from the intermediary electrical storage device to a connected electronic device in electrical connection with the device receiver, to charge and/or power the connected electronic device; and
ii) determining a location of the device receiver within the physical space;
iii) establishing bidirectional electronic communication between the wireless charging system and the device receiver;
iv) determining if the electronic device is, or is not authorized to receive wireless energy from the wireless charging system based on one or more predetermined authorization criteria; and
v) upon receiving a request from the electronic device and/or receiving a request from a device receiver in electrical connection with the electronic device, which has been and/or which is determined to be authorized to receive wireless charging from the wireless charging system:
  v-a) configuring the device receiver to receive the one or more directional electromagnetic energy beams from the wireless charging system according to one or more configuring criteria;
  v-b) directing one or more directional electromagnetic energy beams from the one or more transmitting antennas towards the device receiver of the electronic device at the determined location within the physical space;
wherein the device receiver is configured to receive and convert one or more of the directional electromagnetic energy beams into electrical energy and stores at least a portion of the electrical energy in an intermediary electrical storage device; and
vi) directing the electrical energy from the intermediary electrical storage device to the connected electronic device in electrical connection with the device receiver, to charge and/or power the connected electronic device.

In an embodiment the method further comprises the step of:
vii) upon receiving a request from the electronic device and/or receiving a request from a device receiver in electrical connection with the electronic device which has been or is determined not to be authorized to receive wireless charging from the wireless charging system:
  vii-a) configuring the device receiver to prevent receiving of the one or more directional electromagnetic energy beams from the wireless charging system according to one or more configuring criteria; and/or
  vii-b) configuring the charging system to prevent directing one or more directional electromagnetic energy beams from the one or more transmitting antennas towards the device receiver of the electronic device at the determined location within the physical space; and/or vii-c) configuring the device receiver to prevent the directing of electrical energy from the intermediary electrical storage device to the connected electronic device in electrical connection with the device receiver.

In one or more embodiments of the method, wherein upon receiving a request from the electronic device and/or a device receiver connected to the electronic device, which has been or is determined to be authorized to receive wireless charging from the wireless charging system, the method further comprises:

I) configuring one or more other device receivers to direct one or more secondary directional electromagnetic energy beams towards the determined location of the device receiver within the physical space;

II) the device receiver configured to receive and convert one or more of the secondary directional electromagnetic energy beams into electrical energy and store at least a portion of the electrical energy in an intermediary electrical storage device; and III) directing the electrical energy from the intermediary electrical storage device to the connected electronic device in electrical connection with the device receiver, to charge and/or power the connected electronic device;

In one or more embodiments of the method, wherein upon receiving a request from the electronic device and/or a device receiver connected to the electronic device, which has been or is determined not to be authorized to receive wireless charging from the wireless charging system:

I) configuring the device receiver to prevent receiving of the one or more secondary directional electromagnetic energy beams from one or more other device receivers according to one or more configuring criteria; and/or II) configuring the device receiver to prevent the directing of electrical energy from the intermediary electrical storage device to the connected electronic device in electrical connection with the device receiver.

The Wireless Charging System

In embodiments, the wireless charging system according to one or more embodiments herein comprises a system controller in electronic communication with at least one base charger. It is to be understood that the system controller and the at least one base charger may be separate components, or may be integrated components, or partially integrated components that may, in embodiments, provide at least some of the same functions. The system controller and/or the base charger are coupled to a power source and at least one transmitting antenna. The wireless charging system is configured e.g., via the system controller, to determine a presence and location of at least one device receiver located within a physical space and to provide wireless energy delivery to the device receiver comprising directing one or more directional electromagnetic energy beams from at least one transmitting antenna to the location of the device receiver at a distance greater than is suitable for an inductive, magnetic, or otherwise "close proximity" charging system, e.g., greater than is possible or equal to about 10 cm, or about 20 cm, or about 30 cm, or about 40 cm, or 50 cm from the transmitting antenna.

For purposes herein it is to be understood that reference to electronic communication between the wireless charging system and the device receiver may include direct electronic communication between the wireless charging system and the device receiver, direct electronic communication between the wireless charging system and the electronic device associated with the device receiver, electronic communication between the wireless charging system and the electronic device associated with the device receiver through the associated device receiver, electronic communication between the wireless charging system and a second device receiver through one or more first device receivers (peer-to-peer communication), or any combination thereof.

The base charger is configured to transmit directional electromagnetic energy beams which are receivable by the device receivers, and which may be received by the device receivers, and the power harvested by the device receivers, at least a portion of which is then converted into a useable source of electrical energy for associated electronic devices and/or at least a portion of which may be utilized for operation of the device receivers and various systems thereof.

The entire wireless charging system is in electrical communication with a power source which may include so called line current e.g., from a power grid, or from a generator solar cell, battery, and/or any other suitable portable energy/power source.

The wireless charging system may also transmit data to, and receive data or other forms of electronic communication from one or more device receivers associated with one or more corresponding electronic or electrically powered devices, an electronic device associated with a device receiver. In embodiments, the wireless base charging system may further include one or more electronic communication (network) components and be in wireless and/or wired electronic communication with one or more of the device receiver, one or more the actual electronic devices associated with a device receiver, as well as various other networks including wireless and/or wired LANs, the internet, intranets, and/or the like. In embodiments, one or more of the system components may also be in wireless or wired electronic communication with other components of the system, e.g., a first of a plurality of base charger may be in wired or wireless electronic communication with another base charger of the same system. In such embodiments, the system controller may be further coupled to one or more transmitters and/or transceivers configured to transmit data to, and receive data or other forms of electronic communication from other electronic devices, as well with other wireless charging systems, other data management systems, databases, managers, service systems, components, and/or the like, as disclosed herein.

Although several of the embodiments mentioned below describe the directing of the directional electromagnetic energy beams as radio frequency (RF) waves, it should be appreciated that the directional electromagnetic energy beams may be physical media that is capable of being propagated through space, and that is capable of being converted into a source of electrical energy regardless of the electromagnetic spectrum used. The transmitter transmits the power as one or more directional electromagnetic energy beams directed at the device receiver(s). In embodiments, one or more transmitters may transmit a plurality of directional electromagnetic energy beams towards a single device receiver.

In addition to RF wave transmission techniques, the transmitters may transmit any type of energy which may be converted into electrical power. Non-limiting exemplary transmission techniques for energy that can be converted by a receiving device into electrical power include ultrasound, microwave, resonant and inductive magnetic fields, laser light, infrared, or other forms of electromagnetic energy which may be transmitted as directional electromagnetic energy beams. In addition, the transmitter unit of a base charger may comprise multiple transmitters (e.g., a transmit array), both for RF transmission of power and for other power transmission methods. The base charger may include a plurality of transmit arrays and/or may comprise multiple transmitters that are physically separated from one-another about a physical space, and/or may be located in a single structure.

In embodiments, the wireless charging system is configured to determine the presence of a device receiver and/or an electronic device within the 3D space reachable by the wireless charging system, and also determine the location of the device receiver without requiring any action on the part of the device receiver. This may include utilizing one or more proximity detectors, sensors, algorithms, and the like, which may be physical devices, or which may be virtual devices or software that utilize the transmitters (and/or transceivers) and device receivers of the wireless charging system, or any combination thereof.

In some embodiments, the wireless charging system may be configured to scan and/or query a device receiver's broadcasting advertisement signals or a device receiver may transmit an advertisement signal to the transmitter. The advertisement signal may announce the device receiver's presence to the transmitter and/or the transmitter may announce its presence to the device receiver. Upon determining a presence of the device receiver within the 3D space reachable by the wireless charging system, an association between the device receiver and the wireless charging system may be triggered e.g., an association between the wireless charging system controller and/or base station and the device receiver.

In one or more embodiments, the advertisement or other signal may communicate information that may be used by various devices (e.g., system controller, base chargers, client devices, sever computers, managers, other device receivers, and the like) to execute and manage the delivery and directing of the one or more directional electromagnetic energy beams from at least one transmitting antenna to the location of the device receiver.

Information contained within the advertisement or other communication signal may include a device identifier (e.g., MAC address, IP address, UUID), the voltage of electrical energy received, a client device power consumption, a request from the device for power from the wireless charging system, an authorization status, user or device account information, the type and capability of the device receiver and/or the associated electronic device to receive the one or more directional electromagnetic energy beams, pairing information, information directed to the location of the device receiver, changes of location and/or movement of the device receiver, and/or other types of data related to the delivering of wireless energy to the device, and reception of the energy by the electronic device.

Once the location of the device receiver is identified, and a need for power is established, e.g., based on a request for power by the device receiver or the device attached to the device receiver, and/or from another device receiver via peer-to-peer wireless power transmission, or any combination thereof, if not present, the wireless power charging system may establish electronic communication with the device receiver, and/or configure the device receiver to receive one or more directional electromagnetic energy beams, and/or communicate control signals over one or more communication channels, and begin directing one or more directional electromagnetic energy beams from at least one transmitting antenna to the location of the device receiver.

In embodiments, the wireless charging system is further configured to utilize information contained in a device receiver's advertisement and/or request signal, or in subsequent control signals and other electronic communication received from the device receiver, to determine how and where to direct the one or more directional electromagnetic energy beams to the device receiver so that the device receiver may receive, harvest, and utilize the power in the most efficient way.

In embodiments, the wireless charging system comprises a processor or data processing system configured to execute software modules capable of automatically identifying the power transmission signal features needed to deliver one or more directional electromagnetic energy beams to the device receiver based at least in-part on information received from the device receiver, such as the voltage and/or current produced by the electrical energy harvested by the device receiver from the one or more directional electromagnetic energy beams. It should be appreciated that the functions of the processor and the software modules may also be implemented at least in part by Application Specific Integrated Circuits (ASIC), or a system comprising the same.

Once the wireless charging system determines the location and appropriate parameters to use when transmitting the one or more directional electromagnetic energy beams, and the device receiver is configured to receive and harvest power from the one or more directional electromagnetic energy beams, the system is configured to utilize one or more transmitters to begin and/or maintain the directing of one or more directional electromagnetic energy beams to the location of the device receiver, which may be over a separate channel from the channel over which the bidirectional electronic communication is established (e.g., utilized for communication of various control signals).

In embodiments, the device receiver may generate control data containing information indicating the effectiveness of the directing of the one or more directional electromagnetic energy beams by the wireless charging system, e.g., the amount of power being harvested by the device receiver. The device receiver may then transmit or otherwise engage in bidirectional electronic communication with the wireless charging system to transmit and receive various control signals containing control data and the like.

In an embodiment, the wireless charging system may automatically detect a presence and a location of a device receiver within a 3D space at a distance greater than or equal to 50 cm from the transmitting antenna and without receiving a request from a device receiver, automatically direct one or more directional electromagnetic energy beams to the location of the device receiver and/or establish electronic communication with the device receiver. The wireless power device receiver may then power or charge electrically connected electronics devices such as client device.

In embodiments, a base charger may power multiple device receivers simultaneously. In embodiments, a plurality of base chargers may direct power to the same device receiver. In embodiments, the base charger may direct a plurality of different types of directional electromagnetic energy beams, e.g., at different frequencies, and/or using different configurations, from one or more transmitting antenna to a device receiver to increase the amount of power that may be harvested by the device receiver.

In embodiments, the wireless charging system is configured to determine a location of at least one device receiver located within a physical space proximate to the transmitter. It is to be understood that this device receiver is not necessarily within close proximity to the wireless charging system, e.g., 10 cm or less as is required by inductive or magnetic near field charging systems, but instead may be located beyond the distance required by near-field charging systems (i.e., the distance at which near-field—inductive power systems are operative). In embodiments, the device receiver may be located at least 20 cm away from a wireless power charging system transmitter, or at least 30 cm, or at least 40 cm, or at least 50 cm, or at least 60 cm, or at least 70 cm, or at least 80 cm, or at least 90 cm, or at least 100 cm, or at least 200 cm, or at least 300 cm, or at least 400 cm, or at least 500 cm, or at least 1000 cm, or at least 2000 cm, or at least 5000 cm, from the wireless base charging system, and is limited only by the amount of power that may be transmitted and the environment of the 3D space.

The wireless charging system may then establish a connection or otherwise associates with a device receiver. That is, in some embodiments, wireless base charging system and/or the system controller and the device receiver(s) may establish wireless unidirectional or bidirectional communication over which various control data is communicated between the two devices over a wireless communication protocol capable of transmitting information between two processors of electrical devices (e.g., Bluetooth®, Bluetooth Low Energy (BLE), Wi-Fi, NFC, ZigBee®). In embodiments, using for example a Bluetooth® or Bluetooth® variant, these data may be used by the base charger to determine the location of the device receiver.

The wireless charging system wireless provides power to the device receiver, which in an embodiment is the result of a request for power from the intended receiver/device, and then to the associated electronic device by directing one or more directional electromagnetic energy beams from at least one transmitting antenna to the location of the device receiver.

In embodiments, the wireless charging system forms a wireless power grid local area network comprising one or more base chargers directing one or more directional electromagnetic energy beams to device receivers, in which each of the device receivers and base chargers present are nodes of a network. In some embodiments the wireless charging system forms a wireless power grid local area network comprising a peer-to-peer directional wireless power distribution meshed local area network, in which each of the device receivers and base chargers present are nodes of the meshed network, and/or which may be a meshed ad hoc wireless power grid local area network comprising base charger-too-device receiver power distribution and device receiver-too-device receiver power distribution, in which each of the device receivers and base chargers present are nodes of the meshed wireless power grid local area network.

In some embodiments, the electronic communication includes data inputs used by the various antenna elements responsible for controlling production and transmission/directing of the directional electromagnetic energy beams. This may include various data signals produced by the device receiver. The electronic communication may be by way of various protocols capable of communicating data between processors, such as Bluetooth®, RFID, infrared, near-field communication (NFC), IEEE 802 standards, "fog" computing standards, edge computing standards, and the like. Such electronic communication may include information between the transmitter and the device receiver used to adjust the power transmission, provide information related to status, efficiency, user data, power consumption, billing, geo-location, authorization, or other status, and/or other types of information.

The bidirectional communication between the wireless charging system and the device receiver may use one or more advertisement or other signals to determine a set of power transmission signal features for transmitting one or more directional electromagnetic energy beams from at least one transmitting antenna to the location of the device receiver thereby providing power to the device receiver. Non-limiting examples of features of directing of the directional electromagnetic energy beams may include phase, gain, timing, frequency division multiple access (multiplexing) (FDMA) parameters, code division multiple access (multiplexing) (CDMA) parameters, polarization division multiple access (multiplexing) (PDMA) parameters, time division multiple access e.g., time division multiplexing (TDMA) parameters, encryption parameters, and the like.

In embodiments, the wireless charging system may use power transmitters incorporating or configured to communications methods such as Wi-Fi, ZigBee, and LAN amongst others. Likewise, the power device receivers may include a power device receiver application and/or system comprising a BTLE API, a BTLE chip, and/or an antenna array so configured. In embodiments, one or more of the power device receiver applications may be an executable program loaded into a non-volatile memory within a device receiver, and/or may include a BTLE API enabling effective interaction between the various components. In embodiments, the antenna array is capable of harvesting power from the one or more directional electromagnetic energy beams.

Electronic Communication

In some embodiments, client devices are able to communicate user requests to the wireless charging system e.g., via the system controller, including requests to initiate charging, pause charging, end charging, authorize payment transactions, and the like.

In embodiments, the wireless charging system is configured to undergo a pairing process with one or more device receivers as is commonly understood in the art, to facilitate electronic communication. The pairing process may start when an electronic device is identified by the wireless charging system, and/or when the electronic device requests power from the system or otherwise identifies available power device receivers in a system.

In some embodiments, the signal strength of the electronic device may be capable of monitoring the location of the device receiver. In embodiments, the wireless charging system is configured to periodically monitor for the presence of device receivers and/or the location of device receiver(s), and may conduct such pairing with the device receiver when within a range of proximity suitable to perform the pairing. If one of the device receivers is within range the electronic device may proceed to check one or more databases to determine if the device receiver is already paired, authorized for receiving power, and/or the like. If the power device receiver is associated with another electronic device, the electronic device may continue to scan for power device receivers and track their proximity. If the device receiver has no associations, the wireless charging system may commence the pairing protocol. The process may include the use of timers, sensors, and/or the like to continuously monitor the location of the device receiver. In embodiments, a successful pairing of the device receiver may be recorded and/or update in a corresponding database, associating an electronic device ID with an ID of the associated device receiver. In other embodiments, the wireless charging system is configured to analyze signal strength measurements, efficiencies, usage rates, billing information, conduct analysis and/or compare it with predefined reference values. After updating the information in an internal database, the electronic device may send a copy of the updated database to the power transmitter and pairing process may end. Likewise, the wireless charging system may be configured to execute an un-pairing process wherein the link is terminated.

Base Charger

The wireless charging system further comprises one or more base chargers capable of directing one or more directional electromagnetic energy beams into 3D space to a distance of greater than 50 cm that are receivable by the device receivers. Base charges include one or more transmitters/transceivers and their associated components, systems, and the like required to direct one or more directional electromagnetic energy beams towards a location of a device receiver, e.g., in the form of an RF energy beam, e.g., a frequency modulated radio signal on a carrier frequency. The base charger further includes one or more antenna elements and may further include one or more RFICs, one or more microcontrollers, one or more communication components, and the like, in electrical connection with a power source. In embodiments, the base charger is disposed within a housing that may include all of the required components. In other embodiments, the base charger may be located in a plurality of housings, and/or may be located within another object or device, e.g., a lamp post, a television, a computer, and/or the like, which is in electrical communication with a power source. The various components of the base charger may comprise, and/or may be manufactured using, metamaterials, micro-printing of circuits, nanomaterials, and the like.

In some embodiments, the wireless charging system comprises multiple base chargers, each of which may comprise multiple transmitters for directing the directional electromagnetic energy beams from at least one transmitting antenna to the location of the device receiver. In embodiments, one or more base chargers may further include transmitters/receivers and/or transceivers configured for bidirectional electronic communication between the wireless charging system and a device receiver and/or a client device. These may be the same components utilized for directing power, and/or may be separate devices or configured differently.

In embodiments, the base charger may be configured to direct one or more directional electromagnetic energy beams at a first frequency or frequency range, and/or having a particular first configuration, at the same time direct one or more other directional electromagnetic energy beams at one or more other second frequencies or frequency ranges, and/or having a particular second configuration, to the location of the device receiver, thus allowing for an increase in the amount of power a device receiver may receive and harvest.

In embodiments, the base chargers may comprise one or more base controllers which may perform functions for, or instead of the system controller. In addition to the base charger being in electronic communication with the system controller, in some embodiments one or more base chargers may further be in electronic communication with other base chargers, other systems, managers, and/or the like.

Antenna

In one or more embodiments, the base charger includes one or more transmitting antenna elements, which may be utilized to both transmit the one or more directional electromagnetic energy beams and/or be configured for electronic communication. In embodiments, a plurality of antenna elements may be used to transmit the one or more directional electromagnetic energy beams, which may be from a single base charger or may be from multiple base chargers associated with the wireless charging system.

Antenna elements of the transmitter may use concepts of wave interference to determine certain directional electromagnetic energy beam features (e.g., direction of transmission, phase of power transmission signal wave), when transmitting the one or more directional electromagnetic energy beams including the use of constructive interference, beam steering, deconstructive interference, reflectance, and the like depending on the topography of a particular physical location.

In embodiments, the directional electromagnetic energy beams are formed and transmitted via various beamforming or spatial filtering processes in which one or more digital signals are processed for directional signal transmission and reception by the device receiver. In embodiments, this includes combining elements in an antenna array in such a way that signals at particular angles experience constructive interference while others experience destructive interference. Beamforming can be used at both the transmitting and receiving ends in order to achieve spatial selectivity. In embodiments, the directionality of the antenna array may be configured when transmitting to control the phase and/or relative amplitude of the signal at each transmitter, in order to create a pattern of constructive and destructive interference, which combine to produce a directional electromagnetic energy beam being directed to the location of the device receiver.

Suitable beamforming techniques for use herein include both conventional (fixed or switched beam techniques, adaptive beamforming techniques, e.g., phased array which may include desired signal maximization modes and/or interference signal minimization or cancellation modalities.

Examples of conventional beamformers include the Butler matrix approach which utilizes one or more fixed sets of weightings and time-delays or phasing to combine the signals in the antenna array. Other examples include delay-and-sum beamforming wherein the beam is steered by selecting appropriate phases for each of the antenna. Null-steering beamforming techniques may also be used along with frequency-domain beamforming wherein each frequency is treated as a narrowband signal, and the gains and phase shifts are separately optimized for each frequency. Beamforming may further include, and/or the directional electromagnetic energy beams may comprise multiple-input multiple-output (MIMO) coding, space-division multiple access (SDMA) coding, frequency division multiple access (FDMA) coding, time division multiple access (TDMA) coding; code division multiple access (CDMA) coding; orthogonal frequency division multiple access (OFDMA) coding; closed loop beamforming, multi-dimensional beamforming, and/or the like.

Examples of suitable adaptive beamforming techniques include multiple signal classification algorithms, iterative sparse asymptotic minimum variance algorithms, and the like, wherein information is combined with properties of the signals actually received by the array, typically to improve rejection of unwanted signals from other directions. This process may be conducted in either the time or the frequency domain.

In embodiments, adaptive beamforming is utilized which is configured to automatically adapt and respond to different situations. In embodiments, field programmable gate arrays may be employed along with the appropriate hardware and software. In embodiments, beamforming may include employing least mean squares (LMS) algorithms, maximum likelihood methods (MLM) algorithms, sample-matrix inversion (SMI) algorithms, recursive least square algorithms, conjugate gradient method algorithms, constant modulus algorithms, and/or the like.

In embodiments, the antenna may include a Digital antenna array (DAA) or other types of smart antenna, comprising multi channels digital beamforming, which may include the use of fast Fourier transform or other algorithms. In embodiments, digital signal processing may be after analog-to-digital converters of receiver channels or before digital-to-analog converters of transmission. Digital signals may be transformed and combined in parallel to produce different output signals, wherein signals energies may be adjusted depending on the location of the intended device receiver. Beam forming of directional electromagnetic energy beams may include signal processing methods, e.g., maximum likelihood beamforming wherein the noise is modeled as a stationary Gaussian white random processes while the signal waveform as deterministic (but arbitrary) and unknown; Bartlett beamforming utilizing various spectral analysis algorithms; Capon beamforming utilizing a minimum-variance distortion less response beamforming algorithm; multiple signal classification beamforming algorithms, ESPRIT algorithms, and/or the like.

Importantly, and in contrast to systems known in the art, the wireless charging system according to embodiments disclosed herein is suitable for functioning in the open, outside of a building or other structure e.g., in plain air. By virtue of directing one or more directional electromagnetic energy beams towards the determined location of the device receiver, the instant system will function to deliver substantial amounts of electrical energy to receivers without relying on the reflection of electromagnetic energy off of walls, furniture, and the like, as is required by other systems to deliver a non-trivial amount to power suitable for charging an electronic device.

In embodiments, the directional electromagnetic energy beams have a beam width of less than 360° (for a unidirectional antenna), and less than 180° for a wall mounted or planer antennas. In embodiments, the beams are dynamically adjusted according to the distance from, the base charger, and/or the direction of movement of the intended device receiver. In embodiments, the directional electromagnetic energy beams directed to the intended receiver have a beam width of less than or equal to about 60°, or 55°, or 50°, or 45°, or 40°, or 35°, or 30°, or 25°, or 20°, or 15°, or 10°, or 5°.

In one embodiment, the wireless charging system is configured to direct one or more directional electromagnetic energy beams to a device receiver, and/or for one or two way electronic communication between a transmitter/device receiver of the wireless charging system and a transmitter/device receiver of the device receiver within a frequency range, e.g., comprises antenna elements and associated circuitry, software and control systems, for operating in frequency bands from about 20 KHz to about 50 KHz, and/or from about 150 MHz to about 900 MHz, and/or from about 900 MHz to about 1.8 GHz, and/or from about 1.6 GHz to about 2.0 GHz, and/or from about 2.0 GHz to about 8.0 GHz, and/or from about 3 GHz to about 300 GHz.

In an embodiment, the wireless charging system is configured to direct one or more directional electromagnetic energy beams to a device receiver, and/or for one or two way electronic communication between a transmitter/device receiver of the wireless charging system and a transmitter/device receiver of the device receiver within a frequency range, e.g., comprises antenna elements and associated circuitry, software and control systems, for operating in frequency bands of 900 MHz, 2.5 GHz, 5.250 GHz, or 5.8 GHz.

In an embodiment, the wireless charging system is configured to direct one or more directional electromagnetic energy beams to a device receiver, and/or for one or two way electronic communication between a transmitter/device receiver of the wireless charging system and a transmitter/device receiver of the device receiver within a frequency range, e.g., comprises antenna elements and associated circuitry, software and control systems, for operating in frequency bands within the "5G" range which include low-band, mid-band or high-band millimeter-wavelengths having frequencies from about 24 GHz up to 54 GHz, and/or mid-band 5G using microwave wavelengths having frequencies from about 2.3-4.7 GHz, and/or high-band 5G wavelengths using frequencies of 24-47 GHz. These frequencies may be utilized for power transmissions, bidirectional electronic communication between the wireless charging system and a device receiver, or any combination thereof.

In any of such embodiments, the wireless charging system may be configured to direct one or more directional electromagnetic energy beams to a device receiver within a frequency range which is different from the frequency range at which the bidirectional communication between the wireless charging system and the device receiver takes place. For example, the wireless charging system may be configured to direct one or more directional electromagnetic energy beams to a device receiver within a frequency range of less than 3 GHz (below 5G), and conduct bidirectional communication between the wireless charging system and the device receiver at a frequency range at or above 3 GHz (at 5G), and/or the reverse.

In embodiments, one or more of the system antennae comprise a flat panel antenna array, which may be configured for use as a transmitter. The flat panel antenna array may include a number of antenna elements, which in some embodiments comprise from about 64 to 256 antenna elements which may be distributed in an equally spaced grid. For example, the flat panel antenna array may have an 8×8 grid with a total of 64 antenna elements, up to a 16×16 grid to have a total of 256 antenna elements. A plurality of flat panel antenna arrays may also be configured and connected to function as a single, larger flat panel antenna array, e.g., 4 16×16 flat panel antenna arrays may be connected and arranged to function as one 32×32 flat panel array having 1024 elements. The more elements, typically the wider range and higher power transmission capabilities of the antenna. Alternate configurations may also be possible including circular patterns, polygon arrangements, parabolic arrangements, hyperbolic arrangements, and/or the like. The flat panel antenna array may also be broken into numerous pieces or subparts and distributed across multiple surfaces (multi-faceted).

In embodiments, antenna elements of the wireless charging system operate in single array, a pair array, a quad array, or any other suitable number of arrays or arrangement configured in accordance with the desired application. In embodiments, the antenna arrays may include any number of antenna elements capable of transmitting the one or more directional electromagnetic energy beams. Generally, with more antenna elements, a wider range and higher power transmission capacity may be achieved. Alternate configurations may also be possible including circular patterns or polygon arrangements, parabolic arrangements, multidirectional arrangements, amongst others.

Suitable antenna elements include flat antenna elements, patch antenna elements, dipole antenna elements, and/or the like which are suitable antennae for wireless power transmission. The physical dimensions of the antennae including size, shape and orientation vary based on the requirements of the transmitter. In addition, the antennae may comprise a single or multi-component antenna array arranged to form a three-dimensional special arrangement. Antenna element materials may include any suitable material that may allow radio signal transmission with high efficiency, good heat dissipation and/or the like.

In addition, antenna elements may have at least one polarization or a selection of polarizations. Such polarization may include vertical pole, horizontal pole, circularly polarized, left hand polarized, right hand polarized, or a combination of polarizations. The selection of polarizations may vary in dependency of transmitter characteristics. In addition, antenna elements may be located in various surfaces of the base charger.

In embodiments, the directed directional electromagnetic energy beams may be produced within a single frequency range. In other embodiments, the directed directional electromagnetic energy beams may be produced within a plurality of frequency ranges either simultaneously, intermittently, or both, being directed from the same base charger, from different base chargers, or from multiple base chargers. The antennas may be optimized to direct the directional electromagnetic energy beams depending on the topography of the 3D space, e.g., using dipole antennas for directing power at nearer distances. In some embodiments, the antennas may be capable of manual adjustment to further optimize their efficiency. Likewise, a plurality of channels may be utilized for different types of power transmission and/or electronic communication.

Device Receiver

In embodiments, the wireless charging system either comprises a device receiver or is configured to function with a device receiver, wherein each device receiver is configured to receive and convert one or more of the directional electromagnetic energy beams into electrical energy and provide the energy to the attached electronic device, which in embodiments includes the device receiver being configured to store at least a portion of the electrical energy in an intermediary electrical storage device and release the stored energy to at least one electronic device. The device receiver is further configured to direct electrical energy from the intermediary electrical storage device to a connected electronic device in electrical connection with the device receiver, to charge and/or power the connected electronic device.

The device receiver may be configured for powering or charging a client device is it associated with or coupled to, e.g., via the device receiver having a removable electrical connection with the electronic device, for example in the form of a dongle, within a case, and/or the like. In other embodiments, the device receiver is integrated with and/or within the electronic device.

In embodiments, the device receiver is configured to be removably electrically connected to the electronic device via a disengageable connecter. Suitable electrical connectors include USB connectors, lightning connectors, and the like, configured such that a male end on one of the two engages with a female end of the other to establish electrical and/or electronic communication between the device receiver and the electronic device.

In embodiments, the device receiver comprises one or more receivers capable of receiving and harvesting energy from one or more directional electromagnetic energy beams originating from the one or more transmitters of the base charger and/or from another device receiver(s) as discussed in more detail herein.

Device receivers suitable for use herein include at least one antenna element, a receiver controller and/or circuitry configured to harvest power from the one or more directional electromagnetic energy beams directed thereto, e.g., rectifying and/or power converting circuitry, and the like. The device receiver further includes one or more electronic communication components. In some embodiments, power converter may include electronic switched mode DC-DC converters, e.g., buck converters of either a step up or step-down arrangement, which can provide high efficiency. The device receiver may comprise one or more capacitors and/or inductors with associated circuitry situated to receive the electrical energy before power converters. The capacitor may ensure sufficient current is provided to an electronic switching device (e.g., switch mode DC-DC converter), so it may operate effectively. When charging an electronic device, for example a phone or laptop computer, initial high-currents that can exceed the minimum voltage needed to activate operation of an electronic switched mode DC-DC converter, may be required. In such a case, a capacitor may be added at the output of the device receiver to provide the extra energy required. Afterwards, lower power can be provided. For example, a few percent of the total initial power that may be used while having the phone or laptop still build-up charge.

The device receiver may comprise a receiver controller in electronic communication with a single antenna or an array of antennas configured to receive the one or more directional electromagnetic energy beams from the power transmitter, and the associated circuitry, hardware and programming configured to convert the energy harvested from the one or more directional electromagnetic energy beams e.g., the radio frequency electromagnetic radiation, into electrical energy usable by an attached or associated electronic device. In embodiments, the receiver further comprises an intermediate electrical storage device, arranged to receive the harvested power prior to the power being directed to the attached electronic device.

In embodiments, the device receiver incudes at least one rectifier configured to convert the electrical energy from AC to DC. Applicant has discovered that the amount of usable power delivered from an antenna is affected by the impedance of the antenna, and the impedance of associated circuitry, and that the impedance is related to the power and/or the wavelength of the signal received by the antenna. Applicant has discovered that the amount of usable power which may be harvested from a directional electromagnetic energy beam is directly related to how well the impedance of the antenna is matched to the impedance of the RF to DC in electrical communication with the antenna. In embodiments, the impedance of the antenna is matched to the impedance of the RF to DC converter and associated circuitry. In one embodiment, this matching is done by means of switching the output of the antenna according to the power being received by the antenna to match the impedance of the RF to DC converter. In other embodiments, the impedance of the RF antenna is dynamically adjusted to match the impedance of the RF to DC converter, and/or the impedance of the RF to DC converter is dynamically adjusted to match the impedance of the RF antenna, based on the power being received by the antenna.

Other types of conditioning may be applied as well. For example, the device receiver may include a voltage conditioning circuit or system which increases or decreases the voltage of the electrical energy as required by the client device. The device receiver may also include a means to control the flow of energy from the intermediate electrical storage device to an associated electronic device e.g, a relay, power transistor, and/or the like with associated circuitry or systems required to convey the electrical energy from the device receiver to an intermediary electrical storage device, and then from the intermediary electrical storage device to the client device.

In embodiments, the device receiver further comprises an antenna configured for power transmission and the associated control systems and circuitry, which may comprise a transmitter/receiver or transceiver configured to both receive and transmit the one or more directional electromagnetic energy beams. In embodiments, device receiver comprises one or more transmitter/receiver or transceivers configured for unidirectional or bidirectional electronic communication between and with the wireless charging system or a component thereof, and/or another device receiver, and/or an electronic device associated therewith, which may utilize components of the power transmission circuitry, or may be a stand-alone system, and/or may utilize components and systems of an attached electronic device.

In some embodiments, the device receiver is configured to transmit and/or receive data, e.g., status indications, control signals, and/or the like, too and from the transmitter in order to exchange data in real-time or near real-time. The control signals may contain status information about the client device, the device receiver, an end user of the electronic device, relative to the directing of the directional electromagnetic energy beams, authorization status, requests for power, and/or the like. Examples of status information include present location information of the device, an amount of charge received, an amount of charged used, an amount of charge required, user account information, and/or the like.

In some embodiments, the device receiver may be integrated with, and/or configured to utilize components and/or systems conducted by an attached electronic device, integrated into the electronic device, and/or shared with the client device. For example, the device receiver may utilize one or more networking systems of the client device to communicate with the wireless charging system.

The bidirectional electronic communication between the wireless charging system and the device receiver may be conducted intermittently or on an essentially continuous basis, depending on whether the transmitter and device receiver are communicating synchronously (i.e., the transmitter is expecting to receive control data from the device receiver). Additionally, the wireless charging system may transmit the one or more directional electromagnetic energy beams to the device receiver, irrespective of whether the wireless charging system and the device receiver are communicating control or other signals.

In some embodiments, the device receiver is configured by the wireless charging system prior to establishing effective harvesting parameters used by the device receiver to allow harvesting of energy from the one or more directional electromagnetic energy beams.

Some of the information in the control data may inform the transmitter how to effectively produce and transmit, and in some cases adjust, the features of the one or more directional electromagnetic energy beams, begin transmission, update location information, request the wireless charging system to cease power transmission to the device receiver, and/or the like.

In embodiments, a device receiver may be configured to analyze the amount and quality of the power being received and provide information to the wireless charging system directed to adjustments and/or optimization of system.

In embodiments, the device receiver comprises one or more antenna elements, which may comprise any type of antenna capable of transmitting and/or receiving signals in frequency bands used by the wireless charging system. Antenna elements may include vertical or horizontal polarization, right hand or left-hand polarization, elliptical polarization, or other polarizations, as well as any number of polarization combinations. Using multiple polarizations can be beneficial in devices where there may not be a preferred orientation during usage or whose orientation may vary continuously through time, for example a smartphone or portable gaming system. For devices having a well-defined expected orientation (e.g., a two-handed video game controller), there might be a preferred polarization for antennas, which may dictate a ratio for the number of antennas of a given polarization. Types of antennas in antenna elements of the device receiver, may include patch antennas, which may include polarization that depends upon connectivity, i.e., the polarization may vary depending on from which side the patch is fed. In some embodiments, the antenna may be a patch antenna, capable of dynamically varying the antenna polarization to optimize wireless power transmission.

Communications Components

In embodiments, the device receiver further includes one or more wireless communication components configured for electronic communication e.g., data, between the device receiver and one or more other devices of the system and/or other device receivers, client devices, and/or the base charger. Different antenna, rectifier or power converter arrangements are possible for a device receiver depending on the intended use. In embodiments, the communications components include those of established or commercial utility, and include those configured for Bluetooth®, Bluetooth Low Energy (BLE), Wi-Fi, NFC, ZigBee®, variants thereof, and/or the like. Such components may be hardware and/or software based, may be present as application specific integrated circuits, and/or incorporated into other components of the system.

Intermediary Electrical Storage Device

In embodiments, the device receiver further includes an intermediary electrical storage device in electrical communication between a power output of the device receiver and the power input of the electronic device coupled to the device receiver. The device receiver is configured to receive and harvest electrical energy from one or more directional electromagnetic energy beams provided by the wireless charging system, which is then provided as a power output of the device receiver. This electrical energy is then directed into the intermediary electrical storage device where it is stored and/or maintained until it is delivered to the power input of the electric device attached or coupled to the device receiver for powering and/or charging of the device, and/or until the device receiver utilizes at least a portion of this power to direct one or more secondary directional electromagnetic energy beams to another device receiver.

In embodiments, the intermediary electrical storage device comprises one or more capacitors, inductors, batteries, and/or the like, capable of storing energy that may be then converted into an appropriate DC current and voltage for charging or powering an electric device. In embodiments, the intermediary electrical storage device comprises a capacitor and associated circuitry required to use the capacitor for electrical storage, e.g., timers, resistors, operational amplifiers, transistors, and/or the like.

One significant challenge to providing power wirelessly is that the amount of power that may be transmitted under current regulatory guidelines is less than or equal to one (1) watt, often times much less than one watt. Applicants have discovered that by configuring the device receiver to direct power first into an intermediary electrical storage device, the relatively small amount of power that may be transmitted wirelessly may be stored therein, and when a larger amount of power has been harvested and stored, the power may be released or directed to a load with higher efficiency than would otherwise be possible utilizing the harvested power directly for charging or powering an electronic device.

In addition, the device receiver may be configured to acquire and harvest power autonomously, (regardless of the state of the attached electronic device), such that while the electronic device is not in need of power, the device receiver, by virtue of the intermediary electrical storage device, may be utilized to store energy that will eventually be requested by the device. In addition, the intermediary electrical storage device may be employed to store energy utilized by the device receiver to direct one or more secondary directional electromagnetic energy beams to another device receiver in a peer-to-peer power grid arrangement as disclosed herein. Again, this may be done autonomously. The device receiver may also be configured to store energy in the intermediary electrical storage device and only release the same to power or charge the attached electronic device upon the attached electronic device being authorized to receive power from the wireless charging system. This allows for user billing, authentication, and other financial objectives to be obtained, and/or allow for providing a secure system wherein only authorized devices may utilize power provided by the wireless charging system.

Peer-To-Peer Wireless Meshed Power Local Area Network

In embodiments, the wireless charging system further comprises or is configured for peer-to-peer power transmission, wherein each device receiver further comprises a transmitter and/or a transceiver in electronic communication with a device receiver controller, configured to direct at least one secondary directional electromagnetic energy beam from a first device receiver towards a determined location of at least one second device receiver utilizing a least a portion of the energy stored in the intermediary electrical storage device of the first device receiver, independent of a status of the electronic device in electrical communication with the first device receiver, the second device receiver, or both, the second device receiver configured to receive and convert one or more of the secondary directional electromagnetic energy beams into electrical energy and store at least a portion of the electrical energy in a corresponding intermediary electrical storage device of the second device receiver, and to direct electrical energy from the intermediary electrical storage device of the second device receiver to a corresponding attached second electronic device to charge and/or power the attached second electronic device.

In embodiments, the wireless charging system is configured to form a meshed wireless power grid local area network and/or a meshed ad-hoc wireless power grid local area network comprising transmission of directional electromagnetic energy beams from the base charger too the device receiver, and peer-to-peer directional wireless power distribution comprising transmission of directional electromagnetic energy beams between two or more of the device receivers, wherein the device receivers and the base chargers present are nodes of the meshed network. In this embodiment, the wireless charger system is further configured for bidirectional electronic communication between the base charger and the device receiver, and/or between two or more device receivers, and/or between the base charger and a first device receiver through one or more secondary device receivers. In embodiments, the electronic communication may be conducted via a local area data network, an ad-hoc data network, a wide area data network, a wireless computer network, a meshed network, a wired computer network, intranets, the internet, a radio data network, a cellular data network, a cellular data network provided at least in part by the electronic device or client device, a meshed ad hoc wireless power grid local area network, or any combination thereof.

Accordingly, by instituting Peer-to Peer wireless power delivery, the limits of the system, referring to both the amount of power that may be provided and the physical distance or area that may be covered by the wireless charging system, may be larger than the physical area covered by the base chargers. Peer-to-Peer power distribution allows for a nearly infinite area to be serviced, limited only by the presence of device receivers in a concatenation (i.e., a chain) from the edge of the network to the base charger.

As noted above, it is to be understood that reference to bidirectional electronic communication between any two components of the wireless charging system and/or any component of the wireless charging system and a device receiver, or other outside system or service, may include direct electronic communication, i.e., the component(s) is/are configured for direct electronic communication with the other entity, and/or the component is in electronic communication with the other entity vis-à-vis one or more other devices, components, managers, systems, device receivers, and/or transceivers coupled to the wireless charging system, which may further include the system controller. For example, reference to bidirectional electronic communication between the base charger and a device receiver may include the base charger being configured for direct electronic communication, and/or the base charger being communicatively coupled to the wireless charging system controller, and the wireless charging system controller being coupled to one or more electronic communication transmitters, device receivers, and/or transceivers which are separate from the power transmitters, such that the actual communication link between the base charger and the device receiver is through, and/or includes one or more other transmitter/device receiver-transceivers of the wireless charging system, which may further include the system controller and/or other systems, managers, services, and the like.

In some of such embodiments, the wireless charging system is arranged and configured such that the base charger and a first device receiver are in bidirectional electronic communication, wherein the first device receiver and the second device receiver are in bidirectional electronic communication with each other, wherein base charger is in bidirectional electronic communication with the second device receiver through the first device receiver, or a combination thereof, and wherein the base charger is configured to determine if the second electronic device in electrical communication with the second device receiver is, or is not authorized to receive wireless energy from the wireless charging system based on one or more predetermined criteria and wherein the first device receiver is configured such that when the determination of the authorization status results in the first electronic device not being authorized to receive wireless charging from the wireless charging system, the first device receiver is configured to prevent the intermediary electrical storage device of the first device receiver from directing power to the first electronic device in electrical communication with the first device receiver; and direct at least one secondary directional electromagnetic energy beam toward the determined location of the second device receiver utilizing a least a portion of the electrical energy stored in the intermediary electrical storage device of the first device receiver.

In embodiments, the wireless charging system is configured and arranged to determine if the electronic device is, or is not authorized to receive wireless energy from the wireless charging system based on one or more predetermined authorization criteria; upon receiving a request from the electronic device and/or receiving a request from a device receiver in electrical connection with the electronic device, which has been determined to be authorized to receive wireless charging from the wireless charging system configuring the device receiver to receive the one or more directional electromagnetic energy beams from the wireless charging system according to one or more configuring criteria, directing one or more directional electromagnetic energy beams from the one or more transmitting antennas towards the device receiver of the electronic device at the determined location within the physical space, the device receiver receiving and converting one or more of the directional electromagnetic energy beams into electrical energy and storing at least a portion of the electrical energy in an intermediary electrical storage device, and directing the electrical energy from the intermediary electrical storage device to the connected electronic device in electrical connection with the device receiver, to charge and/or power the connected electronic device, wherein upon receiving a request from the electronic device and/or receiving a request from a device receiver in electrical connection with the electronic device which has been determined not to be authorized to receive wireless charging from the wireless charging system, configuring the device receiver to prevent receiving of the one or more directional electromagnetic energy beams from the wireless charging system according to one or more configuring criteria; and/or configuring the charging system to prevent directing one or more directional electromagnetic energy beams from the one or more transmitting antennas towards the device receiver of the electronic device at the determined location within the physical space; and/or configuring the device receiver to prevent the directing of electrical energy from the intermediary electrical storage device to the connected electronic device in electrical connection with the device receiver.

In some of such embodiments, the wireless charging system is configured and arranged such that upon receiving a request from the electronic device and/or a device receiver connected to the electronic device, which has been determined to be authorized to receive wireless charging from the wireless charging system: configures one or more other device receivers to direct one or more secondary directional electromagnetic energy beams towards the determined location of the device receiver within the physical space; the device receiver receiving and converting one or more of the secondary directional electromagnetic energy beams into electrical energy and storing at least a portion of the electrical energy in an intermediary electrical storage device; and directing the electrical energy from the intermediary electrical storage device to the connected electronic device in electrical connection with the device receiver, to charge and/or power the connected electronic device; wherein upon receiving a request from the electronic device and/or device receiver connected to the electronic device which has been determined not to be authorized to receive wireless charging from the wireless charging system: configures the device receiver to prevent receiving of the one or more secondary directional electromagnetic energy beams from one or more other device receivers according to one or more configuring criteria; and/or configures the device receiver to prevent the directing of electrical energy from the intermediary electrical storage device to the connected electronic device in electrical connection with the device receiver.

Some embodiments comprise multiple transmitters and/or multiple device receivers for powering a particular piece of electronic equipment, for example smartphones, tablets, music players, toys, and the like, having power requirements which exceed the amount of power providable by the system to a single device receiver.

Tracking of Receiver Locations—Handoff of Charging

In embodiments, the device receivers harvests energy transmitted from the wireless charging system transmitter(s) that is received into (by) the device receiver's antenna. The power is then rectified, conditioned, and transferred to the intermediary electrical storage device. In embodiments, the device receiver then sends the resulting electrical energy from the intermediary electrical storage device to the electrically connected device to power or charge the device. In alternative embodiments, the power may be transferred directly to the electrically connected device to power or charge the device. Upon movement of the device receiver from the location (e.g., a first location) to another location (e.g., a second location) the wireless charging system may engage another antenna, and/or another transmitter, and/or configure the transmitter to direct the one or more directional electromagnetic energy beams to the second location of the device, thereby "following" the device while providing power thereto via the one or more directional electromagnetic energy beams such that the directional electromagnetic energy beam remains "aimed" at the location of the device receiver.

System Managers and User Interfaces

In embodiments, the wireless charging system may further include one or more system or function managers, which may be present as hardware (API) software, virtual, or a combination thereof.

In embodiments, the client or electronic device associated with a device receiver may include, or be configured to utilize a Graphic User Interface (GUI) for managing interactions within wireless charging system. The GUI may be associated with an executable program loaded into a non-volatile memory and/or may be run as a web-based app. In some embodiments, the electronic devices may include a database for storing information related to the device receiver, power status, power schedules, IDs, account information, pairing and any information necessary for receiving power from the wireless charging system. Such a system management GUI may be configured to run on a computer included in, or associated with the wireless charging system, or may run on a remote server that may be in the Internet cloud, an intranet, a fog computing cloud, and/or the like. The system management GUI may provide interaction between the end users or operators and the software within the wireless charging system, and be configured for use in configuration, monitoring, command, control, reporting, and any other system management functionality.

In embodiments, the device receiver and/or the electronic device associated with the device receiver may be configured to determine one or more status, which may include an authorization status, comprising a determination according to one or more authorization criteria of whether or not (if) the electronic device is, or is not authorized to receive wireless energy from the wireless charging system. In embodiments the authorization criteria comprises an authorization key; a lookup table; an identifier unique to the device receiver; an identifier unique to the electronic device; a user account; a service subscription; a prepaid subscription; a blockchain permission; a blockchain transaction; or a combination thereof.

In some of such embodiments, the wireless charging system is configured to cause the electronic device to present an indication perceivable by an end user of the electronic device indicating the authorization status of the electronic device, e.g., via the GUI and/or the GUI is configured to present an indication perceivable by an end user of the electronic device indicating the authorization status of the electronic device based on one or more criteria. In some of such embodiments, the system is configured such that when the determination of the authorization status results in the electronic device not being authorized to receive wireless energy from the wireless charging system, the indication perceivable by the end user allows the end user to change the authorization status of the electronic device.

In one or more embodiments, the GUI or other indication source is configured such that when the end user changes the authorization status of the electronic device, the action comprises, or is designed to result in a financial transaction. In some embodiments, the changing of the authorization status of the electronic device by the end user and/or the like comprises a cryptocurrency financial transaction, a blockchain financial transaction, or a combination thereof.

Likewise, in some embodiments, the when the determination of the authorization status results in the electronic device is not authorized to receive wireless energy from the wireless charging system, the device receiver is configured to prevent the intermediary electrical storage device from directing electrical power to the electronic device in electrical connection with the device receiver.

In embodiments, the determining of the authorization status resulting in a determination that the electronic device is authorized to receive wireless energy from the wireless charging system, the device receiver is configured to receive the one or more directional electromagnetic energy beams from the wireless charging system according to one or more configuring criteria, transfer this energy to the intermediary electrical storage device, and then transfer this energy to the associated device e.g., charging a battery and/or directly powering the device.

In embodiments, the GUI and/or system utilizes configuring criteria comprising one or more of a time stamp; a level of charge of the electronic device; an identification variable specific to the electronic device; a power requirement of the electronic device; a predetermined criterion; a multiplexing criterion, or a combination thereof.

In an embodiment, the device receiver is configured to request wireless energy delivery from the wireless charging system based at least in part on a level of charge of the connected electronic device, wherein the level at which a request will be made may be set in the GUI.

In embodiments, the wireless charging system comprises a system controller coupled to one or more base chargers in electronic communication with one or more microprocessors, which may include a wireless power transmission manager app, system, and/or the like, as embedded software, hardware, or a combination thereof, which may further include an application programming interface e.g., an API, for one or more electronic communication systems and/or protocols, e.g., a Bluetooth Low Energy system or chip. The API may comprise a software application that is run on a mobile, laptop, desktop, server, or other processor equipped computing device. The wireless charging system may further include an antenna manager software or system configured to control an RF antenna array that may be used to deliver the one or more directional electromagnetic energy beams.

The wireless charging system may further comprise one or more additional application programming interfaces and or be configured to execute a plurality of functions, including the establishing of a connection, ending a connection, sending data, receiving data, determining a status of a device or device receiver, and the like according to one or more embodiments disclosed herein. Client devices may include a device receiver app or system configured for executing one or more of the functions and/or providing data required by the wireless charging system, an application programming interface, or a combination thereof.

In embodiments the GUI may be a software module that may be downloaded from any application store and may run on any operating system, including iOS and Android, amongst others. The client device may also communicate with the wireless charging system via a one or more communication standards, e.g., Bluetooth, to provide information that may be of use for wireless charging system.

In embodiments, a wireless power transmission manager system or software may be used in order to manage the directing of directional electromagnetic energy beams by the wireless charging system, which may include one or more software modules hosted in memory and executed by a processor inside a computing device. The wireless power transmission manager system may include a local application GUI, or host a web page GUI, from where a user may see options and statuses, as well as execute commands to manage the wireless charging system. The computing device, which may be cloud-based, fog based, and/or may be connected to the wireless charging system through standard communication protocols, including Bluetooth, Bluetooth Low Energy, Wi-Fi, or ZigBee, amongst others.

The various systems may exchange information with one-another in order to control access by and directing of the directional electromagnetic energy beams (power transmission) to device receivers associated with various client devices. Functions controlled by a wireless power transmission manager system may include scheduling power transmission for individual devices, prioritizing between different client devices, accessing credentials for each client, tracking physical locations of device receivers relative to a base charger, broadcasting messages, determining authorization status, account information, and/or any functions required to manage the wireless charging system.

Computing device may be connected to the wireless charging system through network connections. Network connections may refer to any connection between computers including intranets, local area networks (LAN), virtual private networks (VPN), wireless area networks (WAN), Bluetooth, Bluetooth Low Energy, Wi-Fi, and ZigBee, cellular networks, and/or the like.

Cloud or Remote Service Providers

In some embodiments, the wireless charging system includes a cloud service provider in electronic communication with the system controller. In embodiments, the cloud service provider includes system controller services, information distribution services, and the like and may be configured, controlled, and monitored via a GUI.

In some implementations, the cloud service provider is electronically coupled to the system controller and/or another component of the wireless charging system. In some embodiments, the cloud service provider is implemented as computer hardware and software including any number of components required for running a desired set of applications, including any number of processors, random access memory modules, physical storage drives, wired communication ports, wireless communication ports, and the like. In an example, the cloud service provider is implemented using one or more components of computing device. In these embodiments, cloud service provider executes any software required to a host system controller and/or the system controller system, including software able to manage user credentials, device identification, device authentication, device authorization, usage and payments associated with one or more users, blockchain transactions, handle service requests, information requests, store and read data related to one or more users, and the like. In other embodiments, cloud service provider additionally includes databases for storing user data, device data, payment data, and the like.

In some embodiments, the system controller is configured to manage power transmission from one or more base chargers to one or more device receivers, credentials associated with mobile device users, billing associated with wireless power transmissions, and the like. In these embodiments, the system controller is hardware and software configured to issue commands to one or more base chargers, including commands to begin, pause, or stop transmitting power to one or more wireless power device receivers, and the like. In an example, cloud service provider functions substantially similar to computing device, the system controller functions to perform wireless power management services, or a combination thereof.

In some embodiments, cloud service provider executes any software required to host any information distribution service. Examples of such software include software able to store and read data related to one or more users, perform analytics on data, and the like. In other embodiments, information distribution service is hardware and software configured to collect usage data, billing data, demographic data, and the like from the system controller, base charger, device receiver, and/or client device. Examples of data include total time spent charging, total energy transmitted to a device, average amount of energy delivered monthly to a device, locations where energy has been transmitted to a mobile device, mobile device user demographic descriptors, and the like.

In other embodiments, the system controller is implemented as computer hardware and software including any number of components required for running a desired set of applications, including any number of processors, random access memory modules, physical storage drives, wired communication ports, wireless communication interfaces allowing coupling to antennas, and the like. In an example, the system controller is implemented using one or more components of a computing device.

Power Transmission Management

In embodiments, the wireless charging system may include one or more power transmission manager functions, which may be configured in hardware, software, or a combination thereof. In embodiments, the power transmission manager functions are conducted by the system controller. In other embodiments, these functions are conducted by a separate integrated power transmission manager system. The power transmission manager functions may also be conducted by remotely located (e.g., cloud based) resources.

In other embodiments, a cloud service provider is in communication with one or more base chargers and manages the directing of directional electromagnetic energy beams from the one or more base chargers.

In embodiments, one or more application program interface may be used to enable the effective interaction between the wireless charging system, e.g., a wireless power transmission manager application, and a corresponding application chip or system. For example, a Bluetooth API may be utilized to control a BTLE integrated chip or system.

Databases

In some embodiments, the wireless charging system may include one or more databases for storing information related to base chargers, device receivers, electronic devices, power status, power schedules, device, and user IDs, pairing, account information, financial transaction information, and/or any information necessary for operation of the system. Database refers to an array of data structures within a computer's volatile or non-volatile memory but, that is used to organize, store, and retrieve data within the computer of the database. Databases may also be provided by various service providers over various networks, e.g., via secure internet communication. Databases may be implemented through known in the art database management systems (DBMS) such as, for example, My SQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

In embodiments, the wireless charging system may include one or more databases which may include a distributed system database, which may store relevant information associated with a client device, a client account, identifiers for a client device, voltage ranges for device receivers, location of a client device, signal strength and/or any other relevant information associated with a client device, and/or with a class or type of device according to function, manufacturer, software revision, hardware revision, connection, user preferences, account information, and/or the like. The one or more databases may also store information relevant to the wireless power local area network, including device receiver ID's, electronic device ID's, end-user handheld devices, system management servers, charging schedules, charging priorities, environment topology, and/or any other data relevant to the wireless charging system and/or the WiGL network.

In embodiments, in addition to the wireless charging system forming the wireless power grid local area network (and/or the ad hoc network, and/or the meshed network), the wireless charging system may further be configured to communicate (electronically) with one or more remote information services, control networks, central locations, e.g., through a hub and spoke and/or fabric arrangement, via secure hypertext transfer protocols, and/or the like, which in embodiments includes communication via an intranet, the internet, and/or through the internet cloud and/or the like. The one or more remote information services may include financial services, blockchain services, accounting services, control services, maintenance services, security services, and/or the like.

In some embodiments, the wireless charging system may include, and/or may be in electronic communication with one or more back-up servers, e.g., via a local network, the cloud, and/or the like. The wireless charging system may further include a one or more manager systems or software coupled to a distributed system database.

In embodiments, the wireless charging system is configured to obtain, record, store and communicate past system status data, which may include details such as the amount of power delivered to an electronic device, billing information, the amount of energy that was transferred to a group of electronic devices or to an account associated with a user, the amount of time an electronic device has been associated with a base charger, pairing records, activities within the system, any action or event of any wireless power device in the system, errors, faults, and configuration problems, among others. Past system status data may also include power schedules, names, customer sign-in names, authorization and authentication credentials, encrypted information, physical areas of system operation, details for running the system, financial information, financial transactions, and/or any other system or user-related information.

Present system status data stored in a database may include the locations and/or movements in the system, configuration, pairing, errors, faults, alarms, problems, messages sent between the wireless power devices, and tracking information, among others.

According to some embodiments, databases associated with the wireless charging system may be configured to determine, store, and communicate future system status information, where the future status of the system may be forecasted or evaluated according to historical data from past system status data and present system status data. Such data may then be utilized by the wireless charging system and/or one or more managers to further enhance and/or optimize system performance and efficiency. In embodiments, these and other data may be utilized (learned from) via artificial intelligence including reactive algorithms, limited memory algorithms, theory of mind algorithms, and/or so-called "self-awareness" algorithms.

In embodiments, one or more machine learning and/or artificial intelligence algorithms are employed to best optimize the amount of power delivered to the devices and minimize the amount of power required by the wireless charging system. In embodiments, the wireless charging system may utilize one or more classification algorithms, e.g., Naive Bayes, decision tree, random forest, support vector machines; K nearest neighbors, and the like; and/or one or more regression algorithms, e.g., linear regression; lasso regression; logistic regression, multivariate regression, multiple regression; and the like.

In some embodiments, the wireless charging system utilizes one or more clustering algorithms, which may include K-Means clustering, fuzzy C-means algorithms, expectation-maximization algorithms, hierarchical clustering algorithms, and/or the like.

In some embodiments, records from all device databases in a wireless charging system may also be stored and periodically updated in one or more servers, in the cloud, and/or the like. In some embodiments, a plurality of wireless charging systems may form a wireless charging system network, and may include two or more servers. In alternative embodiments, a wireless charging system may be a stand-alone or a contained system.

In embodiments, the wireless charging system may further be configured to detect failures in any one of the various systems, e.g., the wireless power transmission system. Examples of failures in a power transmission system may include overheating of any component, malfunction, and overload, among others. If a failure is detected by the system, the wireless charging system may be configured to analyze the problem and utilize redundant capacity to mitigate and effect, while providing information of the failure to one or more system managers. After the analysis is completed, a recommendation or an alert may be generated and reported to owner of the power transmission system or to a remote cloud-based information service, for distribution to a system owner, manager, manufacturer and/or supplier.

In embodiments, the wireless charging system may further comprise a remote information service or system operated by the owner of the system, the manufacturer or supplier of the system, and/or a service provider. The remote management system may include business cloud, remote manager software or systems, backend servers where the remote manager may further include a general database. Functionality of backend server and remote manager may, in some embodiments, be combined into a single physical or virtual server.

In embodiments, the wireless charging system periodically establish a TCP or some other communication connection with a remote manager and/or the like for authentication, problem report purposes, reporting of status or usage details, and/or the like.

Methods of Charging Devices

In embodiments, the wireless charging system provides electrical power to a plurality of device receiver devices via detecting the presence of a device receiver, determining a location of the device receiver, and directing one or more directional electromagnetic energy beams towards the location of the device receiver, wherein the device receiver is configured to harvest electrical energy from the one or more directional electromagnetic energy beams usable to power an electronic device.

In one embodiment, the wireless charging system first detects the presence of a device receiver within a 3D space proximate to a base charger of the system. At this point, the wireless charging system may query the device receiver, and/or provide notice to the device receiver of its presence. The device receiver may then respond, and/or may request power from the wireless charging system. In one embodiment, the wireless charging system then determines a location of the device receiver and begins directing one or more directional electromagnetic energy beams towards the location of the device receiver. The device receiver harvests energy from the one or more directional electromagnetic energy beams, transfers this energy to an intermediary storage device, and then directs the energy to the electronic device to charge or power the device.

In an embodiment, bidirectional electronic communication is then established between a transmitter or transceiver of the wireless charging system and a data device receiver or transceiver of the device receiver in some embodiments, transmitters and device receivers may communicate control data over using a wireless communication protocol capable of transmitting information between two processors of electrical devices (e.g., Bluetooth®, BLE, Wi-Fi, NFC, Zig-Bee®). For example, in embodiments implement Bluetooth® or Bluetooth® variants, the transmitter may scan for device receiver's broadcasting request signals, or a device receiver may transmit an advertisement signal to the transmitter. The request or advertisement signal may announce the device receiver's presence to the transmitter, and may trigger an association between the transmitter and the device receiver.

In some embodiments, a request or advertisement signal may communicate information that may be used by various devices (e.g., transmitters, client devices, sever computers, other device receivers) to execute and manage the forming and directing of one or more directional electromagnetic energy beams to the location of the device receiver. Information contained within the request or advertisement signal may include a device identifier (e.g., MAC address, IP address, UUID), the voltage of electrical energy received, client device power consumption, account information, authorization status information, and other types of data related to power transmission.

The transmitter may use a request or advertisement signal transmitted to identify the device receiver and, in some cases, further locate the device receiver in a two-dimensional space or in a three-dimensional space. Once the transmitter (i.e., the wireless charging system) identifies the device receiver, the transmitter may establish the connection associated in the transmitter with the device receiver, allowing the transmitter and device receiver to communicate control signals over one or more additional channels. The wireless charging system transmitter may also begin directing of the directional electromagnetic energy beams, i.e., one or more directional electromagnetic energy beams, from antennas of the transmitter's antenna array directed towards the location of the device receiver.

In embodiments, the device receiver may then measure the voltage, level of charge, and/or the like of the attached device, among other metrics related to effectiveness of the directing of the directional electromagnetic energy beams, which may in-turn be compared to the electrical energy received by the device receiver's antennas. The device receiver may generate control data containing the measured information, and then transmit control signals containing the control data to the transmitter. For example, the device receiver may sample the voltage measurements of received electrical energy, for example, at a rate of 100 times per second. The device receiver may transmit the voltage sample measurement back to the transmitter, 100 times a second, in the form of control signals.

In embodiments, various algorithms of the transmitter and/or the device receiver may be utilized to determine when it is necessary to adjust the transmission parameters and may also vary the configuration of the transmit antennas, in response to determining such adjustments are necessary. For example, the transmitter may determine the power received at a device receiver is less than maximal, based on the data received from the device receiver. The transmitter may then automatically adjust other parameters of the directing of the directional electromagnetic energy beams, but may also simultaneously continues to receive and monitor the voltage and/or other metrics being reported back from device receiver.

In embodiments, automated processes performed by the transmitter may select a subset of arrays to direct the one or more directional electromagnetic energy beams to the device receiver, and/or other device receivers having power simultaneously supplied by the system.

System Optimization

As the need for charging of wireless devices increases, the amount of wireless energy in surrounding areas increases proportionality. This results in interference, self-interference, signal jamming, and self-jamming of communication signals. The instant disclosure utilizes a combination of machine learning and artificial intelligence algorithms which identify devices in need of charging, devices authorized to receive charging, and then assign a priority level to these devices. The system then determines the optimal frequency at which to deliver power to the device, and directs one or more directional electromagnetic energy beams from at least one transmitting antenna to the location of the receiver of the eligible device in need of charging to charge the device.

In embodiments, the wireless charging system is configured to calibrate and/or configure the antennas transmitting the one or more directional electromagnetic energy beams, so that the antennas transmission signals having a more effective or efficient set of features (e.g., direction, beam width, phase, gain, amplitude, frequency, and/or the like). In some embodiments, a processor of the transmitter may automatically determine more effective features for producing and transmitting the one or more directional electromagnetic energy beams based at least in-part on one or more control signals received from the device receiver, or other device receivers, which may include historical or machine-learning algorithms.

In some embodiments, the transmitter may execute one or more software modules monitoring the metrics, such as voltage measurements, received from the device receiver. Algorithms may vary production and transmission of directing of the directional electromagnetic energy beams by the transmitter's antennas, to maximize the effectiveness of the directing of the one or more directional electromagnetic energy beams to the device receiver and may institute corrections to improve efficiency. When an optimal configuration for the system is identified, memory of the transmitter may store the configurations to keep the transmitter broadcasting at that highest level.

In embodiments, the wireless charging system at least intermittently checks and/or tracks the location of each of the device receivers previously identified, and searches for new device receivers to be added. The tracking and determination of positions may include one or more software packages, and/or employ one or more algorithms in the system controller, utilizing, for example, a CPU, processor, computer among others, for determining the location of each device receiver and the optimal parameters for directing the one or more directional electromagnetic energy beams to the location of each of the device receivers. In order to achieve the optimal efficiency of the system, the device receivers and/or the electronic device may be configured to provide feedback to the wireless charging system. Examples include the use of various sensors and/or circuits to determine power efficiency, refine location, identify movement and/or orientation of the device, e.g., via use of an accelerometer, a GPS sensor, and/or the like.

Device Receiver Initiating Charge

In embodiments, the device receiver initiates the charging by sending a request for charging to the wireless charging system. In embodiments, the request may be issued based on one or more predetermine criteria such as a level of charge of the device. In some embodiments, the electronic device includes a GUI for interacting with the wireless charging system including issuing a request for charging or power delivery. In other embodiments, the process is automatic as long as particular requirements are met, e.g., the device being authorized to receive charge.

In embodiments, the device receiver and/or the electronic device may be in communication with the wireless charging system and exchange information such as a device ID, a charge status, account information, and/or the like. The wireless charging system controller may update its database and may send a copy to the electronic device including the IDs of available power transmitters within the system. Then, the electronic device may determine if the ID of a device is already associated with the ID of a power device receiver, and/or the like.

In some embodiments, this may further include the electronic device and/or the device receiver undergoing a pairing operation with the wireless charging system according to processes known in the art. In embodiments, the electronic device is configured to monitor various parameters, which are communicated to the wireless charging system by either the device or the device receiver attached thereto.

In embodiments, the wireless charging system may configure the device receiver to receive the one or more directional electromagnetic energy beams provided. For example, the system controller and/or another system or manager may send information directed to delay encoding, orthogonal frequency-division multiplexing (OFDM), code division multiplexing (CDM) or other binary coding for identifying a given electronic device including the device receiver. The wireless charging system may further authenticate the device and/or device receiver prior to directing one or more directional electromagnetic energy beams toward the location of the device receiver. If the device receiver is not authorized to device receiver power, the wireless charging system may either not deliver power, or prevent power delivered and harvested by the device receiver from being transferred from the intermediary electrical storage device to the power input or battery of the electronic device.

In some embodiments, the wireless charging system is configured to cause the electronic device to present an indication perceivable by an end user of the electronic device indicating the authorization status of the electronic device. In such embodiments, the wireless charging system is configured such that when the determination of the authorization status results in the electronic device not being authorized to receive wireless energy from the wireless charging system, the indication perceivable by the end user allows the end user to change the authorization status of the electronic device. In embodiments, when the end user changing the authorization status of the electronic device comprises a financial transaction, which in some embodiments comprises a cryptocurrency financial transaction, a blockchain financial transaction, or a combination thereof.

In an embodiment wherein the device and/or the device receiver is unknown to the wireless charging system, the wireless charging system may be configured to obtain information from device receiver such as type of device, manufacturer, serial number, total power required, battery level among other such information, and/or invoke or execute one or more programs suited to the authenticate the device. In addition, if multiple device receivers are requiring power, the wireless charging system may deliver power equally to all device receivers or may utilize a priority status for each device receiver. Such a priority status may be user defined and/or may be determined by an account type or status. In some embodiments, the user may choose to deliver more power to its smartphone, than to its gaming device. In other cases, the user may decide to first power its smartphone and then its gaming device.

In embodiments, the wireless charging system may be configured to record data relevant to particular device receivers/devices, and/or groups of device receivers/devices, e.g., powering statistics, timing, how often a device requires power, at what times is the device requesting power, how long it takes to power the device, how much power was delivered to such device, the priority status of devices, the location where is the device was powered, and/or the like. In addition, such statistics and other information could be uploaded to a cloud based or other data server for subsequent use and analysis. In some embodiments, these data may be utilized by the users to forecast the need to buy powering time, for example, a user may pay for an hour of power. Thus, the aforementioned statistics can be used in determining a status, such as and authorization status, of a device receiver and/or a device.

In embodiments, the character or configuration of the directional electromagnetic energy beam is selected based on an optimum power delivered to the device receiver/electronic device. In embodiments wherein peer-to-peer power distribution network is formed, e.g., wherein each one of the plurality of electronic devices is within charging or powering range of at least another base or auxiliary multi point wireless charger, the primary and secondary beams may be selected to supply power based on a WiGL routing policy and/or table. The WiGL routing policy and/or table is preferably based on one or more or all of:

whether the primary or secondary beam originates from a base or auxiliary base charger;

proximity and line of sight of the respective base or auxiliary base charger relative to the electronic device requesting power;

relative levels of charge of batteries in or of power sent to the electronic devices; and proximity and line of sight of the auxiliary multi point wireless chargers from which the directional electromagnetic energy beam originates, to other respective auxiliary and base chargers available to supply power to the auxiliary multi point wireless charger from which the directional electromagnetic energy beam originates.

In embodiments, the electrical power distribution network utilizes packet switching. Some embodiments further comprise added redundancy by proving routing resiliency similar to methods used in data communication. Accordingly, embodiments of the system disclosed herein may substantially eliminate charging cords, eliminate and/or reduce demands for electrical wiring, reduce wasted charging power by requesting only what is desired, and direct the power where it is needed, and/or reduce battery usage.

In some embodiments the base charges each comprise: a converter that is constructed to convert electrical energy having an alternating current or direct current into wireless electrical energy; a base band processor; an electromagnetic radiation processor; a multidirectional antenna array; and a wireless electrical grid router. In some embodiments, a power booster is utilized to expand a range of the base charger.

In some embodiments, the base charger is selected from one of a plurality of base chargers. Preferably, the base charger is dynamically selected from the plurality of base chargers based upon the determined locations of the respective electronic devices and/or the power requests of the devices.

In some embodiments, the device receiver comprises: a battery and/or a capacitor for storing power (i.e., an intermediary electrical storage device), a drive circuit to power an electrical element such as a light, mobile phone, laptop, TV, radio, and the like, and a transceiver to communicate with an ad hoc WiGL network. The transceiver can be configured to send and receive directional electromagnetic energy beams via a base charger, wherein the base chargers are constructed to emit a plurality of directional electromagnetic energy beams. Each of the plurality of directional beams can be directable toward a determined direction of another device receiver and/or electronic device, the base charger constructed to wirelessly supply power to the other device receiver and/or electronic device.

The device receiver may further comprise a receiver controller constructed to enable the other electronic device to be followed by the directional electromagnetic energy beams responsive to motion of the other electronic device. In embodiments, the device receiver is configured to:

> send and receive charging or powering requests to and from other device receiver and/or electronic devices via the WiGL network;
> determine a location of the other device receiver and/or electronic device requesting power;
> direct one of the plurality of directional electromagnetic energy beams toward the determined location of the other device receiver and/or electronic device requesting power to charge or power the other device receiver and/or electronic device;
> automatically update the location of the other device receiver and/or electronic device requesting power; and
> redirect one of the plurality of directional electromagnetic energy beams toward the updated location of the other device receiver and/or electronic device requesting power, wherein the other device receiver and/or electronic device is in a range within which the directional electromagnetic energy beam can cause powering, a self-charge or recharge of the electronic device.

In one or more embodiments, wherein a device is connectable via a charging cable to an external source of electrical energy, the device can function as a wireless charger according to embodiments disclosed herein to wirelessly charge or power other untethered electronic devices within range in a peer-to-peer power distribution network.

In some embodiments, a method comprises coupling at least one of a plurality of base chargers to a respective electrical energy source, spacing a plurality of untethered electronic devices apart and away from the base chargers, and emitting a plurality of primary directional electromagnetic energy beams from each base charger. Each of the plurality of primary beams can be directable toward a determined location of one of the device receiver and/or electronic devices. The base chargers can be constructed to wirelessly supply power to the device receiver and/or electronic devices.

In one or more embodiments, each device receiver and/or electronic device may comprise an auxiliary base charger emitting a plurality of secondary directional electromagnetic energy beams, wherein each of the plurality of secondary beams is directable toward a determined direction of one of the other device receiver and/or electronic devices to wirelessly supply power to the other device receiver and/or electronic device.

In some embodiments a system controller is configured to enable the device receiver and/or electronic devices to be followed by the respective primary and secondary beams responsive to motion of the device receiver and/or electronic devices, allowing for formation of an ad hoc WiGL network comprised of the device receiver and/or electronic devices and base charger(s), and repeatedly calculating positions of the device receiver and/or electronic devices so as to redirect the respective directional electromagnetic energy beams.

In some embodiments, one or more of the plurality of the device receiver and/or electronic devices request charging or power. The wireless charging system utilizes one or more of the base and/or auxiliary base chargers to determine locations of the device receiver and/or electronic devices requesting charging or power, the wireless charging system then directs one of the plurality of directional electromagnetic energy beams toward the determined location of a respective device receiver and/or electronic devices requesting power to charge or power the device receiver and/or electronic device, automatically update the location(s) of the respective device receiver and/or electronic device(s) requesting power, and redirects one of the plurality of directional electromagnetic energy beams toward the updated location of the respective device receiver and/or electronic device requesting power, wherein the device receiver and/or electronic device is in a range within which the respective directional electromagnetic energy beam can cause powering, a self-charge or recharge of the device receiver and/or electronic device.

In some embodiments a directional electromagnetic energy beam is selected based on an optimum power delivered to the device receiver and/or electronic device.

In some embodiments each one of the plurality of device receiver and/or electronic devices is within charging range of at least another base or auxiliary multi point wireless charger, so as to form a peer-to-peer power distribution network, which in embodiments is a meshed peer-to-peer power distribution network.

In some embodiments, the method can further comprise selecting the directional electromagnetic energy beams based on a WiGL routing policy and/or table. The WiGL routing policy and/or table can be based on one or more of:

> whether the directional electromagnetic energy beam originates from a base or auxiliary base charger;
> proximity and line of sight of the respective base or auxiliary base charger relative to the device receiver and/or electronic device requesting power;
> relative levels of charge of batteries or of power needs in the device receiver and/or electronic devices; and
> proximity and line of sight of the auxiliary base charger from which the directional electromagnetic energy beam originates, to other respective auxiliary and base chargers available for charging the auxiliary base charger from which the directional electromagnetic energy beam originates.

FIG. 1 is a block diagram of an exemplary embodiment of a wireless charging system according to embodiments disclosed herein. The wireless charging system generally indicated as 100 comprises a plurality, e.g., two or more, base chargers 180A, 180B, each comprising one or more transmitting antennas 182A and 182B, respectively, configured to direct one or more directional electromagnetic energy beams 190 to a device receiver 132A, 132B, and 132C, of a like plurality of corresponding electronic devices 130A, 130B, and 130C, respectively, located within a physical space 110. Each of the device receivers 132 and/or the electronic devices 130 in electrical communication with the device receivers are adapted to issue a request 142 (only one instance of which is shown for simplicity), to the wireless charging system 100, e.g., to a receiving antenna coupled to the base charger 180. The device receiver 132 of the electronic device 130 is adapted to receive and convert one or more electromagnetic energy beams 190 provided by the wireless charging system to electrical energy in an amount sufficient to power and/or charge the electronic device 130.

As is further shown in FIG. 1, in embodiments the plurality of electronic devices 130 form a peer-to-peer power distribution network system 102 that generates directional beams 192, which can provide power to another one of the electronic devices e.g., 130B.

The base chargers 180A, 180B are electrically coupled to respective electrical energy sources 181, e.g., electrical outlets as illustrated or high-capacity batteries (not shown) or any other suitable power source.

Figure 2:
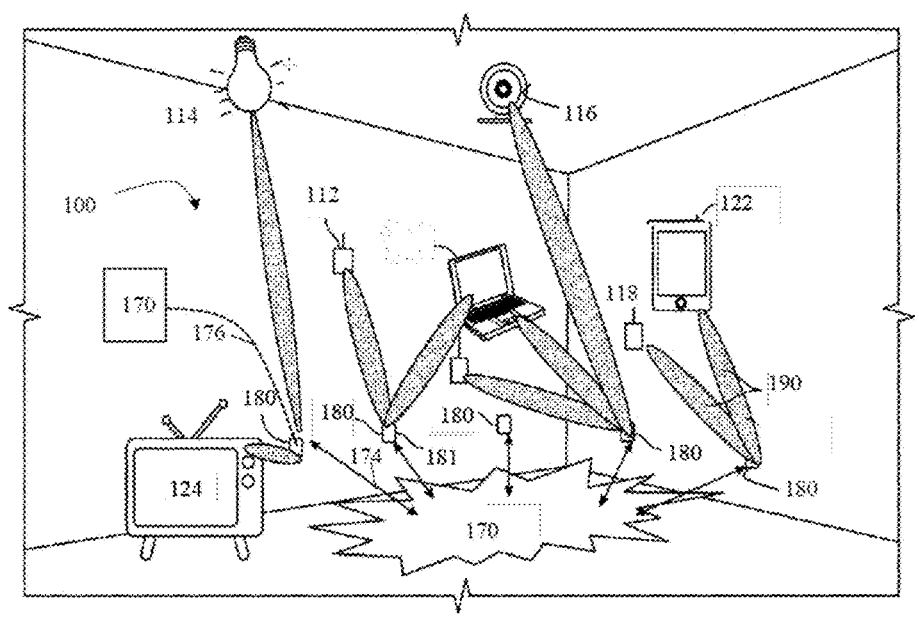
FIG. 2 is a block diagram of a system according to an embodiment disclosed herein.

As shown in FIG. 2, the plurality of base chargers 180 can be electrically and/or communicatively coupled to untethered electronic devices 130, which may include consumer electronic devices, e.g., a cell phone 112, a lighting device 114, home security systems 116, sensors 118, relatively high-power devices such as computers 120, tablets 122, televisions/home gateways 124, and the like. In embodiments, one or more components of the wireless charging system 100 may be in electronic communication with a data network 170 via wireless electronic communication 174 and/or wired electronic communication 176.

As shown in FIGS. 1 and 2, in embodiments, one or more components of the wireless charging system 100 and/or one or more of the device receivers 132, and/or one or more of the electronic devices 130 may further be in electronic communication with a data network 170 via wireless electronic communication 174 and/or wired electronic communication 176.

The base chargers 180 can be mounted and/or be coupled to electrical energy sources 181 and generate directional beams 190 (only a sample of which are labeled for simplicity), which directional beams provide power to electronic devices that are chargeable and/or powerable via the electric energy provided by the charging system 100.

Base chargers 180 and any auxiliary chargers can be communicatively coupled to a local area network ("LAN"), and/or a personal area network ("PAN"), a cellular network, and/or a wireless LAN ("WLAN"), and/or a wireless PAN ("WPAN"), collectively herein referred to as "WP/LAN" 170 to communicate information concerning one or more of:
  I. identify one or more devices in need of power or charging;
  II. location information concerning one or more devices;
  III. a selection of a power or charge controller to power or charge one or more identified devices; and/or
  IV. a state of the electronic device.

In embodiments, the wireless charging system 100 is configures such that the base chargers 180 and the electronic devices (generally referred to as 130) participate in the peer-to-peer power distribution network system 102. For example, the devices 130A, 130C can receive directional electromagnetic energy beams 190 from respective base chargers 180A, 180B, and in turn transmit secondary directional electromagnetic energy beams 192 to wirelessly power or charge device 130B, which may be out of range and/or have poor line of sight to base chargers 180A, 180B, and/or may be more efficiently charged by devices 130A and/or 130C.

One or more identified devices can request charging 142 from a component of the wireless charging system, e.g., a base charger 180 and/or other ones of the electronic devices e.g., 130B requesting power charging 142 from device 130A. This request 142 may be via a wireless network communication 174 and or wired network communication 176 to network 170, or may be a direct communication between the charging system and the device receiver and/or the device. A directional beam of directional beams 190, 192 can be assigned to the device requesting power to begin operating or charging.

In embodiments, the location of a particular device e.g., 130C is updated by the wireless charging system 100 as the location of the device changes, indicated by arrow 134. Thereby, selected base chargers 180 and/or devices 130 providing powering and recharging can be powered or changed based upon movement of a given device. In embodiments, the system is configured to "follow" the device as it moves through the space 110. In embodiments, power is transmitted via RF or other electromagnetic radiation ("EMR") sources, which can be dynamically adjusted based upon device location, power requirements, charging need, and or the like.

Base chargers 180 and/or devices 130 generate directed beams of power to target a device that needs and/or requests power and/or charging. Base chargers 180 and devices 130 can be communicatively coupled to WP/LAN 170 to communicate information such as:
  I. each device that requests power or charging is assigned a number and becomes a node of the network;
  II. each device that requests power or charging can elect to request to be powered, charged or not;
  III. what devices need to be powered and/or charged;
  IV. where each device to located;
  V. a determined state, e.g., a physical state and/or an authorization state of the device; and/or
  VI. which of base chargers 180 and/or devices 130 charge which device 130.

Figure 3:
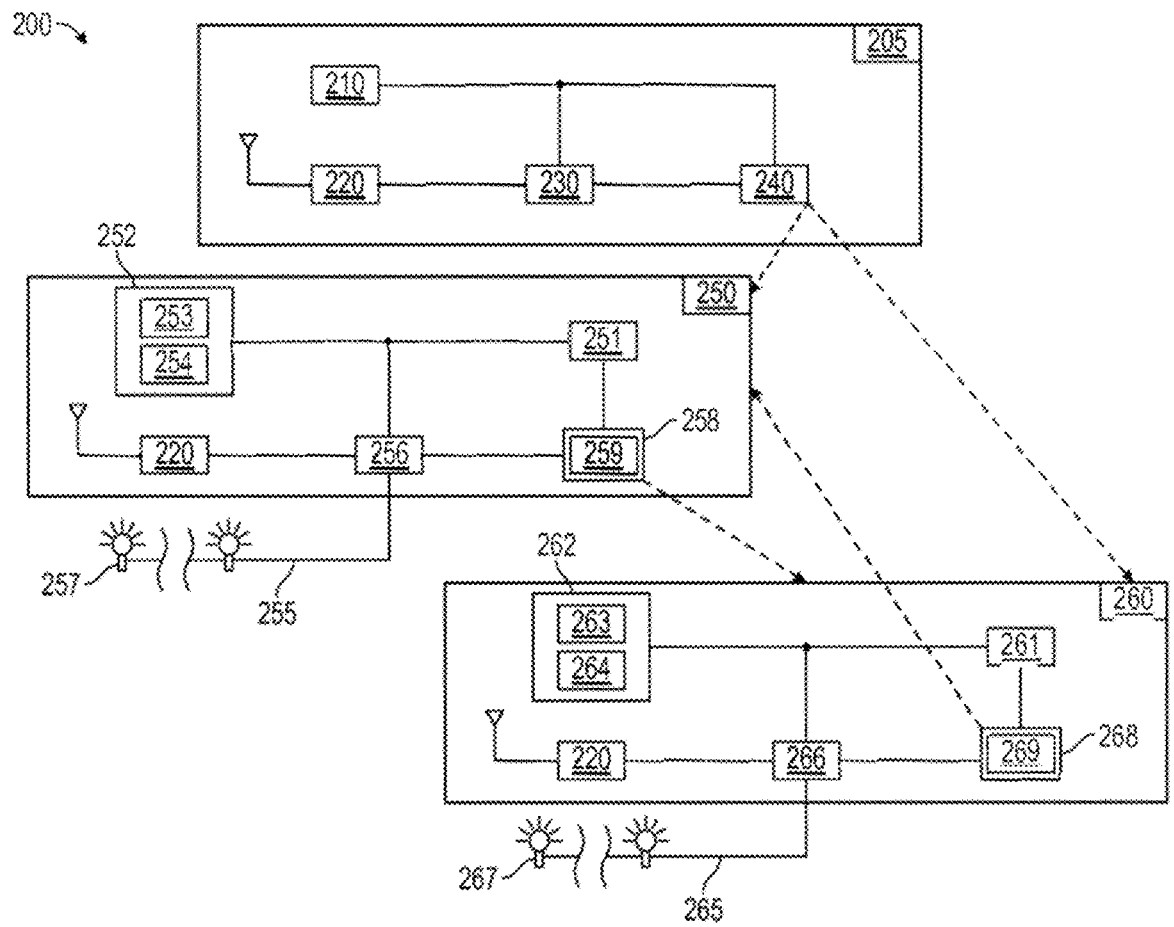
FIG. 3 is a block diagram of a system according to an embodiment disclosed herein.

In other embodiments, the electronic devices 130 and/or the device receivers 132 may in turn comprise auxiliary chargers (such as chargers 258, 268 as shown in FIG. 3).

In embodiments, the system is configured to establish at least one instance of bidirectional electronic communication between the wireless charging system and the electronic device. For example, devices 130 are communicatively coupled to WP/LAN 170. If a device needs and/or requests power and/or charging, the device sends a request via WP/LAN 170. A directional beam is assigned to the device and direct powering and/or charging starts. Locations of devices are repeatedly updated 134.

FIG. 3 is a block diagram of an exemplary embodiment of a peer-to-peer power distribution network system 200, which comprises a base WiGL base charger 205 (which can be wall mounted), untethered electronic device 250, and untethered electronic device 260. Base charger 205 comprises energy source 210 (which can include wall alternating current ("AC") to direct current ("DC") energy converter) and a controller 230. In embodiments, the base charger 205 is communicatively coupled to a WP/LAN 220 and is constructed to transmit multi-directional beams from multi directional antenna 240. Electronic device 250 comprises a battery charger 251, a power supply 252 comprising a battery 253 and/or capacitor 254, a controller 256, and a transceiver 258 including auxiliary multi directional antenna 269. Device 250 may be further coupled 255 to another electronic device 257. Electronic device 250 is communicatively coupled to WP/LAN 220. Device receiver 260 is coupled to an electronic device 267. The device receiver either comprises or is in electrical communication with a battery charger 261, a power supply 262 comprising a battery 263 and/or capacitor 264, a controller 266, and a transceiver 268 including auxiliary multi direction antenna 269. Device receiver 260 is communicatively coupled to WP/LAN 220.

In embodiments, the base charger is augmented by a controller. The system provides RF beam forming capabilities, which RF beams are formed and directed via communications transmitted via a formed ad hoc WiGL network. This ad hoc WiGL network may be created by software (code, application or other methods as outlined in the Institute of Electrical and Electronics Engineers (IEEE) standard 802.11) to determine the size, scope and needs of the WP/LAN. When an untethered device (e.g., an electronic device) needs charging, it requests charging via a signal transmitted via the ad hoc WiGL network. A particular base charger (base or auxiliary) is selected by an information device coupled to the ad hoc WiGL network, which causes generation of a directed beam that is a radio frequency ("RF") beam, for example. The information device determines the location of the untethered device and assigns a different beam if necessary. RF transmitted power is dynamically adjusted based the location and charging needs of the untethered device receiving power.

In an embodiment, one or more electronic devices can request charging from the wireless charging system, e.g., a base charger (and/or from auxiliary base chargers). The system then directs one or more directional electromagnetic energy beams to the device requesting power or a charge, to begin operating or charging the device. In some embodiments, the device location is updated as the devices moves. Thereby, selected base chargers provide powering and recharging can power or charge based upon movement of a given device. Power transmitted via RF or other electromagnetic radiation ("EMR") sources can be dynamically adjusted based upon device location and power and/or charging need.

In embodiments, the system and/or a method employed by the system establishes an instance of bidirectional electronic communication between the wireless charging system and the electronic device. This bidirectional electronic communication between the wireless charging system and the electronic device may comprise direct electronic communication (peer to peer) between the wireless charging system and the device, and/or indirect electronic communication via a local area network; an ad-hoc network; another peer to peer network, a wide area network, a wireless computer network, a wired computer network, a cellular data network, a cellular and/or Wi-Fi data network provided at least in part by the electronic device, e.g., using the network provided by a smartphone or computer, combinations thereof, and/or the like. For example, a smart phone may utilize a cellular and/or a Wi-Fi network to which it is connected to form an electronic communication e.g., an internet connection, a LAN connection, and/or the like to communicate with the charging system. In other embodiments, the communication link is included in or coincident with the directional electromagnetic energy beam provided by the wireless charging system. In embodiments, the system is configured to determine a status of the electronic device. This status may include device requests for power or charging, which may then be assigned an identifier and become a node of a network; a location of the device, a level of charge of the electronic device; an identification variable specific to the electronic device; a predetermined criteria specific to the device and/or to the type of device, and/or the like.

Figure 4:
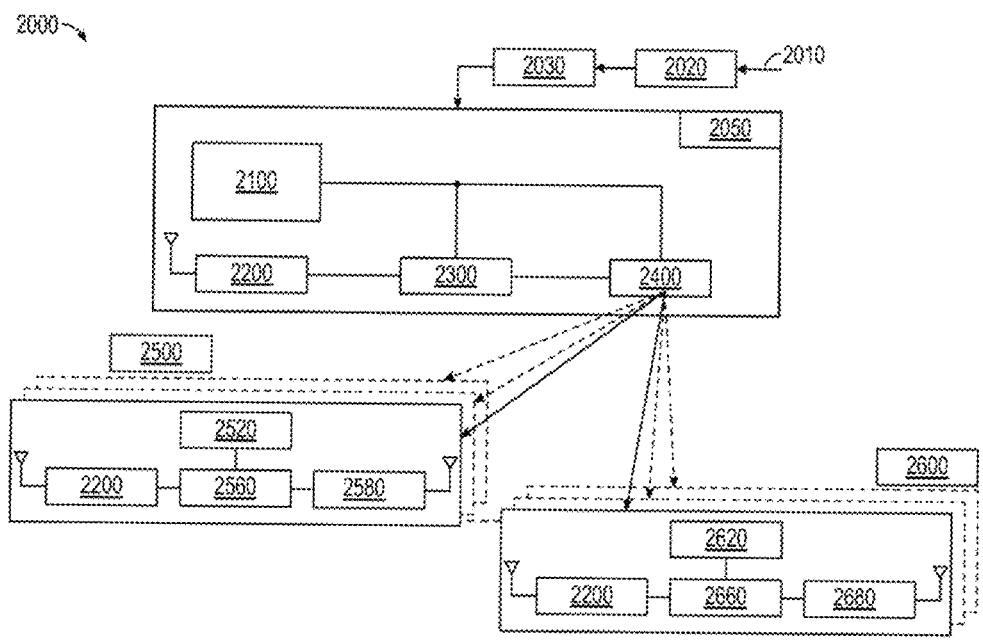
FIG. 4 is a block diagram of an embodiment of a system according to an embodiment disclosed herein.

FIG. 4 is a block diagram of an exemplary embodiment of a system 2000, which comprises a power generation source 2010, a long-haul transmission line 2020, a tower 2030, a WiGL base charger 2050 (which can be mounted), mobile units 2500, and mobile units 2600. WiGL base charger 2050 comprises energy source 2100 (e.g., line current or power ("AC") to direct current ("DC") energy converter) and a controller 2300. Wall mounted unit is communicatively coupled to a WP/LAN 2200 and is constructed to transmit multi-directional beams from multi directional antenna 2400. Mobile units 2500 comprise a battery charger 2520, a controller 2560, and a device receiver 2580. Mobile units are communicatively coupled to WP/LAN 2200. Mobile units 2600 comprise a battery charger 2620, a controller 2660, and a device receiver 2680. Mobile units are communicatively coupled to WP/LAN 2200. Mobile units 2500 and mobile units 2600 consume energy.

A mounted or stationary base charger is in electronic communication and augmented by a system controller. The system provides RF beam forming capabilities, which RF beams are formed and directed via communications transmitted via a formed ad hoc WiGL network. This Ad Hoc WiGL network may be created by software (code, application or other methods as outlined in the Institute of Electrical and Electronics Engineers (IEEE) standard 802.11) to determine the size, scope and needs of the WP/LAN. When an untethered device (e.g., an electronic device) needs charging, it requests charging via a signal transmitted via the ad hoc WiGL network. A particular base charger is selected by an information device coupled to the ad hoc WiGL network, which causes generation of a directed beam that is a radio frequency ("RF") beam. Upon receiving a request from the electronic device; one or more directional electromagnetic energy beams from the one or more transmitting antennas of the system are directed towards the device receiver of the electronic device at or near the determined location within the physical space in an amount sufficient to power and/or charge the electronic device. Upon motion of the electronic device as indicated by the dotted rectangles 2500 and 2600 within the physical space, the location of the electronic device is updated and at least one of the plurality of the directional electromagnetic energy beams is redirected from the one or more transmitting antennas toward the device receiver of the electronic device at or near the updated location in an amount sufficient to power and/or charge the electronic device. In embodiments, the information device determines the updated location of the untethered device and assigns a different beam if necessary. RF transmitted power may also be dynamically adjusted based the updated physical location and/or charging needs of the electronic device.

Figure 5:
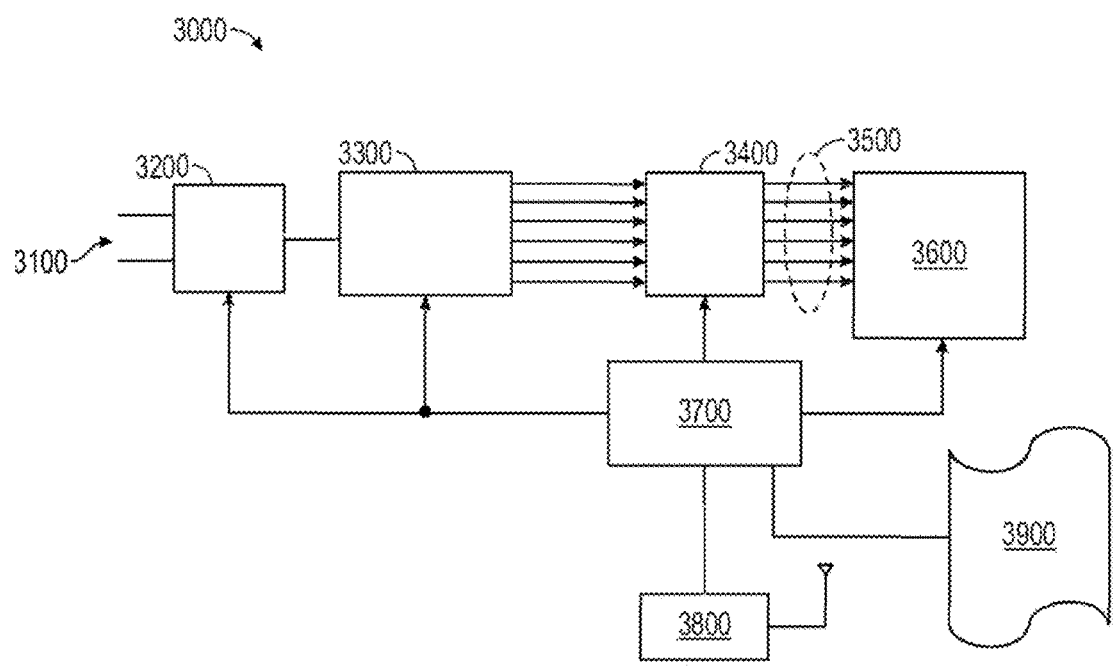
FIG. 5 is a block diagram of an embodiment a system according to an embodiment disclosed herein.

FIG. 5 is a block diagram of an exemplary embodiment of a system 3000. AC power 3100 enters system 3000 and is converted to DC power via converter 3200. System 3000 comprises a base band processor 3300, an RF processor 3400, a beam formation controller 3500, a multidirectional antenna array 3600 (which can comprise an antenna—e.g., a parabolic antenna), a system controller 3700, a LAN 3800, and machine instructions and/or software and/or hardware 3900.

As shown in FIG. 5, a base charger (and any auxiliary base charger) may comprise a converter 3200 that is constructed to convert electrical energy having an alternating current or direct current into wireless electrical energy; one or more base band processors 3300; an RF and/or an electromagnetic radiation processor ("EMR") 3400; a beam formation controller 3500; a wireless electrical grid router, e.g., which may be coincident with a system controller 3700; a multidirectional antenna array 3600, the multidirectional antenna array constructed to route and emit substantially wireless directional beams that are at least one of: directed in any of a plurality of directions; and transmitted substantially wirelessly via a locally available electromagnetic radiation, piezoelectricity, nanocrystal, or RF signal, RF signal comprising a RF directional electromagnetic energy beam; a system controller 3700 constructed to route energy based on a wireless electrical grid policy and routing tables; and enable electronic devices to be followed by the electromagnetic radiation (e.g. radio frequency) directional electromagnetic energy beams, which can be one of plurality of directional beams responsive to motion of electronic device, and which allows for a formation of an Ad hoc network that repeatedly calculates a position of electronic devices so as to redirect the electromagnetic radiation (e.g. radio frequency) directional electromagnetic energy beams to the device.

Figure 6:
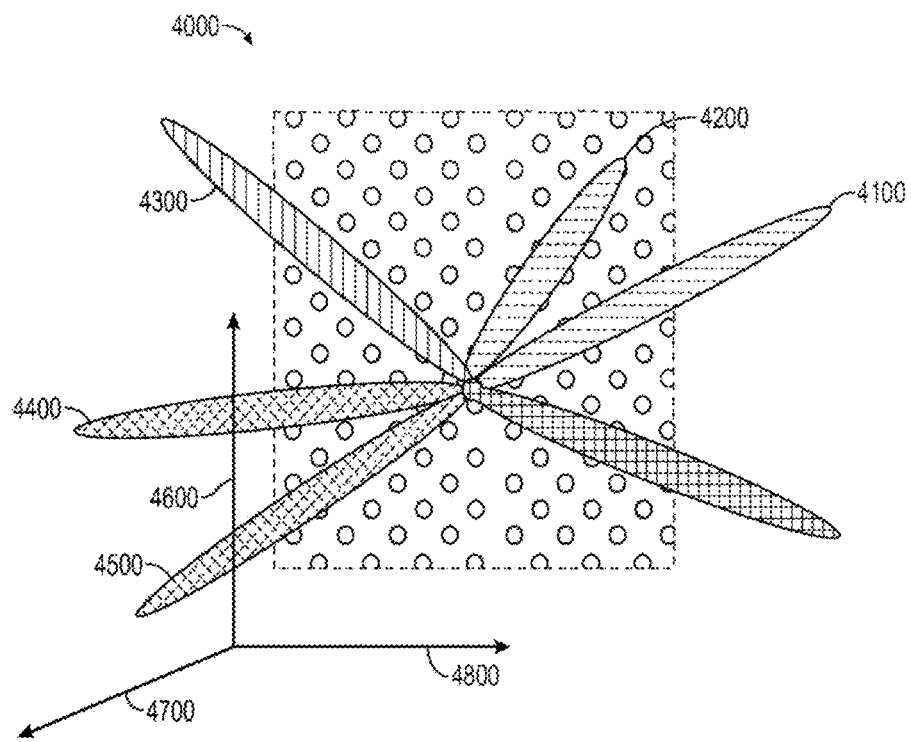
FIG. 6 is a block diagram of an embodiment of a multi directional antenna array according to an embodiment disclosed herein.

FIG. 6 is a block diagram of an exemplary embodiment of a multi directional antenna array 4000. RF energy is directed to a mobile device on a transmit side. The system detects a presence of the mobile device and assigns a charging RF beam for it. Multi directional antenna array 4000 transmits a first directional electromagnetic energy beam 4100, a second directional electromagnetic energy beam 4200, a third directional electromagnetic energy beam 4300, a fourth directional electromagnetic energy beam 4400, and a fifth directional electromagnetic energy beam 4500. Each directional electromagnetic energy beam can be directed in three-dimensional space relative to an x-axis 4800, a y-axis 4600, and a z-axis 4700. Via multi directional antenna array 4000, radio frequency energy is directed to a mobile device on the transmit side. In one or more embodiments, the systems can detect the presence of a mobile device and assign a charging radio frequency beam for the mobile device.

Figure 7:
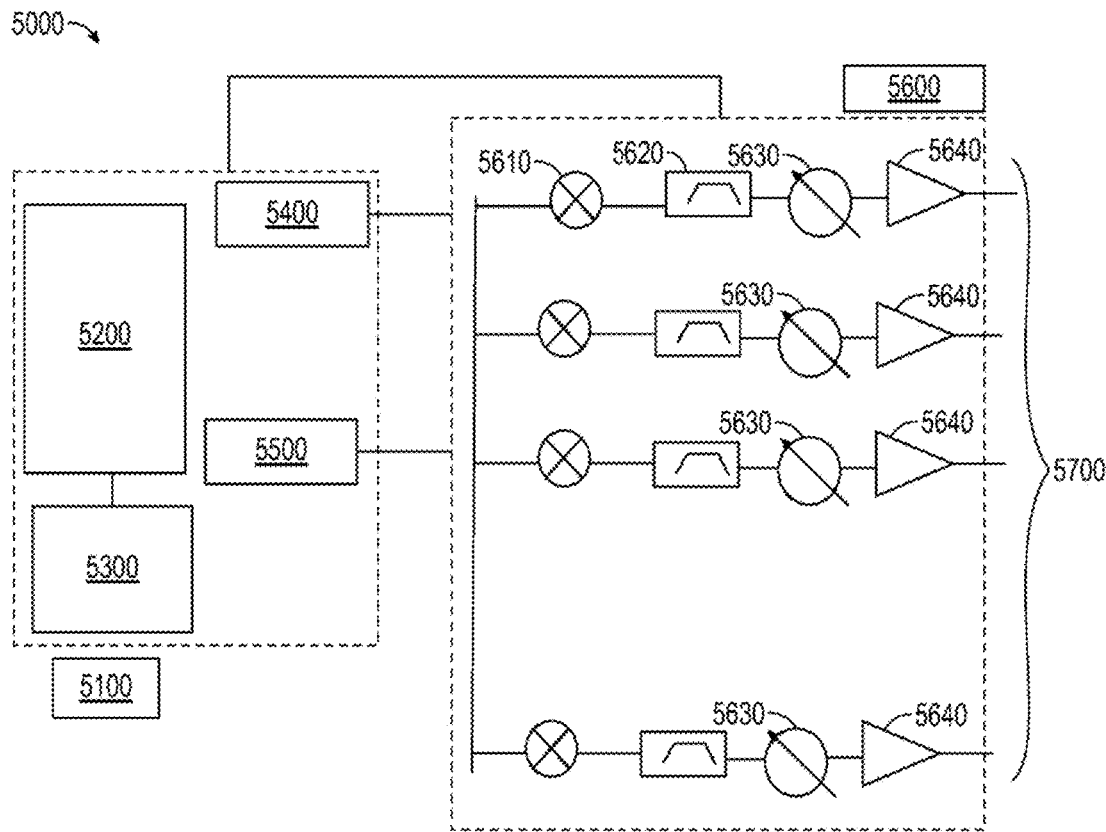
FIG. 7 is a block diagram of a wall mounted base charger system according to an embodiment disclosed herein.

FIG. 7 is a block diagram of an exemplary embodiment of a wall mount base charger system 5000, which comprises a baseband processor 5100 and an RF processor 5600. Baseband processor 5100 comprises a processor 5200, a controller 5300, modulators 5400, and beam control 5500. RF processor 5600 comprises a plurality of local oscillators 5610, a plurality of band pass filters 5620, a plurality of phase shifters 5630, and a plurality of power amplifiers 5640 (e.g., power boosters). An output 5700 from base charger system 5000 flows to antenna elements.

Figure 8:
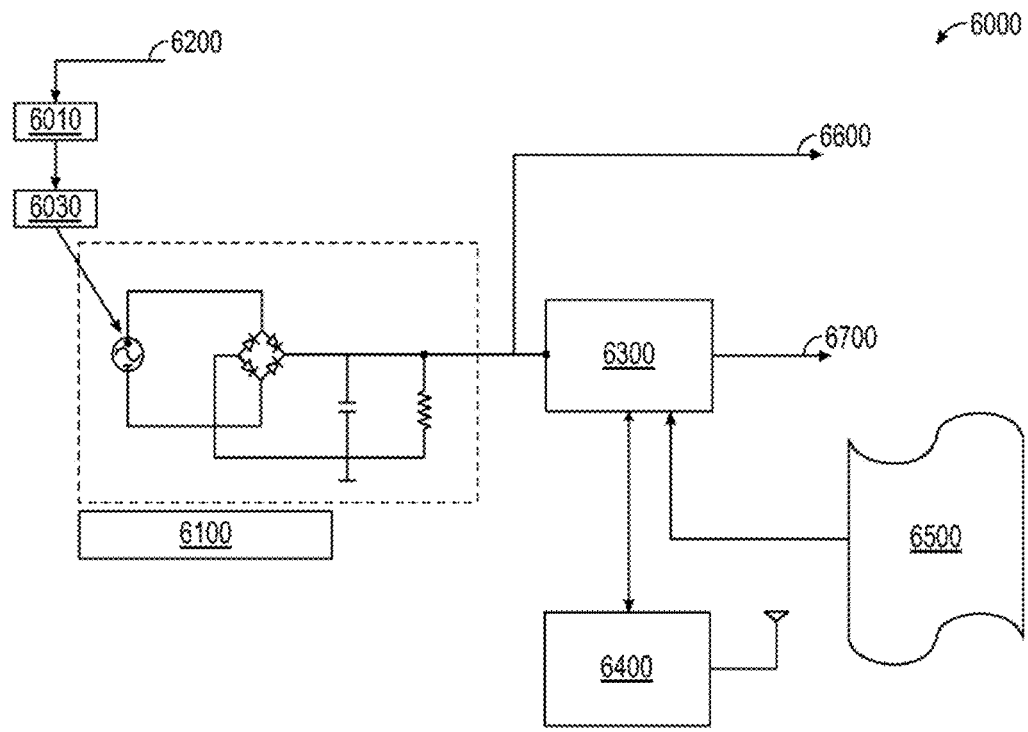
FIG. 8 is a block diagram of a wall mount base charger system according to an embodiment disclosed herein.

FIG. 8 is a block diagram of an exemplary embodiment of a wall mount base charger system 6000, which comprises an AC to DC power converter 6100 and a system controller 6300. AC to DC power converter 6100 receives electrical energy 6200, such as from a power circuit from a household wall outlet. In some embodiments, electrical energy 6200 can be received via an energy detector 6010 and/or an energy harvester 6030, which can receive energy into base charger system 6000 wirelessly. Outputs from AC to DC power converter 6100 comprise a power flow 6600 to an RF processor and an input signal to system controller 6300. System controller 6300 operates via machine instructions and/or software and/or hardware 6500 (e.g., a program). System controller 6300 is communicatively coupled to a WP/LAN 6400. System controller 6300 outputs a control signal 6700 to an RF and/or broad band processor.

In some embodiments, substantially untethered devices (e.g., electronic devices) determine a need for power and/or charging and requests power via an ad hoc WiGL network. An information device coupled to the ad hoc WiGL network determines locations of each of the substantially untethered devices.

The information device coupled to the ad hoc WiGL network determines which device needs to be charging, where it is, and which wall mounted base charger will be directed to perform the charging. The selected wall base charger generates a directed beam pointing toward a particular untethered unit and charging starts. Untethered unit locations are constantly being determined and/or updated by information device coupled to the ad hoc WiGL network. Each untethered unit monitors its own charging state, its location and communicates that charging state to the information device.

Figure 9:
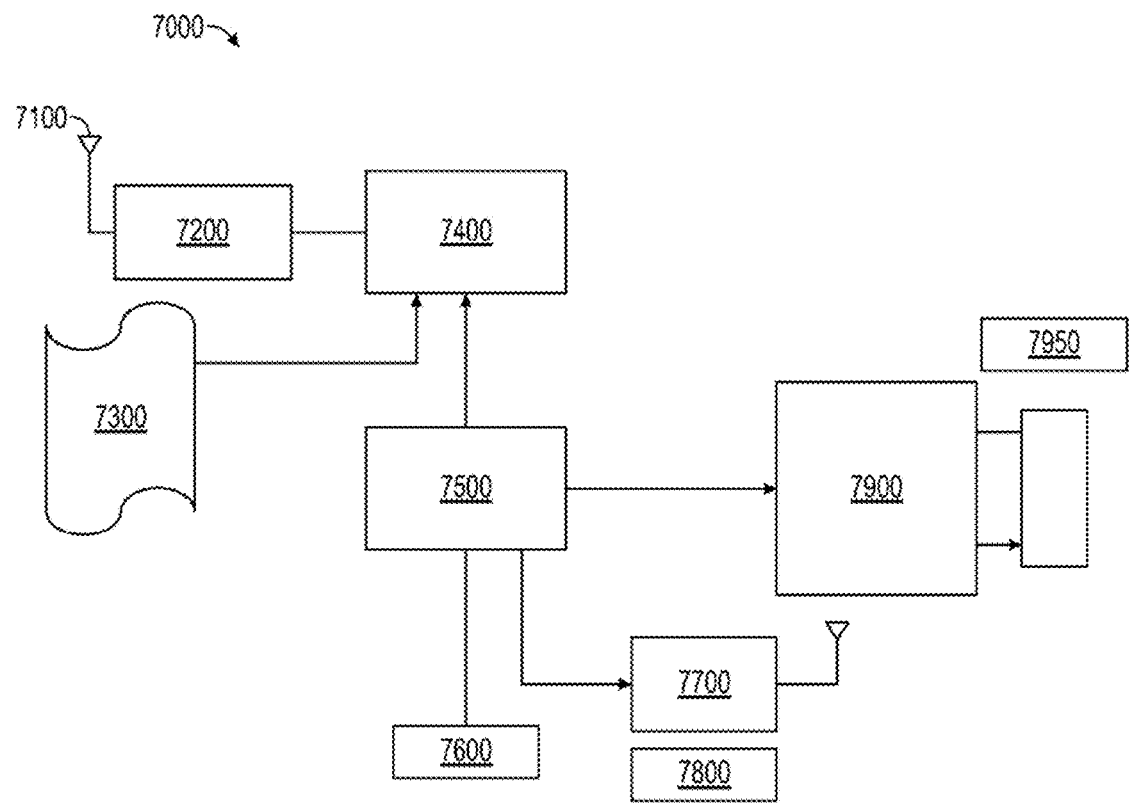
FIG. 9 is a block diagram of an embodiment of a system according to an embodiment disclosed herein.

FIG. 9 is a block diagram of an exemplary embodiment of a system 7000, which comprises an antenna 7100, an RF processor 7200, a baseband processor 7400, a controller 7500, an inertia measurement unit ("IMU") 7600, a baseband battery charging circuit 7900, and a battery 7950. Controller 7500 is communicatively coupled to a WP/LAN 7700. WP/LAN 7700 is communicatively coupled to a transmission channel 7800. Machine instructions and/or software and/or hardware 7300 are utilized by controller 7500 in processing signals that direct charging of battery 7950 via baseband battery charging circuit 7900. IMU 7600 assists in determining locations of devices communicatively coupled to controller 7500. Some embodiments can be implemented as an appliqué or as an integral part of the device that needs to be charged.

Figure 10:
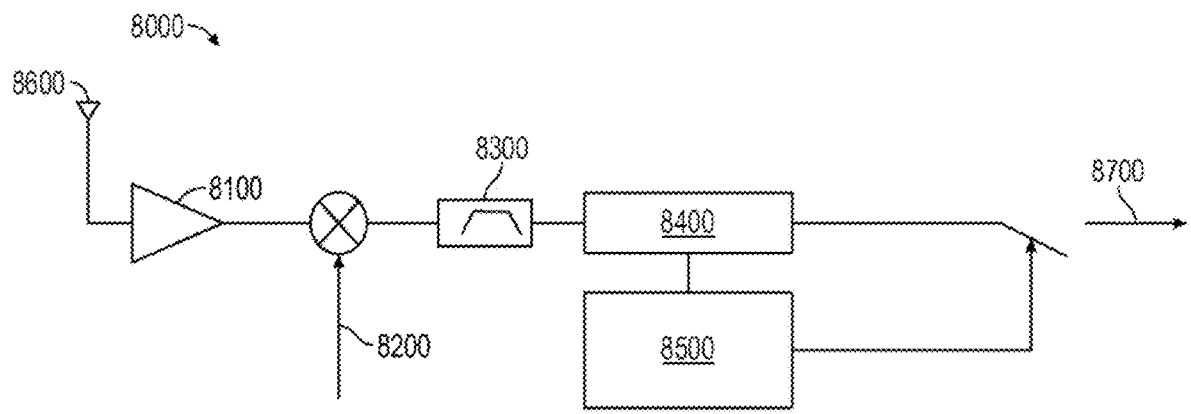
FIG. 10 is a block diagram of an embodiment of a mobile unit electromagnetic/BB processor system according to an embodiment disclosed herein.

FIG. 10 is a block diagram of an exemplary embodiment of a mobile unit RF/BB processor system 8000, which comprises a low noise amplifier 8100, a local oscillator 8200, a band pass filter 8300, a demodulator 8400, and a processor 8500. Processor 8500 performs an RF destination calculation and causes an RF signal 8700 to a battery charger. An omnidirectional antenna 8600 receives RF energy, demodulates, and determines the destination of a directional beam. If the directional beam is assigned to charge an electronic device, the DC electrical energy is available to charge a battery of the electronic device.

Figure 11:
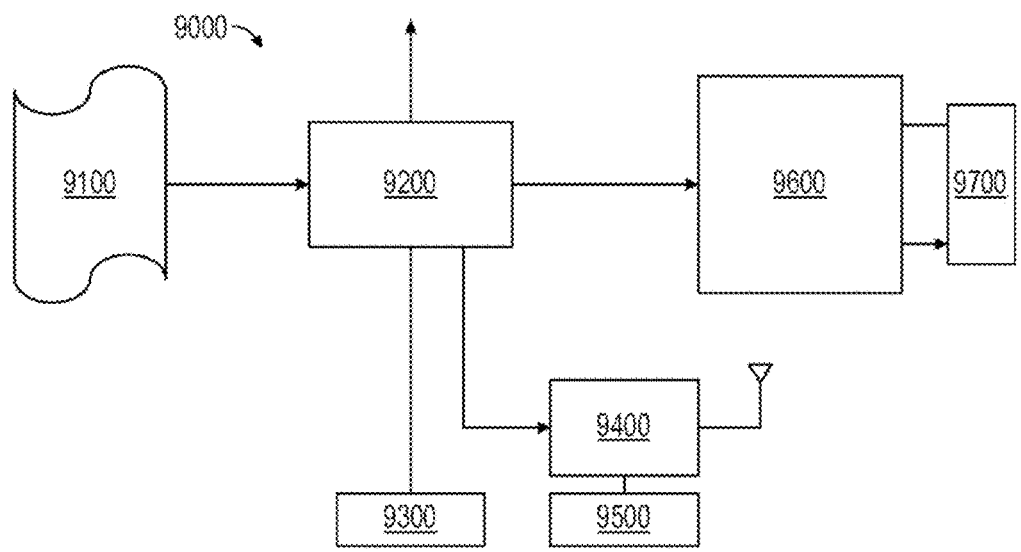
FIG. 11 is a block diagram of an embodiment of a system according to an embodiment disclosed herein.

FIG. 11 is a block diagram of an exemplary embodiment of a system 9000, which comprises a controller 9200, an IMU 9300, a baseband battery charging circuit 9600, and a battery 9700. Controller 9200 is communicatively coupled to a LAN 9400. LAN 9400 is communicatively coupled to a transmission channel 9500. Machine instructions and/or software and/or hardware 9100 are used by controller 9200 to facilitate charging of battery 9700.

Via machine instructions and/or software and/or hardware 9100, controller 9200 determines if an electronic device comprising battery 9700 needs charging and issues a request via LAN 9400. LAN 9400 can be an ad hoc WiGL network. IMU 9300 provides a coarse (i.e., loosely approximated) location information that is transmitted collaboratively via the ad hoc network to determine a fine (i.e., more accurately approximated) location. In some embodiments, LAN 9400 can be coupled to an ad hoc network. When a beam is assigned to battery 9700, the charging of battery 9700 starts.

Machine instructions and/or software and/or hardware 9100 determine if a unit needs charging and issues a request via the ad hoc WiGL network. IMU 9300 provides a coarse location information that is used collaboratively via signals transmitted over the ad hoc WiGL network to determine fine location information. When a beam is assigned, the charging starts.

Figure 12A:
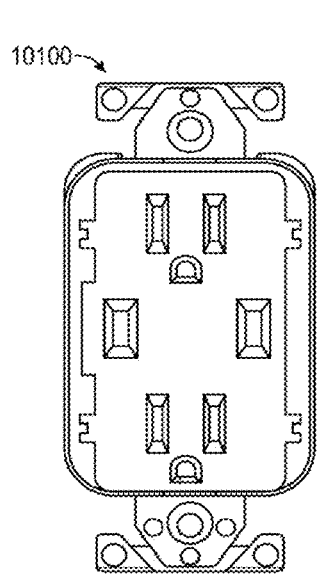
FIG. 12A is a drawings of components of a system according to embodiments disclosed herein.
Figure 12B:
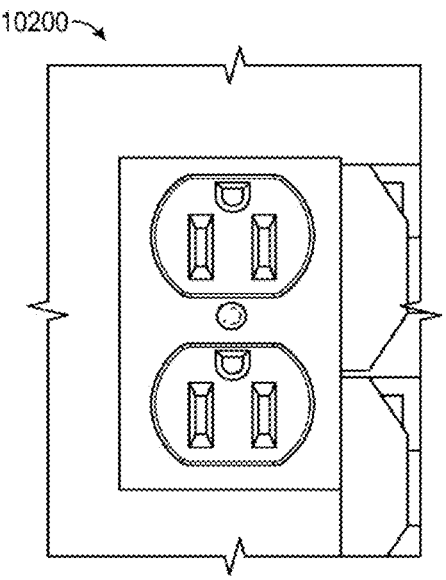
FIG. 12B is a drawings of components of a system according to embodiments disclosed herein.
Figure 12C:
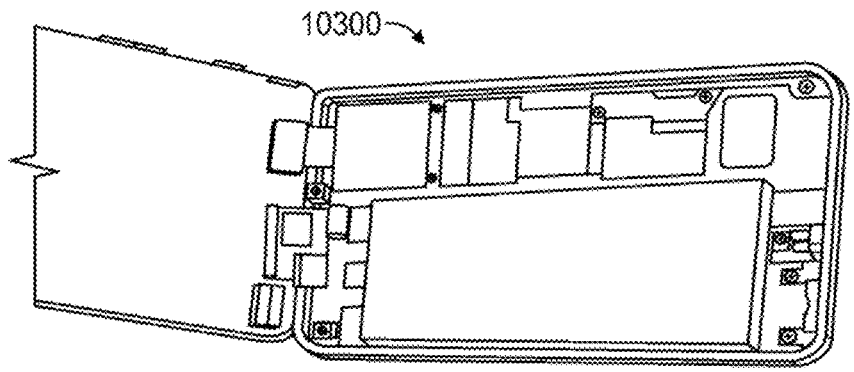
FIG. 12C is a drawings of components of a system according to embodiments disclosed herein.

FIG. 12 comprises images 10000 of exemplary embodiments, which comprise an electrical receptacle 10100. A base charger 10300 can be of a form to be directly coupled to electrical receptacle 10100. When so coupled, base charger 10300 can cause electrical receptacle 10100 to have an appearance of installed base charger 10200.

In some embodiments, a WiGL packet switching power network is provided in which WiGL acts as an energy delivery from a source to any energy consuming entity. WiGL entities comprise electronic devices such as phone, laptops, home appliances, trucks, cars, buses, motorcycles, unmanned aerial vehicles ("UAVs"), planes and satellites. Energy to be distributed by WiGL can be solar or any other form. WiGL determines what devices need how much energy and delivers energy to devices in an efficient manner. WiGL treats energy consuming entities that store energy as possible sharers of energy to other devices, e.g., via auxiliary base chargers present in electronic devices. WiGL uses wired and wireless media to transfer energy. WiGL wireless delivery systems can use spark; acoustic; low, high, and very high RF frequencies; and/or laser energy.

In some embodiments the system detects devices that request power. In embodiments, WiGL requests energy from an energy source and packages energy into packets for delivery to devices. Each packet is sent to a selected device. In embodiments, WiGL queries devices concerning available energy to be delivered to other devices in the network.

In some embodiments, WiGL delivers power based on routing protocols in consideration of quality of service ("QoS"), which may be defined by a user for each entity.

Figure 14:
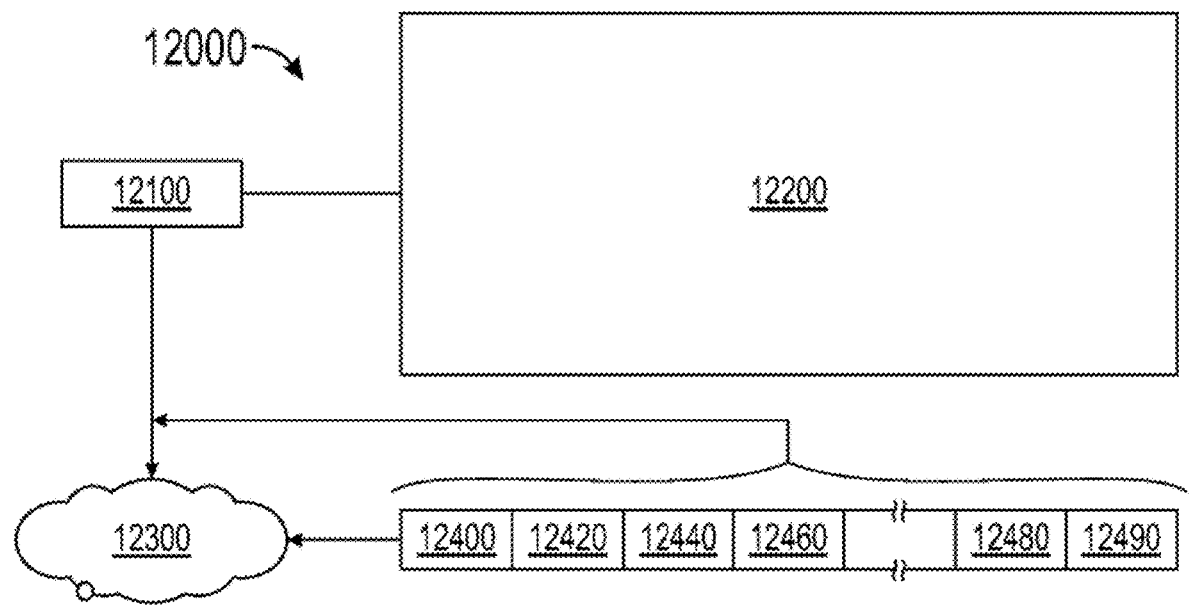
FIG. 14 is a block diagram of a system according to an embodiment disclosed herein.

FIG. 14 is a block diagram of an exemplary embodiment of a system 12000, which comprises a WiGL base charger 12100, machine instructions and/or software and/or hardware 12200 utilizable by WiGL base charger 12100, LAN of mobile electronic devices 12300, and set of packets 12400, 12420, 12440, 12460, 12480, and 12490. Machine instructions and/or software and/or hardware 12200 can direct WiGL base charger 12100 to assign packets of energy to be delivered to predetermined devices. Machine instructions and/or software and/or hardware 12200 can direct WiGL base charger 12100 to assign and route the set of packets to the predetermined devices. Machine instructions and/or software and/or hardware 12200 can route packets based upon a quality of service, which can be a function of urgency, how much power is needed, how often is the energy needed, and/or device local storage size, and the like.

Set of packets 12400, 12420, 12440, 12460, 12480, and 12490 are delivered to LAN of mobile electronic devices 12300 via WiGL base charger 12100 in time as a function of a routing protocols.

Some WiGL processes deliver power in two modes:

Wired: from energy sources to wireless edge WiGL routers;

Wireless: from point to point or point to multipoint radio frequency connections.

Some WiGL devices, systems, and/or methods package power in packets with destination addresses of the devices they are meant to go to. Some WiGL devices, systems, and/or methods utilize a routing protocol to optimize energy delivery. When a device and/or system desires charging, it requests charging via an ad hoc network. An associated WiGL router is selected by the ad hoc network and packs the energy packets them via a technique such as time-division multiple access or frequency-division multiplexing. Energy packets are routed based on quality-of-service parameters defined by a user. A WiGL base charger determines the location of the un-tethered unit and assigns a different beam if necessary. Radio frequency transmitted power can be dynamically adjusted based the location and/or charging requests of an untethered unit.

Figure 15:
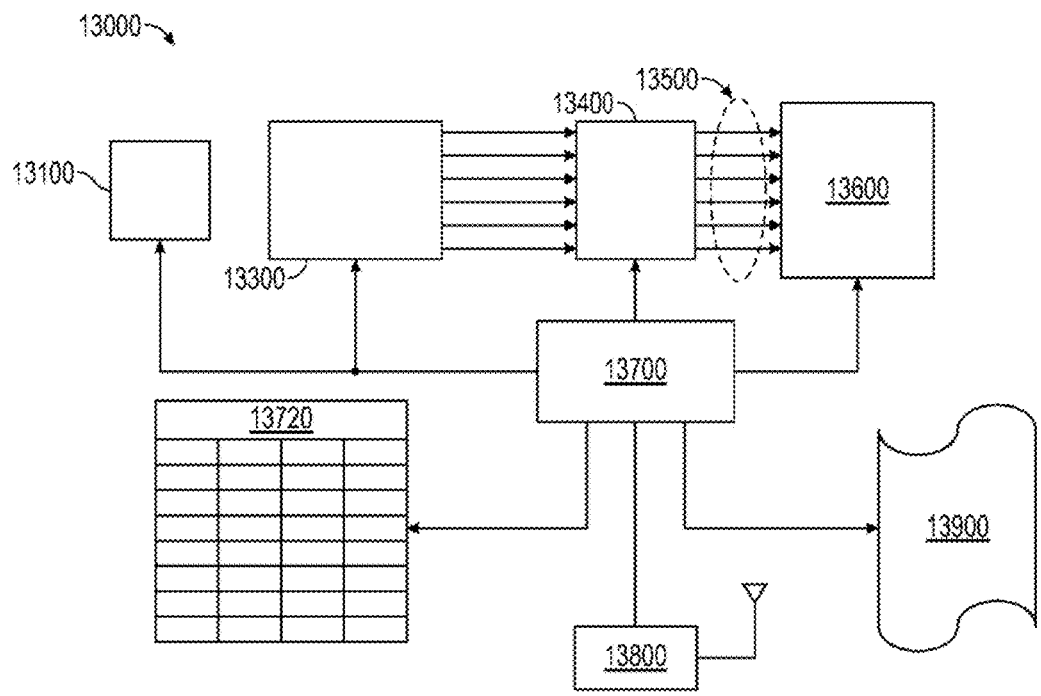
FIG. 15 is a block diagram of a system according to an embodiment disclosed herein.

FIG. 15 is a block diagram of an embodiment of a system 13000. Deliverable energy 13100 enters system 13000 and is processed via base band processor 13300 (e.g., converted to DC power). System 13000 comprises a radio frequency ("RF") processor 13400, a beam formation control 13500, a multidirectional antenna array 13600 (which can comprise an antenna—e.g., a parabolic antenna), a system controller 13700, a LAN 13800, and machine instructions and/or software and/or hardware 13900. System controller 13700 utilizes a WiGL routing table 13720, which can be utilized to route packets of energy to electronic devices via system 13000.

Figure 16:
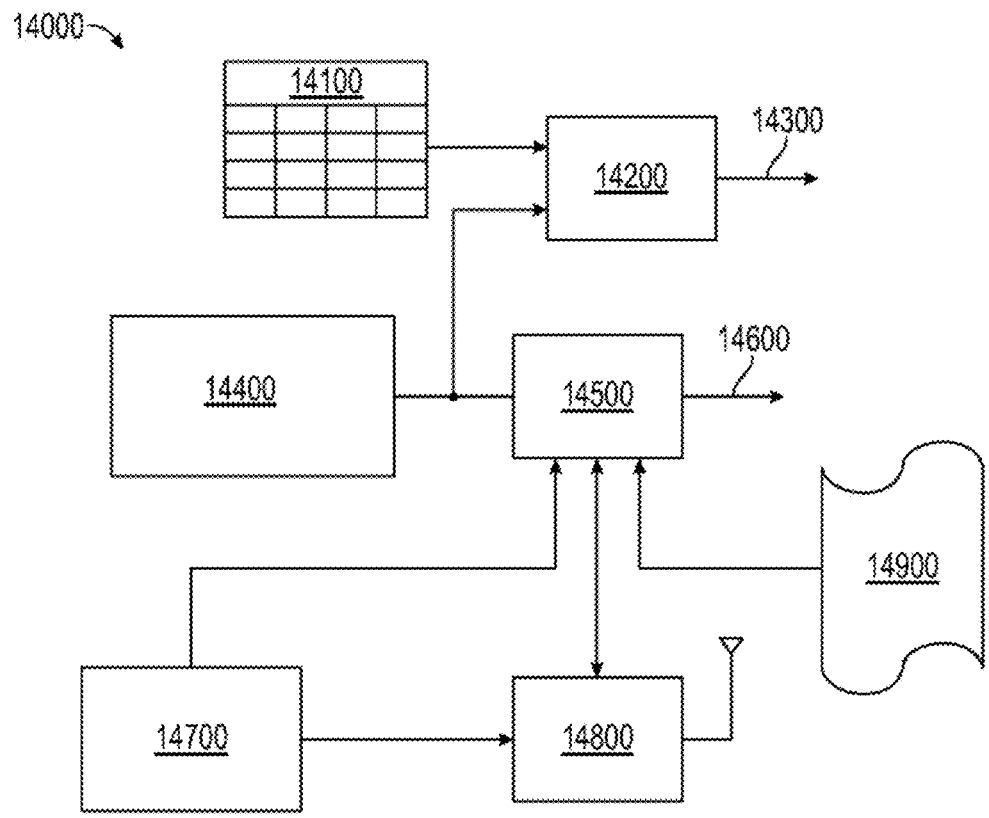
FIG. 16 is a block diagram of a system according to an embodiment disclosed herein.

FIG. 16 is a block diagram of an embodiment of a system 14000, which comprises a WiGL routing table 14100, a routing engine 14200, outgoing energy 14300 directed to an RF processor, energy to be delivered 14400, a system controller 14500, control signals 14600 routable to the RF processor and/or a base band processor, an energy saving monitor 14700, a LAN 14800, and machine instructions and/or software and/or hardware 14900.

In embodiments, WiGL systems provide for substantially untethered operation. Untethered devices signal a desire for charging and signal via an Ad hoc network to determine locations of the devices. One or more information devices coupled to the Ad hoc network determines and assigns one or more wall mounted units to perform the charging. The selected wall unit(s) generates a directed beam pointing toward the respective untethered devices and charging starts. Untethered device locations are substantially continuously being determined by the one or more information devices coupled to the ad hoc network. The untethered devices monitor their respective charging states. A new charging base (or auxiliary) station can be selected should a current one become obstructed and/or unreachable.

Figure 17:
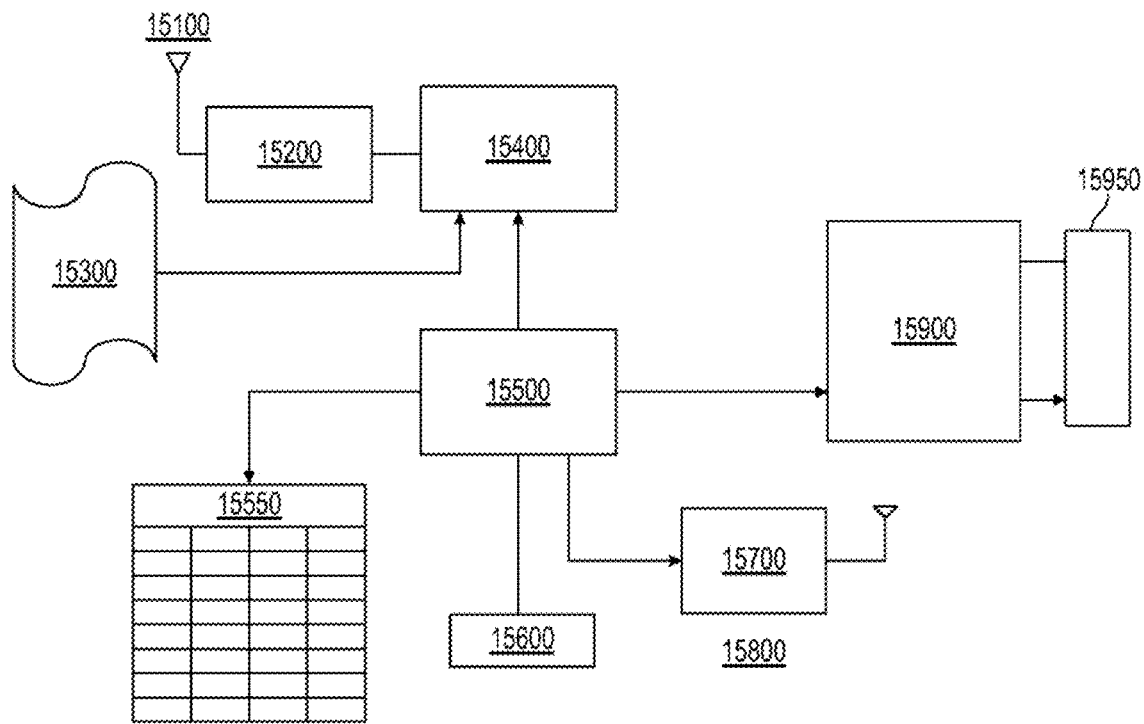
FIG. 17 is a block diagram of a system according to an embodiment disclosed herein.

FIG. 17 is a block diagram of an embodiment of a system 15000, which comprises an antenna 15100, an RF processor 15200, a baseband processor 15400, a controller 15500, an IMU 15600, a baseband battery charging circuit 15900, and a battery 15950. Controller 15500 is communicatively coupled to a WP/LAN 15700. WP/LAN 15700 is communicatively coupled to a transmission channel 15800. Machine instructions and/or software and/or hardware 15300 are utilized by controller 15500 in processing signals that direct charging of battery 15950 via baseband battery charging circuit 15900. IMU 15600 assists in determining locations of devices communicatively coupled to controller 15500. Controller 15500 can utilize a WiGL routing table 15550. Some embodiments can be implemented as a machine instruction application or as an integral part of the device that needs to be charged.

Figure 18:
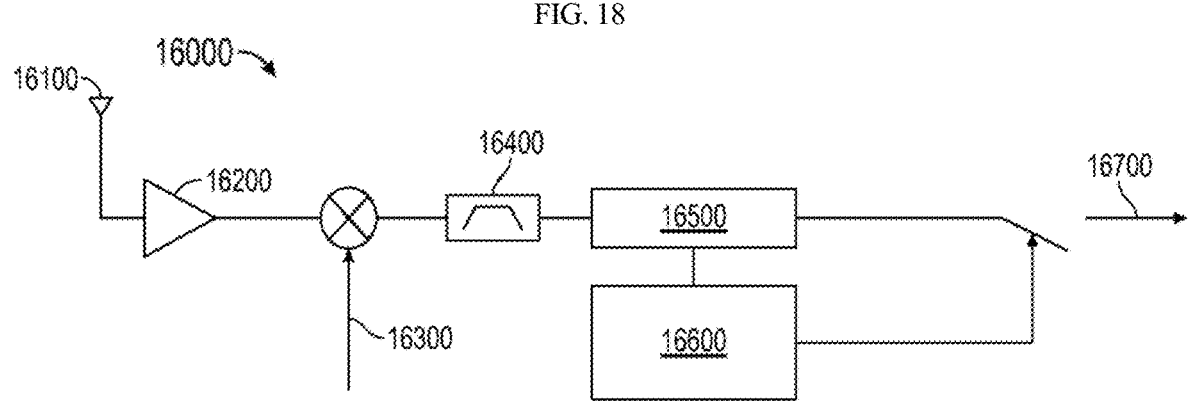
FIG. 18 is a block diagram of a WiGL mobile unit electromagnetics and/or base band processors according to embodiments disclosed herein.

FIG. 18 is a block diagram of an embodiment of WiGL mobile unit RFs and/or base band processors 16000, which comprises antennae 16100, a low noise amplifier 16200, a local oscillator 16300, a band pass filter 16400, a demodulator 16500, and an RF destination calculation device 16600. Energy 16700 is routable to a battery charger and/or other electronic device and/or system. An omnidirectional antenna receives RF energy, demodulates, and determines the destination of a beam. If the beam is assigned to provide energy to a device and/or system, energy (e.g., DC electrical energy is made available to charge one or more batteries).

Figure 19:
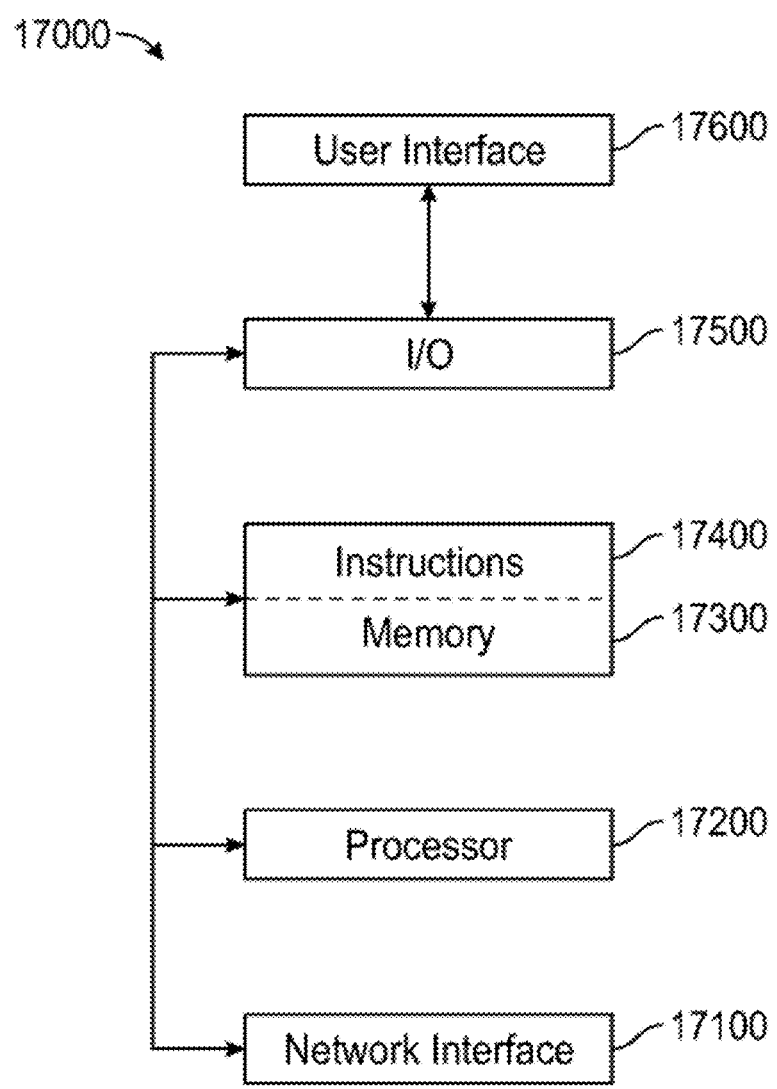
FIG. 19 is a block diagram of an information device according to an embodiment disclosed herein.

FIG. 19 is a block diagram of an embodiment of an information device 17000, which in certain operative embodiments can comprise, for example, the controllers 230, 256, and/or 266 shown in FIG. 3. Information device 17000 can comprise any of numerous circuits and/or components, such as for example, one or more network interfaces 17100, one or more processors 17200, one or more memories 17300 containing instructions 17400, one or more input/output (I/O) devices 17500, and/or one or more user interfaces 17600 coupled to one or more input/output (I/O) devices 17500, and the like.

In some embodiments, via one or more user interfaces 17600, such as a graphical user interface, a user can view a rendering of information related to charging and/or energizing devices via a charge controller. The user can also disable the charging and/or set the charging at certain times or power levels.

Figure 20:
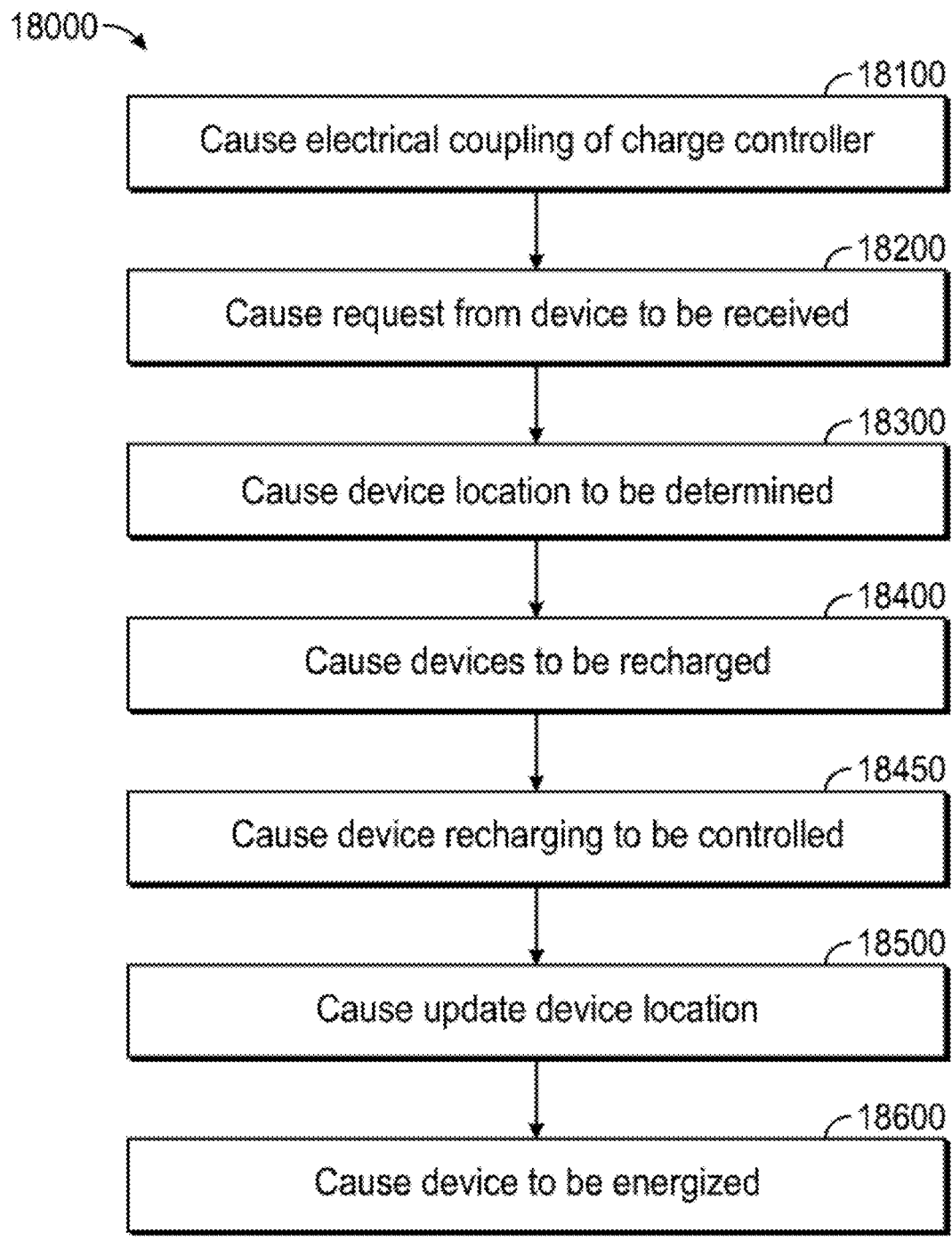
FIG. 20 is a flowchart of a method according to an embodiment disclosed herein.
Figure 21:
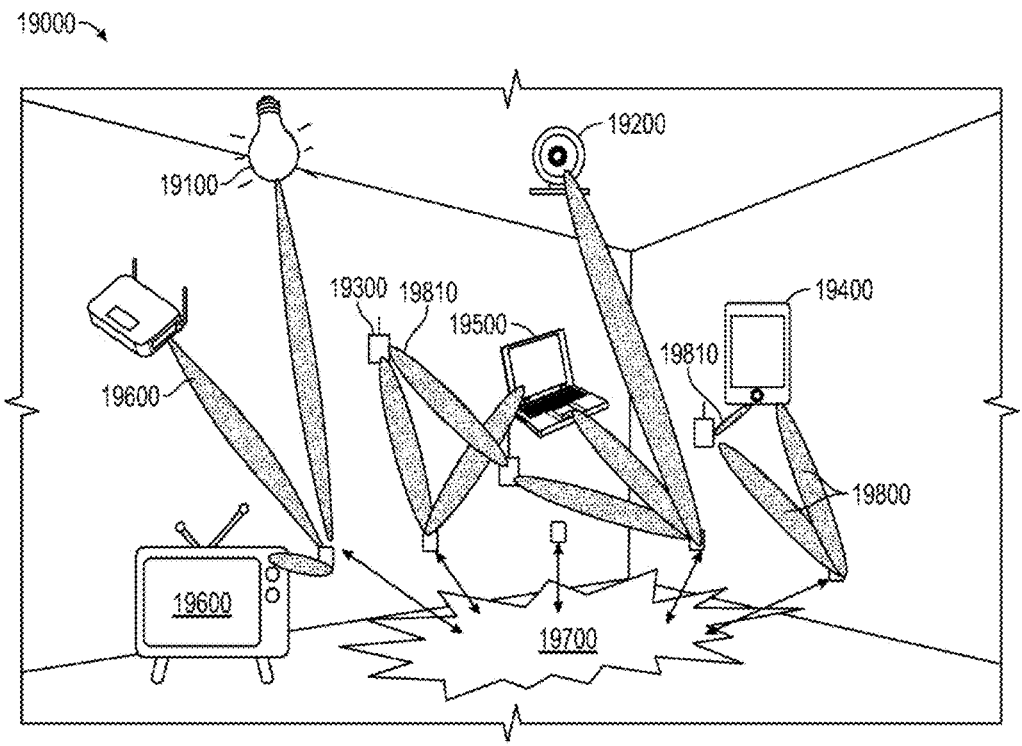
FIG. 21 is a block diagram of a system according to an embodiment disclosed herein.
Figure 22:
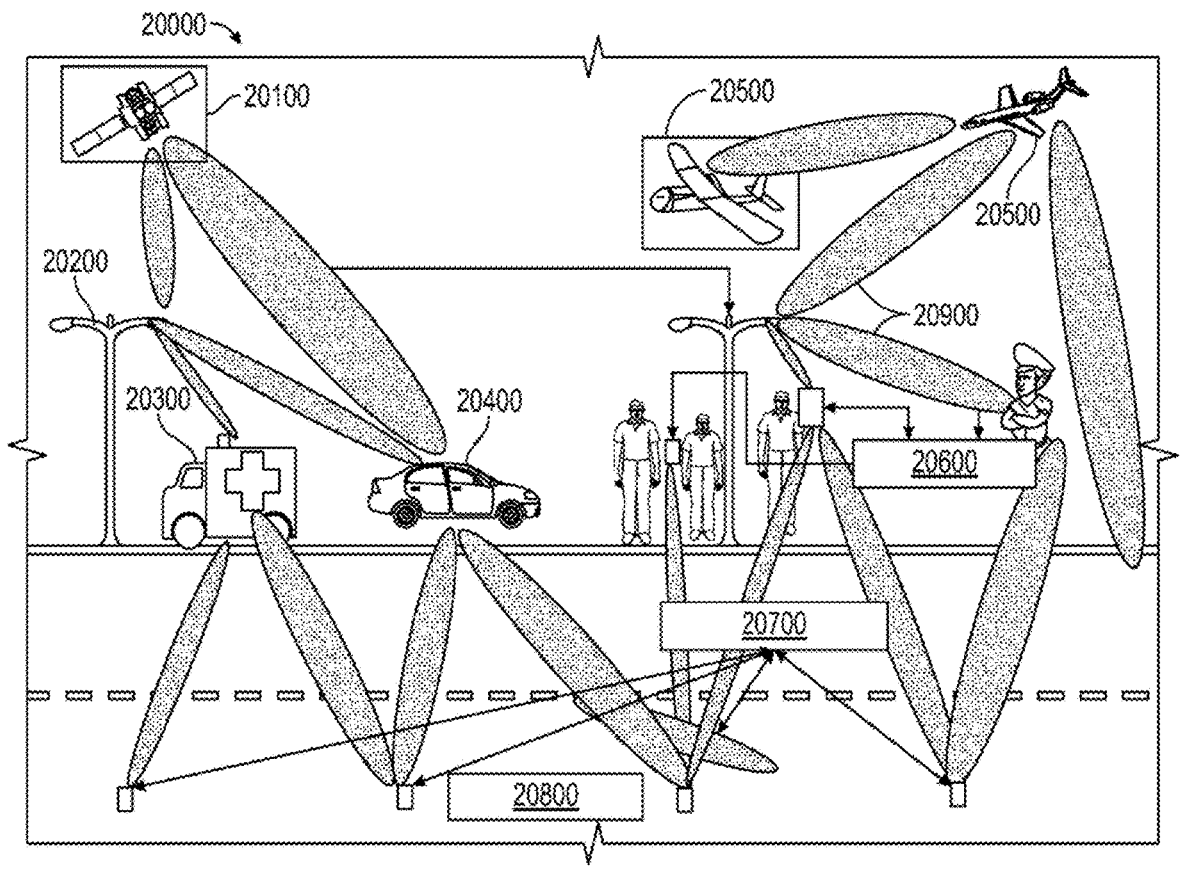
FIG. 22 is a block diagram of an embodiment of a system 20000.

FIG. 20 is a flowchart of an embodiment of a method 18000. At activity 18100, which in embodiments can cause a coupling of a charge controller to an electrical energy source (e.g., an electrical outlet, and the like). At activity 18200, in some embodiments can cause a request from a device to be received (e.g., a request to recharge a partially or nearly fully depleted battery). At activity 18300, in some embodiments can cause an electronic device to be located.

At activity 18400, some embodiments can cause the electronic device to be charged via the charge controller. Some embodiments comprise causing an electronic device to charge via a base and/or auxiliary base chargers of a plurality of base and/or auxiliary base chargers. Some of such embodiments comprise receiving a request to charge the electronic device. The base charger is coupleable to the electrical energy source. The base charger is constructed to direct and/or redirect a beam of electrical energy toward the electronic device such as to wirelessly charge and/or wirelessly power the electronic device. The base charger can be selected from the plurality of base chargers responsive to a first determination of a location of the electronic device and a second determination that a charging request has been received the electronic device. The beam of electrical energy is routed and/or directed responsive to the determination of the location of the electronic device. The electronic device can be coupled to a local area network and the base charger can also be coupled to the local area network. The local area network can comprise and/or be coupled to the electrical energy source. Radio frequency charging power can be dynamically controlled to provide low radiant power losses in the vicinity of devices to be charged. A charging element can be selected based on an optimum power delivered to the electronic device, based on at least one of:
  a requested speed of charging;
  request voltage or current;
  request a type of transmission or device receiver energy (e.g., RF, DC, AC, piezoelectricity, and/or nanocrystal) based on a WiGL routing policy and/or table; and/or
  a level of charge of a battery comprised by the electronic device.

At activity 18450, some embodiments cause device recharging to be controlled via the charge controller. At activity 18500, some embodiments cause the location of the electronic device to be automatically updated. Some of such embodiments cause redirection of one of the plurality of directional beams toward the updated location of the electronic device. Some embodiments provide a plurality of wireless electrical power electromagnetic radiation (e.g., radio frequency) transmissions into a general location. In embodiments, the electronic device charged is in range within which the base charger can cause a wireless powering, self-charge, or recharge. In embodiments, a charging element is selected based on an optimum power delivered to the electronic device, based on at least one of:
  requested speed of charging; and/or
  a level of charge of a battery comprised by the electronic device.

At activity 18600, some embodiments cause electrical devices to be energized via the charge controller.

Some embodiments cause routing tables, policies, methods, models, flow of wireless electrical grid LAN usage to be created, published and/or used. Some embodiments provide certifications of or related to the usage, maintenance, repair, and diagnosis of wireless electrical grid LAN usage.

Some embodiments provide for substantially wireless recharging of electronic devices. Some embodiments provide for recharging of electronic devices substantially without cords and/or outlets that are directly coupled to an electrical grid. Other embodiments provide for wireless recharging of electronic devices via a wireless charging system available via a network in a form of WiGL.

Some embodiments utilize an existing infrastructure via an alternating current or direct current power source. In some embodiments an existing infrastructure is utilized via universal serial bus ("USB") ports and/or recharger ports, and the like, of electronic devices. In some of such embodiments, WiGL systems are coupled to a power source such as via plugging into an electrical outlet. In other embodiments, WiGL systems are wirelessly coupled to electronic devices via an interface plugged into one or more USB ports of the electronic devices.

Some embodiments can utilize an antenna having a suitable gain ("dBi") (e.g., a 24 dBi parabolic antenna). The base charger can comprise a parabolic antenna. The base charger can comprise a parabolic antenna. Some embodiments can utilize components made by companies such as RF Diagnostics, LLC detect and/or harvest energy (e.g., one or more model number RFD102A-DET microwave energy detectors and/or one or more model number RFD102A-A microwave energy harvesting modules). Some embodiments transmit energy at a predetermined power output and frequency (e.g., approximately 0.5 watts at approximately 2.4 gigahertz). The base charger can comprise an energy detector. Some embodiments can light up to a predetermined count of detectors (e.g., eight or more detectors) at predetermined distances (e.g., distances of greater than approximately three feet and/or up to over 100 feet for transmission and/or reception). The base charger can be constructed to charge the electronic device with the electronic device at a distance of over 100 feet from the base charger. Some embodiments can provide a predetermined charge current at a predetermined voltage (e.g., approximately five milliamps at approximately 1.4 volts). Other embodiments can provide an energy efficiency for charging (e.g., greater than approximately 15% efficiency). Still other embodiments can use or cause WiGL to use communications access technologies to multiplex smart energy such as, frequency division multiple access (FDMA); time division multiple access (TDMA); code division multiple access (CDMA); orthogonal frequency division multiple access (OFDMA); and/or spatial division multiple access (SDMA), and the like.

Some embodiments provide for battery-to-battery WiGL capability (e.g., direct current to direct current charging) such as in vehicle and/or airplanes, and the like. The base charger can provide direct current to direct current charging.

Other embodiments provide wireless charging capabilities in systems comprising hardware, software and/or firmware constructed to implement methods of embodiments. Some of such embodiments can utilize one or more of apps, cards, radios and/or board technologies.

Some embodiments can provide laser or directed energy based WiGL, which can utilize substantially any energy source frequency on the sound or light spectrums.

Other embodiments can utilize a substantially single beam of WiGL.

Still other embodiments can utilize long haul transmissions, relays, and/or power boosting. The base charger can obtain electrical energy from a long-haul transmission line. A power booster can be utilized to expand a range of the base charger. Some embodiments can utilize cell towers and/or other tower technologies constructed to implement WiGL equipped devices, systems, and/or methods. Other systems can comprise a tower that is constructed to provide energy via the base charger.

In embodiments, the system determines a status of the electronic device. This status may include a physical property of the electronic device, e.g., a level of charge of the device, information on the brand, capacity, and/or requirements of the device, and/or the like. As shown in FIG. 13, in some embodiments, the method 1300 comprises providing a wireless charging system according to one or more embodiments disclosed herein 1310, determining a location of the electronic device with a physical space of the wireless charging system 1312, establishing electronic communication between the wireless charging system and the electronic device 1314, and determining of a status of the electronic device 1316, which in embodiments comprises determination of an authorization status of the device based on predetermined criteria according to a determination step 1318.

If the determination of an authorization status of the device returns a negative or "not authorized" status 1320, wherein the electronic device is not authorized to receive wireless charging from the wireless charging system, the method may include configuring the device receiver and/or the electronic device to prevent receiving wireless charging from the wireless charging system, and/or directing one or more directional electromagnetic energy beams from the one or more transmitting antennas to avoid the determined location of the device receiver of the electronic device within the physical space, and/or not directing one or more electromagnetic energy beams from the one or more transmitting antennas towards the device receiver of the electronic device, to at least partially prevent the device receiver of the electronic device from receiving one or more of the electromagnetic energy beams from the one or more transmitting antennas 1326.

If the determination 1318 of an authorization status of the device returns a positive or "authorized" status 1322, wherein the electronic device is authorized to receive wireless charging from the wireless charging system, the method may include configuring the electronic device to receive wireless charging from the wireless charging system according to one or more configuring criteria; and/or directing of one or more directional electromagnetic energy beams from the one or more transmitting antennas towards the device receiver of the electronic device at or near the determined location within the physical space in an amount sufficient to power and/or charge the electronic device according to one or more of the configuring criteria 1324.

This authorization status comprising a determination by the system whether or not the electronic device is authorized to receive wireless charging from the wireless charging system may be based on one or more predetermined authorization criteria. For example, in an embodiment wherein the wireless charging of an electronic device is provided on a fee-based arrangement, such as via subscription. When the system determines that the device is authorized to receive wireless charging from the wireless charging system, a "positive" authorization is obtained. When the system determines that the device is not authorized or unauthorized to receive wireless charging from the wireless charging system, a "negative" authorization is obtained.

In embodiments, the determining of the authorization status comprises determining if the electronic device is, or is not associated with a user account authorized to receive wireless charging from the wireless charging system, based on one or more predetermined authorization criteria.

In some embodiments, the authorization criteria include an authorization key, a lookup table, an identifier unique to the electronic device, an indication of the electronic device comprising an active service subscription, an indication of the electronic device comprising an active prepaid subscription, or a combination thereof.

In embodiments, the subscription verification comprises a machine-to-machine (M2M) process. In embodiments, the device to be charged receives a subscription request message for a subscription target resource. In embodiments, the subscription request message contains identification information of the electronic device and/or identification information of the of the wireless charging device. The verification may further include a checking step, wherein the wireless charging system determines whether or not the first device has a right for the subscription target resource.

In embodiments, the process may further include a determination by the wireless charging system whether or not the first device is compatible with, and/or what the optimum parameters are for wireless charging of the first device and/or if the resources are available to the wireless charging system, based at least partially on the identification information of the electronic device.

When the electronic device and the wireless charging device are determined to be compatible, the process may include a step comprising transmitting a notification message to the wireless charging device, the notification message including the identification information of the first device, identification information of the M2M device, and parameter information indicating a verification request; and receiving a response message from the wireless charging device in response to the notification message.

In embodiments, a privilege check for the subscription request may be performed by the wireless charging system based at least partially on the identification information of the first device and the response message may comprise a result of the privilege check performed by the wireless charging device.

In embodiments, the privilege check performed by the wireless charging device includes checking whether or not the first device has a right capable of transmitting a notification message to the wireless charging device. In some embodiments, the privilege check performed by the wireless charging device includes checking whether or not the first device has a right capable of configuring subscription for transmitting a notification message to the wireless charging device.

In one or more embodiments, the process may further comprise transmitting a temporary acceptance message for the subscription request message to the first device before the step of transmitting the notification message to the wireless charging device. In some embodiments, the process may further comprise determining whether or not a result of the privilege check performed by the wireless charging device is successful. When the result of the privilege check is successful, transmitting a subscription grant message to the first device. When the result of the privilege check is failure, cancelling the resource subscription. In embodiments, when the result of the privilege check is failure, transmitting a message for indicating that the resource subscription has been canceled to the first device, which in some embodiments the subscription request message comprises subscription information for creating a subscription resource, which may also include temporarily storing the subscription information.

In some embodiments, the subscription request message may comprise subscription information for creating a subscription resource in the first device. In such embodiments, the process may further comprise creating a subscription resource based on the subscription information.

In embodiments, the identification information of the first device is stored in creator attribute information of the subscription resource and the notification message may be generated when a notification event occurs in the device and the notification event comprises a status change of the subscription target resource. In other embodiments, the notification message is generated in the wireless charging system irrespective of an occurrence of a notification event.

In some embodiments, the identification information of the first device comprises address information indicating an originator of the subscription request message, and the identification information of the wireless charging device comprises address information indicating a notification target of the notification message. In one or more embodiments, the resource corresponds at least in-part to a data structure capable of being uniquely addressed using a unique address. In embodiments, the response message type information of the subscription request message indicates one of a blocking request, a synchronous non-blocking request, or an asynchronous non-blocking request.

In other embodiments, a method for determining and granting access of a device to be charged by the wireless charging system via subscriptions between the wireless charging system and the device may include receiving a subscription request associated with a machine-to-machine configuration, and/or a machine-to-machine network server. Responsive to the receipt of a notification associated with the received request, determining the device associated with the received notification, which may include an originator of the received request; and transmitting, to the device a notification message associated with the received notification. In embodiments, the step of determining includes comparing the received subscription request with at least one previously received subscription and/or comparing the received subscription request with a set of subscribed events stored in a table, e.g., a traffic table and/or the like. In embodiments, the method further includes the step of responding to the originator of the request subsequent to the step of determining. In embodiments, the method includes the step of updating a traffic table to reflect the received subscription. In embodiments, the received request is or comprises a hypertext transfer protocol request.

In embodiments, a method for authenticating a wireless device to be charged includes accessing a network via wireless communication with the wireless charging device. This may include utilizing one or more authentication information elements transmitted between the wireless charging device and the device in a bidirectional exchange involving one or more messages, the one or more authentication information elements including data for use in an authentication handshake procedure involving the one or more messages and for establishing that both the wireless charging device and the device possess a common or specific cryptographic key, and/or one or more of a beacon frame, an association request frame, and an association response frame, and wherein the data includes an arbitrary number that can be used just once in a cryptographic communication, e.g., a "nonce", for use in an authentication handshake procedure; and a message integrity check value for use in the authentication handshake procedure. In embodiments, the method may further comprise receiving one or more further authentication information elements received by one or more of the devices, which may be based on exchange of the one or more authentication information elements and the one or more further authentication information elements.

In embodiments, one or more authentication information elements are transmitted from the device to the wireless charging device.

In embodiments, at least some of the steps performed are done in parallel with the authentication procedure. In embodiments, the data includes a key identifier indicative of which key of a plurality of pre-shared keys is to be used in the authentication procedure. In some embodiments, the authentication procedure comprises transmitting a first authentication information element from the wireless charging device to the device, the first authentication information element including a first nonce value; subsequently transmitting a second authentication information element from the device to the wireless charging device, the second authentication information element including a second nonce value and a Message Integrity Check value; and subsequently transmitting a third authentication information element from the wireless charging device to the device, the third authentication information element including a further Message Integrity Check value, wherein the authentication information elements include the first authentication information element and the third authentication information element; or the second authentication information element.

In embodiments, the data between the wireless charging device and the device to be charged includes one or more uniform resource identifiers, a timestamp parameter, or a combination thereof.

In embodiments, the system and/or the method further comprises causing the electronic device to present an indication perceivable by an end user of the electronic device, indicating the authorization status of the electronic device. This may be via a network transmission originated by the wireless charging system to the electronic device, or originated by an ancillary device associated with the wireless charging system, e.g., an access control server or other access control function or system. The indication may be via text (SMS) message, may result in a graphic message displayed on the electronic device, an automated telephone call, a haptic indication, and/or the like.

In some embodiments, wherein the determining of the authorization status results in the electronic device not being authorized to receive wireless charging from the wireless charging system, a negative authorization result, the method further comprises causing the electronic device to present an indication perceivable by the end user of the electronic device. In some embodiments the method further comprises allowing the end user to change the authorization status of the electronic device to being authorized to receive wireless charging from the wireless charging system.

In some embodiments, allowing the end user to change the authorization status of the electronic device to being authorized to receive wireless charging from the wireless charging system comprises a request for, and a verification of a financial transaction which ultimately results in a transfer of funds. This may include a conventional currency operated device wherein the intended end user may provide currency directly to a recipient device and/or a card-operated device whereby the user paying by card is connected to a credit card transaction center to obtain an authorization code. This may also include the use of prepaid cards and other RFID credit cards for paying small amount offline without the need of signing a credit card voucher. This may include cryptocurrency, blockchain currency or transactions, and/or the like.

In other embodiments, and authorization payment may be made via one or more online payment methods, e.g., PayPal, via communication with a bank account direct debit system and a back-end pay-by-phone server computer system, and/or the like so that fees can be directly debited from users' bank accounts, credit card accounts, or telephone payment accounts. In this manner, a user can have multiple payment options including swiping a contactless IC prepaid card, via a contactless IC card reader unit or paying by dialing a cell phone via the remotely controllable pay-by-phone unit according to commonly understood systems known in the art.

In embodiments, wherein the determining of the authorization status results in the electronic device being authorized to receive wireless charging from the wireless charging system (a positive authorization result), the method further comprises and/or the system is configured to configure the electronic device (or the device receiver associated with the electronic device) to receive wireless charging from the wireless charging system according to one or more configuring criteria. This may include providing various frequencies to the device, and/or switching of various frequencies of the directional electromagnetic energy beams directed to the device according to a predetermined schedule.

In a related embodiment, the electromagnetic energy beams is not directed to the device, or is only partially directed to the device, but is instead broadcast to an entire area. The ability of the device to receive the wireless charging is controlled by switching of the various frequencies and/or utilizing packet switching and/or the like according to a schedule determined by the wireless charging system and/or the electronic device to enable the electronic device to receive adequate power for charging.

In embodiments, a positive authorization result includes the method or the system being configured to directing of one or more directional electromagnetic energy beams from the one or more transmitting antennas towards the device receiver of the electronic device at or near the determined location within the physical space in an amount sufficient to power and/or charge the electronic device according to one or more of the configuring criteria, as compared to a negative authorization result wherein directing the electromagnetic energy beam in the direction of, or to the location of the unauthorized device is avoided. In doing so, at least a portion of the energy that would be received by an authorized device is prevented from being received by an unauthorized device.

In some embodiments, the determining of a status comprises a determination of one or more physical properties and/or states of the electronic device, and directing of the one or more directional electromagnetic energy beams from the one or more transmitting antennas towards the device receiver of the electronic device at or near the determined location within the physical space in an amount sufficient to power and/or charge the electronic device, based on at least one of the physical properties and/or states of the electronic device and/or based on one or more predetermined criteria.

In some embodiments, wherein the authorization status results in the electronic device not being authorized to receive wireless charging from the wireless charging system, the method further comprises and/or the system is configuring to configure the device receiver and/or the electronic device to prevent receiving wireless charging from the wireless charging system. This may be achieved via a network connection, and/or may be included in or in unison with the electromagnetic beam directed towards the electronic device.

Likewise, wherein a negative authorization status is determined, the method further comprises or the system is configured to direct one or more directional electromagnetic energy beams from the one or more transmitting antennas to avoid the determined location of the device receiver of the unauthorized electronic device within the physical space, and/or the system stops directing one or more electromagnetic energy beams from the one or more transmitting antennas towards the device receiver of the electronic device, to at least partially prevent the device receiver of the electronic device from receiving one or more of the electromagnetic energy beams from the one or more transmitting antennas.

EMBODIMENTS LISTING

Embodiments of the instant disclosure include the following:

E1. A wireless charging system, comprising:
  a system controller in electronic communication with at least one wireless base charger system coupled to a power source, at least one transmitting antenna, the wireless charging system configured to determine a location of at least one device receiver located within a physical space and to provide wireless energy delivery comprising directing one or more directional electromagnetic energy beams from at least one transmitting antenna to the location of the device receiver at a distance greater than or equal to 50 cm from the transmitting antenna;
  each device receiver configured to receive and convert one or more of the directional electromagnetic energy beams into electrical energy and store at least a portion of the electrical energy in an intermediary electrical storage device, and to direct electrical energy from the intermediary electrical storage device to a connected electronic device in electrical connection with the device receiver, to charge and/or power the connected electronic device.

E2. The wireless charging system according to embodiment E1, wherein the device receiver is configured to be removably electrically connected to the electronic device via a disengageable connecter.

E3. The wireless charging system according to embodiment E1 or E2, wherein the system controller is configured to update the location of the device receiver within the physical space and upon motion of the device receiver within the physical space, update the location of the device receiver and direct one or more directional electromagnetic energy beams from the at least one transmitting antenna of the base charger system toward the updated location of the device receiver.

E4. The wireless charging system according to any one of embodiments E1 through E3, further comprising peer-to-peer power transmission, wherein each device receiver further comprises a transmitter and/or a transceiver in electronic communication with a receiver controller, configured to direct at least one secondary directional electromagnetic energy beam from a first device receiver towards a determined location of at least one second device receiver utilizing a least a portion of the energy stored in the intermediary electrical storage device of the first device receiver, independent of a status of the electronic device in electrical communication with the first device receiver, the second device receiver, or both, the second device receiver configured to receive and convert one or more of the secondary directional electromagnetic energy beams into electrical energy and store at least a portion of the electrical energy in a corresponding intermediary electrical storage device of the second device receiver, and to direct electrical energy from the intermediary electrical storage device of the second device receiver to a corresponding attached second electronic device to charge and/or power the attached second electronic device.

E5. The wireless charging system according to any one of embodiments E1 through E4, configured to form a meshed ad hoc wireless power grid local area network comprising directional wireless base charger system-to-device receiver power distribution, and peer-to-peer directional wireless power distribution, in which each of the device receivers and the wireless base charger systems present are nodes of the meshed network.

E6. The wireless charging system according to any one of embodiments E1 through E5, wherein the device receiver is in bidirectional electronic communication with the system controller, and wherein the system controller is configured to determine a status of the device receiver, and/or the electronic device in electrical communication with the device receiver.

E7. The wireless charging system according to any one of embodiments E1 through E6, wherein the bidirectional electronic communication comprises:
a local area data network;
an ad-hoc data network;
a wide area data network;
a wireless computer network;
a meshed network;
a wired computer network;
the internet;
a radio data network;
a cellular data network;
a cellular data network provided at least in part by the electronic device;
a wireless power grid local area network;
an ad hoc wireless power grid local area network;
a meshed ad hoc wireless power grid local area network;
or a combination thereof.

E8. The wireless charging system according to any one of embodiments E1 through E7, wherein the determined status of the device receiver and/or the electronic device in electrical communication with the device receiver comprises an authorization status, comprising a determination according to one or more authorization criteria of if the device receiver and/or the electronic device is, or is not authorized to receive wireless energy from the wireless charging system.

E9. The wireless charging system according to any one of embodiments E1 through E8, wherein the authorization criteria comprises: an authorization key; a lookup table; an identifier unique to the device receiver; an identifier unique to the electronic device; a user account; a service subscription; a prepaid subscription; a blockchain permission; a blockchain transaction; or a combination thereof.

E10. The wireless charging system according to any one of embodiments E1 through E9, further configured to cause the electronic device to present an indication perceivable by an end user of the electronic device indicating the authorization status of the device receiver and/or the electronic device in electrical communication with the device receiver.

E11. The wireless charging system according to any one of embodiments E1 through E10, configured such that when the determination of the authorization status results in the device receiver and/or the electronic device not being authorized to receive wireless energy from the wireless charging system, the indication perceivable by the end user allows the end user to change the authorization status of the device receiver and/or the electronic device.

E12. The wireless charging system according to any one of embodiments E1 through E11, wherein end user changing the authorization status of the device receiver and/or the electronic device comprises a financial transaction.

E13. The wireless charging system according to any one of embodiments E1 through E12, wherein end user changing the authorization status of the device receiver and/or the electronic device comprises a cryptocurrency financial transaction, a blockchain financial transaction, or a combination thereof.

E14. The wireless charging system according to any one of embodiments E1 through E13, configured such that when the determination of the authorization status results in the device receiver and/or the electronic device not being authorized to receive wireless energy from the wireless charging system, the device receiver is configured to prevent the intermediary electrical storage device from directing electrical power to the electronic device in electrical connection with the device receiver.

E15. The wireless charging system according to any one of embodiments E1 through E14, wherein the determining of the authorization status results in a determination that the device receiver and/or the electronic device is authorized to receive wireless energy from the wireless charging system, the device receiver is configured according to one or more configuring criteria to receive and convert one or more of the directional electromagnetic energy beams from the wireless charging system into electrical energy and store at least a portion of the electrical energy in an intermediary electrical storage device, and to direct electrical energy from the intermediary electrical storage device to charge and/or power the electronic device.

E16. The wireless charging system according to any one of embodiments E1 through E15, wherein the configuring criteria includes:
a time stamp;
a level of charge of the electronic device;
an identification variable specific to the electronic device;
a power requirement of the electronic device;
a predetermined criterion;
a multiplexing criterion;
or a combination thereof.

E17. The wireless charging system according to any one of embodiments E1 through E16, wherein the device receiver is configured to request wireless energy delivery from the wireless charging system based at least in part on a level of charge of the connected electronic device.

E18. The wireless charging system according to any one of embodiments E1 through E17, wherein the system controller and/or the wireless base charger system and a first device receiver are in bidirectional electronic communication, wherein the first device receiver and the second device receiver are in bidirectional electronic communication with each other, wherein wireless base charger system is in bidirectional electronic communication with the second device receiver through the first device receiver, or a combination thereof, and wherein the wireless base charger system is configured to determine if the second electronic device in electrical communication with the second device receiver is, or is not authorized to receive wireless energy from the wireless charging system based on one or more predetermined criteria;
wherein the first device receiver is configured such that when the determination of the authorization status results in the first electronic device not being authorized to receive wireless charging from the wireless charging system, the first device receiver is configured to:
i) prevent the intermediary electrical storage device of the first device receiver from directing power to the first electronic device in electrical communication with the first device receiver; and/or
ii) direct at least one secondary directional electromagnetic energy beam toward the determined location of the second device receiver utilizing a least a portion of the electrical energy stored in the intermediary electrical storage device of the first device receiver.

E19. A method comprising:
- I) providing a wireless charging system according to any one of embodiments E1 through E18;
- II) determining a location of the device receiver within the physical space;
- III) establishing bidirectional electronic communication between the wireless charging system and the device receiver;
- IV) determining if the electronic device is, or is not authorized to receive wireless energy from the wireless charging system based on one or more predetermined authorization criteria;
- V) wherein upon receiving a request from the electronic device and/or receiving a request from a device receiver in electrical connection with the electronic device, which is or has been determined to be authorized to receive wireless charging from the wireless charging system:
    - i. configuring the device receiver to receive the one or more directional electromagnetic energy beams from the wireless charging system according to one or more configuring criteria;
    - ii. directing one or more directional electromagnetic energy beams from the one or more transmitting antennas towards the device receiver of the electronic device at the determined location within the physical space;
    - iii. the device receiver receiving and converting one or more of the directional electromagnetic energy beams into electrical energy and storing at least a portion of the electrical energy in an intermediary electrical storage device; and
    - iv. directing the electrical energy from the intermediary electrical storage device to the connected electronic device in electrical connection with the device receiver, to charge and/or power the connected electronic device;
- VI) wherein upon receiving a request from the electronic device and/or receiving a request from the device receiver in electrical connection with the electronic device which is or has been determined not to be authorized to receive wireless charging from the wireless charging system:
    - i. configuring the device receiver to prevent receiving of the one or more directional electromagnetic energy beams from the wireless charging system according to one or more configuring criteria; and/or
    - ii. configuring the charging system to prevent directing one or more directional electromagnetic energy beams from the one or more transmitting antennas towards the device receiver of the electronic device at the determined location within the physical space; and/or
    - iii. configuring the device receiver to prevent the directing of electrical energy from the intermediary electrical storage device to the connected electronic device in electrical connection with the device receiver.

E20. A method comprising:
- I) providing a wireless charging system, comprising: a system controller in electronic communication with at least one wireless base charger system coupled to a power source, at least one transmitting antenna, the wireless charging system configured to determine a location of at least one device receiver located within a physical space and to provide wireless energy delivery comprising directing one or more directional electromagnetic energy beams from at least one transmitting antenna to the location of the device receiver at a distance greater than or equal to 50 cm from the transmitting antenna; the device receiver is configured to receive and convert one or more of the directional electromagnetic energy beams into electrical energy and store at least a portion of the electrical energy in an intermediary electrical storage device, and to direct electrical energy from the intermediary electrical storage device to a connected electronic device in electrical connection with the device receiver, to charge and/or power the connected electronic device;
- II) determining a location of the device receiver within the physical space;
- III) establishing bidirectional electronic communication between the wireless charging system and the device receiver;
- IV) determining if the electronic device is, or is not authorized to receive wireless energy from the wireless charging system based on one or more predetermined authorization criteria;
- V) wherein upon receiving a request from the electronic device and/or receiving a request from a device receiver in electrical connection with the electronic device, which is or has been determined to be authorized to receive wireless charging from the wireless charging system:
    - v. configuring the device receiver to receive the one or more directional electromagnetic energy beams from the wireless charging system according to one or more configuring criteria;
    - vi. directing one or more directional electromagnetic energy beams from the one or more transmitting antennas towards the device receiver of the electronic device at the determined location within the physical space;
    - vii. the device receiver receiving and converting one or more of the directional electromagnetic energy beams into electrical energy and storing at least a portion of the electrical energy in an intermediary electrical storage device; and
    - viii. directing the electrical energy from the intermediary electrical storage device to the connected electronic device in electrical connection with the device receiver, to charge and/or power the connected electronic device;
- VI) wherein upon receiving a request from the electronic device and/or receiving a request from the device receiver in electrical connection with the electronic device which is or has been determined not to be authorized to receive wireless charging from the wireless charging system:
    - iv. configuring the device receiver to prevent receiving of the one or more directional electromagnetic energy beams from the wireless charging system according to one or more configuring criteria; and/or
    - v. configuring the charging system to prevent directing one or more directional electromagnetic energy beams from the one or more transmitting antennas towards the device receiver of the electronic device at the determined location within the physical space; and/or
    - vi. configuring the device receiver to prevent the directing of electrical energy from the intermediary electrical storage device to the connected electronic device in electrical connection with the device receiver.

E21. The method according to embodiment E19 or E20, wherein upon receiving a request from the electronic device and/or a device receiver connected to the electronic device, which is or has been determined to be authorized to receive wireless charging from the wireless charging system:
  i. configuring one or more other device receivers to direct one or more secondary directional electromagnetic energy beams towards the determined location of the device receiver within the physical space;
  ii. the device receiver receiving and converting one or more of the secondary directional electromagnetic energy beams into electrical energy and storing at least a portion of the electrical energy in an intermediary electrical storage device; and
  iii. directing the electrical energy from the intermediary electrical storage device to the connected electronic device in electrical connection with the device receiver, to charge and/or power the connected electronic device;
  wherein upon receiving a request from the electronic device and/or device receiver connected to the electronic device which is or has been determined not to be authorized to receive wireless charging from the wireless charging system:
  iv. configuring the device receiver to prevent receiving of the one or more secondary directional electromagnetic energy beams from one or more other device receivers according to one or more configuring criteria; and/or
  v. configuring the device receiver to prevent the directing of electrical energy from the intermediary electrical storage device to the connected electronic device in electrical connection with the device receiver.

E22. A method comprising: providing a wireless charging system according to any one of embodiments E1 through E18;
  determining a location of the electronic device within the physical space; upon receiving a request from the electronic device;
  directing one or more directional electromagnetic energy beams from the one or more transmitting antennas towards the device receiver of the electronic device at or near the determined location within the physical space in an amount sufficient to power and/or charge the electronic device;
  wherein upon motion of the electronic device within the physical space, updating the location of the electronic device therein; and redirecting at least one of the plurality of the directional electromagnetic energy beams from the one or more transmitting antennas toward the device receiver of the electronic device at or near the updated location in an amount sufficient to power and/or charge the electronic device.

E23. A method comprising:
  providing a wireless charging system comprising one or more base chargers comprising one or more transmitting antennas configured to direct one or more directional electromagnetic energy beams to a device receiver of an electronic device located within a physical space, wherein the electronic device is adapted to issue a request to the wireless charging system, and wherein a device receiver of the electronic device is adapted to receive and convert one or more electromagnetic energy beams provided by the wireless charging system to electrical energy in an amount sufficient to power and/or charge the electronic device;
  determining a location of the electronic device within the physical space; upon receiving a request from the electronic device;
  directing one or more directional electromagnetic energy beams from the one or more transmitting antennas towards the device receiver of the electronic device at or near the determined location within the physical space in an amount sufficient to power and/or charge the electronic device;
  wherein upon motion of the electronic device within the physical space, updating the location of the electronic device therein; and redirecting at least one of the plurality of the directional electromagnetic energy beams from the one or more transmitting antennas toward the device receiver of the electronic device at or near the updated location in an amount sufficient to power and/or charge the electronic device.

E24. The method according to embodiment E22 or E23, further comprising establishing an instance of bidirectional electronic communication between the wireless charging system and the electronic device.

E25. The method according to any one of embodiments E22 through E24, wherein the bidirectional electronic communication between the wireless charging system and the electronic device comprises direct and/or indirect electronic communication via: a local area network; an ad-hoc network; a wide area network; a wireless computer network; a wired computer network; a cellular data network; a cellular data network provided at least in part by the electronic device; or a combination thereof, and/or further comprising determining a status of the electronic device.

E26. The method according to any one of embodiments E22 through E25, wherein the determining of the status of the electronic device is conducted prior to and/or coincident which receiving the request from the electronic device; after receiving the request from the electronic device; prior to and/or coincident with determining the location of the electronic device within the physical space; after determining the location of the electronic device within the physical space; prior to and/or coincident with updating the location of the electronic device within the physical space; after updating the location of the electronic device within the physical space; prior to and/or coincident with receiving of a request from the electronic device; after receiving of a request from the electronic device; or any combination thereof.

E27. The method according to any one of embodiments E22 through E26, wherein the determining of a status comprises determination of an authorization status, comprising a determination of if the electronic device is authorized to receive wireless charging from the wireless charging system, or is not authorized to receive wireless charging from the wireless charging system, based on one or more predetermined authorization criteria.

E28. The method according to embodiment E27, wherein the authorization criteria include an authorization key, a lookup table, an identifier unique to the electronic device, an indication of the electronic device comprising an active service subscription, an indication of the electronic device comprising an active prepaid subscription, or a combination thereof.

E29. The method according to any one embodiments E27 or E28, wherein the determining of the authorization status comprises determining if the electronic device is, or is not associated with a user account authorized to receive wireless charging from the wireless charging system, based on one or more predetermined criteria.

E30. The method according to any one of embodiments E27 through E29, further comprising causing the electronic device to present an indication perceivable by an end user of the electronic device, indicating the authorization status of the electronic device.

E31. The method according to any one of embodiments E27 through E30, wherein the determining of the authorization status results in the electronic device not being authorized to receive wireless charging from the wireless charging system, the method further comprises causing the electronic device to present an indication perceivable by the end user of the electronic device, and allowing the end user to change the authorization status of the electronic device to being authorized to receive wireless charging from the wireless charging system.

E32. The method according to any one of embodiments E27 through E31, wherein the allowing the end user to change the authorization status of the electronic device to being authorized to receive wireless charging from the wireless charging system comprises a request for, and a verification of a financial transaction resulting in a transfer of funds.

E33. The method according to any one of embodiments E27 through E32, wherein the determining of the authorization status results in the electronic device being authorized to receive wireless charging from the wireless charging system, the method further comprises configuring the electronic device to receive wireless charging from the wireless charging system according to one or more configuring criteria.

E34. The method according to any one of embodiments E27 through E33, further comprising the directing of one or more directional electromagnetic energy beams from the one or more transmitting antennas towards the device receiver of the electronic device at or near the determined location within the physical space in an amount sufficient to power and/or charge the electronic device according to one or more of the configuring criteria.

E35. The method according to any one of embodiments E27 through E34, wherein the configuring criteria includes: a time stamp; a level of charge of the electronic device; an identification variable specific to the electronic device; a predetermined criteria; or a combination thereof.

E36. The method according to any one of embodiments E27 through E35, wherein the determining of a status comprises a determination of one or more physical properties and/or states of the electronic device, and directing of the one or more directional electromagnetic energy beams from the one or more transmitting antennas towards the device receiver of the electronic device at or near the determined location within the physical space in an amount sufficient to power and/or charge the electronic device, based on at least one of the physical properties and/or states of the electronic device and/or based on one or more predetermined criteria.

E37. The method according to any one of embodiments E27 through E36, wherein the determining of the authorization status results in the electronic device not being authorized to receive wireless charging from the wireless charging system, the method further comprises configuring the device receiver and/or the electronic device to prevent receiving wireless charging from the wireless charging system.

E38. The method according to any one of embodiments E27 through E37, wherein the determining of the authorization status results in the electronic device not being authorized to receive wireless charging from the wireless charging system, the method further comprises directing one or more directional electromagnetic energy beams from the one or more transmitting antennas to avoid the determined location of the device receiver of the electronic device within the physical space, and/or not directing one or more electromagnetic energy beams from the one or more transmitting antennas towards the device receiver of the electronic device, to at least partially prevent the device receiver of the electronic device from receiving one or more of the electromagnetic energy beams from the one or more transmitting antennas.

E39. A method comprising: providing a wireless charging system comprising one or more base chargers comprising one or more transmitting antennas configured to direct one or more directional electromagnetic energy beams to a device receiver of an electronic device located within a physical space, wherein the electronic device is adapted to issue a request to the wireless charging system, and wherein a device receiver of the electronic device is adapted to receive and convert one or more electromagnetic energy beams provided by the wireless charging system to electrical energy in an amount sufficient to power and/or charge the electronic device; determining a location of the electronic device within the physical space; establishing an instance of electronic communication between the wireless charging system and the electronic device; determining a status of the electronic device comprising determination of an authorization status, comprising a determination of if the electronic device is, or is not authorized to receive wireless charging from the wireless charging system, based on one or more predetermined authorization criteria; wherein upon receiving a request from the electronic device which is has been determined to be authorized to receive wireless charging from the wireless charging system: i) configuring the electronic device to receive wireless charging from the wireless charging system according to one or more configuring criteria; and/or ii) directing of one or more directional electromagnetic energy beams from the one or more transmitting antennas towards the device receiver of the electronic device at or near the determined location within the physical space in an amount sufficient to power and/or charge the electronic device according to one or more of the configuring criteria; wherein upon determining the electronic device is not authorized to receive wireless charging from the wireless charging system: i) configuring the device receiver and/or the electronic device to prevent receiving wireless charging from the wireless charging system, and/or ii) directing one or more directional electromagnetic energy beams from the one or more transmitting antennas to avoid the determined location of the device receiver of the electronic device within the physical space, and/or not directing one or more electromagnetic energy beams from the one or more transmitting antennas towards the device receiver of the electronic device, to at least partially prevent the device receiver of the electronic device from receiving one or more of the electromagnetic energy beams from the one or more transmitting antennas.

E40. A system comprising:
a wireless charging system comprising one or more base chargers comprising one or more transmitting antennas configured to direct one or more directional electromagnetic energy beams to a device receiver of an electronic device located within a physical space, wherein the electronic device is adapted to issue a request to the wireless charging system, and wherein a device receiver of the electronic device is adapted to receive and convert one or more electromagnetic energy beams provided by the wireless charging system to electrical energy in an amount sufficient to power and/or charge the electronic device;
the system configured according to the method of any one of Embodiments E19-through E39.

E41. A system comprising:
a wireless charging system comprising one or more base chargers comprising one or more transmitting antennas configured to direct one or more directional electromagnetic energy beams to a device receiver of an electronic device located within a physical space, wherein the electronic device is adapted to issue a request to the wireless charging system, and wherein a device receiver of the electronic device is adapted to receive and convert one or more electromagnetic energy beams provided by the wireless charging system to electrical energy in an amount sufficient to power and/or charge the electronic device;
the system configured to:
determine a location of the electronic device within the physical space;
establish an instance of electronic communication between the wireless charging system and the electronic device;
determine a status of the electronic device comprising determination of an authorization status, comprising a determination of if the electronic device is, or is not authorized to receive wireless charging from the wireless charging system, based on one or more predetermined authorization criteria;
wherein upon receiving a request from the electronic device which is has been determined to be authorized to receive wireless charging from the wireless charging system:
 i. configures the electronic device to receive wireless charging from the wireless charging system according to one or more configuring criteria; and/or
 ii. directs of one or more directional electromagnetic energy beams from the one or more transmitting antennas towards the device receiver of the electronic device at or near the determined location within the physical space in an amount sufficient to power and/or charge the electronic device according to one or more of the configuring criteria;
wherein upon determining the electronic device is not authorized to receive wireless charging from the wireless charging system:
 i. configures the device receiver and/or the electronic device to prevent receiving wireless charging from the wireless charging system, and/or
 ii. directs one or more directional electromagnetic energy beams from the one or more transmitting antennas to avoid the determined location of the device receiver of the electronic device within the physical space, and/or does not direct one or more electromagnetic energy beams from the one or more transmitting antennas towards the device receiver of the electronic device, to at least partially prevent the device receiver of the electronic device from receiving one or more of the electromagnetic energy beams from the one or more transmitting antennas.

E42. A system comprising:
a wireless charging system comprising one or more base chargers comprising one or more transmitting antennas configured to direct one or more directional electromagnetic energy beams to a device receiver of an electronic device located within a physical space, wherein the electronic device is adapted to issue a request to the wireless charging system, and wherein a device receiver of the electronic device is adapted to receive and convert one or more electromagnetic energy beams provided by the wireless charging system to electrical energy in an amount sufficient to power and/or charge the electronic device;
the system configured to:
determine a location of the electronic device within the physical space;
establish an instance of electronic communication between the wireless charging system and the electronic device;
determine a status of the electronic device comprising determination of an authorization status, comprising a determination of if the electronic device is, or is not authorized to receive wireless charging from the wireless charging system, based on one or more predetermined authorization criteria;
wherein upon receiving a request from the electronic device which is has been determined to be authorized to receive wireless charging from the wireless charging system:
 i. configures the electronic device to receive wireless charging from the wireless charging system according to one or more configuring criteria; and/or
 ii. directs of one or more directional electromagnetic energy beams from the one or more transmitting antennas towards the device receiver of the electronic device at or near the determined location within the physical space in an amount sufficient to power and/or charge the electronic device according to one or more of the configuring criteria;
wherein upon determining the electronic device is not authorized to receive wireless charging from the wireless charging system:
 i. configures the device receiver and/or the electronic device to prevent receiving wireless charging from the wireless charging system, and/or
 ii. directs one or more directional electromagnetic energy beams from the one or more transmitting antennas to avoid the determined location of the device receiver of the electronic device within the physical space, and/or does not direct one or more electromagnetic energy beams from the one or more transmitting antennas towards the device receiver of the electronic device, to at least partially prevent the device receiver of the electronic device from receiving one or more of the electromagnetic energy beams from the one or more transmitting antennas.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

We claim:

1. A wireless charging system, comprising:
a system controller,
in electronic communication with at least one wireless base charger system,
coupled to a power source,
the wireless base charger system further comprising at least one transmitting antenna in electrical communication with the system controller,
the wireless charging system configured to determine a location of at least one device receiver located within a physical space, and
to provide wireless energy delivery comprising directing one or more directional electromagnetic energy beams from at least one transmitting antenna to the location of the device receiver at a distance greater than or equal to about 10 cm from the transmitting antenna;
each device receiver configured to receive and convert one or more of the directional electromagnetic energy beams into electrical energy, and
store at least a portion of the electrical energy in an intermediary electrical storage device,
wherein the system controller is configured to determine a status of each device receiver comprising an authorization status of the device receiver being authorized to receive power from the wireless charging system, and
wherein the device receiver is determined to be authorized to receive power from the wireless charging system, the device receiver is configurable to direct electrical energy from the intermediary electrical storage device to a connected electronic device in electrical connection with the device receiver, to charge and/or power the connected electronic device;
wherein the wireless charging system is further configured for peer-to-peer directional wireless power distribution, wherein each device receiver further comprises a transmitter coupled to a corresponding receiver controller configured to direct one or more secondary directional electromagnetic energy beams from the device receiver towards a determined location of at least one second device receiver, utilizing a least a portion of the energy stored in the intermediary electrical storage device of the device receiver;
the second device receiver configured to receive and convert the one or more secondary directional electromagnetic energy beams into electrical energy and store at least a portion of the electrical energy in a corresponding intermediary electrical storage device of the second device receiver,
wherein based at least in-part on the authorization status of the second device receiver to receive power from the wireless charging system, the second device receiver is configurable to direct electrical energy from the intermediary electrical storage device of the second device receiver to a corresponding attached second electronic device to charge and/or power the attached second electronic device;
wherein the second device receiver is configurable to direct one or more secondary directional electromagnetic energy beams from the second device receiver towards a determined location of at least one other device receiver, utilizing a least a portion of the energy stored in the intermediary electrical storage device of the second device receiver wherein the energy is stored until the device becomes authorized to receive power from the wireless charging system.

2. The wireless charging system of claim 1, wherein the device receiver is configured to be removably electrically connected to the electronic device via a disengageable connecter.

3. The wireless charging system of claim 1, wherein the system controller is configured to update the location of each device receiver within the physical space and upon motion of the device receiver within the physical space, direct one or more directional electromagnetic energy beams from the at least one transmitting antenna of the base charger system toward the updated location of the device receiver and to direct one or more secondary directional electromagnetic energy beams from another device receiver towards the updated location of the device receiver.

4. The wireless charging system of claim 1, wherein the receiver controller is configurable to direct electrical energy from the intermediary electrical storage device to the attached electronic device to charge the attached electronic device, and to direct at least one secondary directional electromagnetic energy beam from the device receiver towards the determined location of the at least one second device receiver utilizing a least a portion of the energy stored in the intermediary electrical storage device of the device receiver device receiver.

5. The wireless charging system of claim 1 configured to form a meshed ad hoc wireless power grid local area network comprising directional wireless base charger system-to-device receiver power distribution, and peer-to-peer directional wireless power distribution, in which each of the device receivers and the wireless base charger systems present are nodes of the meshed network.

6. The wireless charging system of claim 1, wherein the device receiver is in bidirectional electronic communication with the system controller,
wherein two or more device receivers are in bidirectional electronic communication with each other,
wherein the system controller is in bidirectional electronic communication with one or more device receivers through one or more other device receivers,
or a combination thereof.

7. The wireless charging system of claim 6, wherein the bidirectional electronic communication comprises:
a local area data network;
an ad-hoc data network;
a wide area data network;
a wireless computer network;
a meshed network;
a wired computer network;
the internet;
a radio data network;
a cellular data network;
a cellular data network provided at least in part by the electronic device;
a wireless power grid local area network;
an ad hoc wireless power grid local area network;
a meshed ad hoc wireless power grid local area network;
or a combination thereof.

8. The wireless charging system of claim 6, wherein the bidirectional electronic communication between the device receiver and the system controller comprises bidirectional electronic communication between the attached electronic device and the system controller.

9. The wireless charging system of claim 8, wherein the authorization criteria comprises: an authorization key; a lookup table; an identifier unique to the device receiver; an identifier unique to the electronic device; a user account; a service subscription; a prepaid subscription; a blockchain permission; a blockchain transaction; or a combination thereof.

10. The wireless charging system of claim 8, further configured to cause the electronic device to present an indication perceivable by an end user of the electronic device indicating the authorization status of the device receiver and/or the electronic device in electrical communication with the device receiver.

11. The wireless charging system of claim 10, configured such that when the determination of the authorization status results in the device receiver and/or the electronic device not being authorized to receive wireless energy from the wireless charging system, the indication perceivable by the end user allows the end user to change the authorization status of the device receiver and/or the electronic device.

12. The wireless charging system of claim 11, wherein end user changing the authorization status of the device receiver and/or the electronic device comprises a financial transaction.

13. The wireless charging system of claim 12, wherein end user changing the authorization status of the device receiver and/or the electronic device comprises a cryptocurrency financial transaction, a blockchain financial transaction, or a combination thereof.

14. The wireless charging system of claim 1, configured such that when the determination of the authorization status results in the device receiver not being authorized to receive wireless energy from the wireless charging system, the device receiver is configured to receive and convert one or more of the directional electromagnetic energy beams from the wireless charging system, one or more secondary wireless charging beams from another device receiver, or a combination thereof, into electrical energy and store at least a portion of the electrical energy in an intermediary electrical storage device, and to prevent the intermediary electrical storage device from directing electrical power to the electronic device in electrical connection with the device receiver.

15. The wireless charging system of claim 1, wherein the determining of the authorization status results in a determination that the device receiver is authorized to receive wireless energy from the wireless charging system, the device receiver is configured according to one or more configuring criteria to receive and convert one or more of the directional electromagnetic energy beams from the wireless charging system, and one or more secondary wireless charging beams from another device receiver, into electrical energy and store at least a portion of the electrical energy in an intermediary electrical storage device, and to direct electrical energy from the intermediary electrical storage device to charge and/or power the electronic device.

16. The wireless charging system of claim 15, wherein the configuring criteria includes:
   a time stamp;
   a level of charge of the electronic device;
   an identification variable specific to the electronic device;
   a power requirement of the electronic device;
   a predetermined criterion;
   a multiplexing criterion;
   or a combination thereof.

17. The wireless charging system of claim 1, wherein each device receiver is configured to request wireless energy delivery from the wireless charging system based at least in part on a level of charge of the connected electronic device.

18. A method comprising:
   I) providing a wireless charging system according to claim 1,
   II) determining a location of each device receiver within the physical space;
   III) establishing bidirectional electronic communication between the wireless charging system and each device receiver;
   IV) determining if the electronic device is, or is not authorized to receive wireless energy from the wireless charging system based on one or more predetermined authorization criteria;
   V) wherein upon receiving a request for power from the electronic device which is or has been determined to be authorized to receive wireless charging from the wireless charging system:
      i. configuring the device receiver to receive the one or more directional electromagnetic energy beams from the wireless charging system according to one or more configuring criteria;
      ii. directing one or more directional electromagnetic energy beams from the one or more transmitting antennas towards the device receiver of the electronic device at the determined location within the physical space;
      iii. the device receiver receiving and converting one or more of the directional electromagnetic energy beams into electrical energy and storing at least a portion of the electrical energy in an intermediary electrical storage device; and
      iv. directing the electrical energy from the intermediary electrical storage device to the connected electronic device in electrical connection with the device receiver, to charge and/or power the connected electronic device;
   VI) wherein upon receiving a power request from the electronic device which is or has been determined not to be authorized to receive wireless charging from the wireless charging system:
      configuring the device receiver to prevent the directing of electrical energy from the intermediary electrical storage device to the connected electronic device in electrical connection with the device receiver.

19. The method of claim 18, wherein upon receiving a power request from the electronic device
   wherein upon a determination that the electronic device is authorized to receive wireless charging from the wireless charging system:
      i. configuring one or more other device receivers to direct one or more secondary directional electromagnetic energy beams towards the determined location of the device receiver within the physical space;
      ii. the device receiver receiving and converting one or more of the secondary directional electromagnetic energy beams into electrical energy and storing at least a portion of the electrical energy in an intermediary electrical storage device; and
      iii. directing the electrical energy from the intermediary electrical storage device to the connected electronic device in electrical connection with the device receiver, to charge and/or power the connected electronic device.

20. The method of claim 19, wherein each device receiver is configured to receive and convert one or more directional electromagnetic energy beams and/or secondary directional electromagnetic energy beams into electrical energy and store at least a portion of the electrical energy in an intermediary electrical storage device independent of the authorization status of the electronic device to receive wireless charging from the wireless charging system.

\* \* \* \* \*